United States Patent
Schabron et al.

(10) Patent No.: US 10,808,183 B2
(45) Date of Patent: Oct. 20, 2020

(54) CONTINUOUS DESTABILIZATION OF EMULSIONS

(71) Applicant: The University of Wyoming Research Corporation, Laramie, WY (US)

(72) Inventors: John F. Schabron, Laramie, WY (US); Jeramie J. Adams, Laramie, WY (US); Joseph F. Rovani, Laramie, WY (US); Jean-Pascal Planche, Laramie, WY (US)

(73) Assignee: The University of Wyoming Research Corporation, Laramie, WY (US)

( * ) Notice: Subject to any disclaimer, the term of this patent is extended or adjusted under 35 U.S.C. 154(b) by 336 days.

(21) Appl. No.: 14/427,975

(22) PCT Filed: Sep. 12, 2013

(86) PCT No.: PCT/US2013/059538
§ 371 (c)(1),
(2) Date: Mar. 12, 2015

(87) PCT Pub. No.: WO2014/043404
PCT Pub. Date: Mar. 20, 2014

(65) Prior Publication Data
US 2015/0225655 A1 Aug. 13, 2015

Related U.S. Application Data

(63) Continuation-in-part of application No. PCT/US2012/071087, filed on Dec. 20, 2012.
(Continued)

(51) Int. Cl.
*C10G 33/04* (2006.01)
*C10G 25/00* (2006.01)

(52) U.S. Cl.
CPC .......... *C10G 33/04* (2013.01); *C10G 25/003* (2013.01); *Y02A 30/333* (2018.01)

(58) Field of Classification Search
CPC ............ C10G 25/003; C10G 25/00–12; C10G 33/04–08; C10G 33/00–08; Y02A 30/333
(Continued)

(56) References Cited

U.S. PATENT DOCUMENTS 1,866,503 A * 7/1932 Kirschbraun ......... B01F 3/0807
516/38
1,987,870 A 1/1935 Robinson
(Continued)

FOREIGN PATENT DOCUMENTS

EP 400989 A 5/1990
EP 0400989 A2 5/1991
(Continued)

OTHER PUBLICATIONS

Goual et al. Adsorption of bituminous components at oil/water interfaces investigated by quartz crystal microbalance: implications to the stability of water-in-oil emulsions. Langmuir, 2005, 21, 8278-8289. (Year: 2005).*
(Continued)

*Primary Examiner* — Stephen E Rieth
(74) *Attorney, Agent, or Firm* — Santangelo Law Offices, P.C.

(57) ABSTRACT

The inventive technology, in at least one embodiment, may be described as a method of destabilizing an aqueous hydrocarbon emulsion comprising the steps of: effecting contact between a sorbent and said aqueous hydrocarbon emulsion; effecting relative motion between said sorbent and said aqueous hydrocarbon emulsion; and destabilizing (perhaps in continuous fashion) the aqueous hydrocarbon emulsion. Applications include but are not limited to oil spill
(Continued)

clean up, manufacturing of emulsions, oil refinery and production operations (anywhere along the production chain).

11 Claims, 13 Drawing Sheets

Related U.S. Application Data

(60) Provisional application No. 61/700,090, filed on Sep. 12, 2012, provisional application No. 61/775,924, filed on Mar. 11, 2013.

(58) Field of Classification Search
USPC ...... 516/138; 210/689, 287; 208/86, 120.01, 208/122, 123, 309
See application file for complete search history.

(56) References Cited

U.S. PATENT DOCUMENTS

| | | | |
|---|---|---|---|
| 3,405,059 A | 10/1968 | Sprow | |
| 4,006,077 A | 2/1977 | Wegner et al. | |
| 4,036,732 A | 7/1977 | Irani et al. | |
| 4,054,689 A | 10/1977 | Calvin | |
| 4,088,540 A | 5/1978 | Bunas | |
| 4,101,415 A | 7/1978 | Crowley | |
| 4,125,459 A | 11/1978 | Garwin | |
| 4,395,330 A | 7/1983 | Aubior et al. | |
| 4,403,765 A | 9/1983 | Billion et al. | |
| 4,419,219 A | 12/1983 | Long et al. | |
| 4,422,926 A | 12/1983 | Gould et al. | |
| 4,424,114 A | 1/1984 | Murrell et al. | |
| 4,493,765 A | 1/1985 | Long et al. | |
| 4,498,971 A | 2/1985 | Angelov et al. | |
| 4,502,944 A | 3/1985 | Nelson | |
| 4,502,950 A | 3/1985 | Ikematsu et al. | |
| 4,509,597 A * | 4/1985 | Dardis | C09K 8/885 166/270.1 |
| 4,514,287 A | 4/1985 | Ikematsu et al. | |
| 4,514,787 A | 4/1985 | Kaneko et al. | |
| 4,515,685 A | 5/1985 | Yeh | |
| 4,525,269 A | 6/1985 | Ikematsu et al. | |
| 4,535,098 A * | 8/1985 | Evani | A61L 15/18 252/194 |
| 4,572,781 A | 2/1986 | Krasuk et al. | |
| 4,600,501 A * | 7/1986 | Poirier | B01D 17/0202 208/177 |
| 4,628,204 A | 12/1986 | Maes | |
| 4,634,680 A | 1/1987 | Kingsley | |
| 4,765,885 A | 8/1988 | Sadeghi et al. | |
| 4,810,367 A | 3/1989 | Chombart et al. | |
| 4,816,140 A | 3/1989 | Trambouze et al. | |
| 4,865,741 A | 9/1989 | Nolte et al. | |
| 4,888,108 A | 12/1989 | Farnand | |
| 4,988,446 A | 1/1991 | Haberman et al. | |
| 4,990,773 A | 2/1991 | Supernaw et al. | |
| 5,092,983 A | 3/1992 | Eppig et al. | |
| 5,124,025 A | 6/1992 | Kolstad et al. | |
| 5,124,026 A | 6/1992 | Taylor et al. | |
| 5,152,886 A | 10/1992 | Paris-Marcano | |
| 5,258,117 A | 11/1993 | Kolstad et al. | |
| 5,326,456 A | 7/1994 | Brons et al. | |
| 5,574,215 A | 11/1996 | Bunger et al. | |
| 5,861,228 A | 1/1999 | Descales et al. | |
| 5,893,302 A | 4/1999 | Strom | |
| 5,944,010 A | 8/1999 | Hoffschmidt et al. | |
| 5,944,984 A | 8/1999 | Benguigui et al. | |
| 5,969,237 A | 10/1999 | Jones et al. | |
| 6,773,921 B1 | 8/2004 | Schabron et al. | |
| 7,223,603 B2 | 5/2007 | Rovani, Jr. et al. | |
| 7,718,049 B2 | 5/2010 | Strack et al. | |
| 7,736,900 B2 | 6/2010 | Pauli et al. | |
| 7,875,464 B2 | 1/2011 | Schabron et al. | |
| 7,981,277 B2 | 7/2011 | Subramaniau et al. | |
| 8,241,920 B2 | 8/2012 | Schabron et al. | |
| 8,273,581 B2 | 9/2012 | Schabron et al. | |
| 8,367,425 B1 | 2/2013 | Schabron et al. | |
| 8,492,154 B1 | 7/2013 | Schabron et al. | |
| 8,530,240 B1 | 9/2013 | Schabron et al. | |
| 2003/0188995 A1 | 10/2003 | Varadaraj | |
| 2003/0211621 A1 | 11/2003 | Rovani et al. | |
| 2003/0221992 A1 | 12/2003 | Gorbaty et al. | |
| 2004/0099606 A1* | 5/2004 | McGarvey | B01D 15/02 210/689 |
| 2004/0195179 A1 | 10/2004 | Varadaraj | |
| 2005/0045564 A1* | 3/2005 | Akay | B01D 17/0202 210/708 |
| 2006/0113218 A1 | 6/2006 | Hart et al. | |
| 2006/0272983 A1 | 12/2006 | Droughton | |
| 2007/0048874 A1 | 3/2007 | Schabron et al. | |
| 2008/0164137 A1 | 7/2008 | Messer et al. | |
| 2008/0230442 A1 | 9/2008 | Iqbal et al. | |
| 2009/0211758 A1 | 8/2009 | Bragg et al. | |
| 2009/0301931 A1 | 12/2009 | Koseoglu et al. | |
| 2010/0096297 A1 | 4/2010 | Stevens et al. | |
| 2010/0116716 A1 | 5/2010 | Yeung | |
| 2010/0116746 A1 | 5/2010 | Pfeffer et al. | |
| 2010/0176032 A1 | 7/2010 | Droughton | |
| 2011/0062058 A1 | 3/2011 | Rogel et al. | |
| 2011/0066441 A1 | 3/2011 | Ovalles et al. | |
| 2011/0100402 A1 | 5/2011 | Soane et al. | |
| 2011/0120950 A1 | 5/2011 | Schabron et al. | |
| 2011/0127196 A1 | 6/2011 | Henaut et al. | |
| 2011/0215030 A1 | 9/2011 | Corscadden | |
| 2011/0266198 A1 | 11/2011 | Hassan et al. | |
| 2012/0016168 A1 | 1/2012 | Schabron et al. | |
| 2012/0160015 A1 | 6/2012 | Ovalles et al. | |
| 2012/0160737 A1 | 6/2012 | Myer | |
| 2013/0104772 A1* | 5/2013 | Schabron | C08L 95/005 106/277 |
| 2015/0197998 A1* | 7/2015 | Kapila | C09K 8/34 166/244.1 |
| 2015/0218461 A1 | 8/2015 | Schabron et al. | |
| 2015/0225655 A1 | 8/2015 | Adams | |
| 2017/0072376 A1 | 3/2017 | Schabron | |

FOREIGN PATENT DOCUMENTS

| | | |
|---|---|---|
| GB | 635717 | 4/1950 |
| WO | 0077120 A2 | 12/2000 |
| WO | 0077120 A2 | 12/2000 |
| WO | 01/81718 A1 | 11/2001 |
| WO | 02063292 A1 | 8/2002 |
| WO | 03096011 A1 | 11/2003 |
| WO | 2010147583 | 12/2010 |
| WO | 2010147583 A1 | 12/2010 |
| WO | 2011/032123 A3 | 3/2011 |
| WO | 2011032123 A2 | 3/2011 |
| WO | 2011032125 A3 | 3/2011 |
| WO | 2011/113017 A2 | 9/2011 |
| WO | 2011113017 A2 | 9/2011 |
| WO | 2012121804 | 9/2012 |
| WO | 2012121804 A4 | 9/2012 |
| WO | 2014042666 A1 | 3/2014 |
| WO | 2014043404 A1 | 3/2014 |

OTHER PUBLICATIONS

Painter, P. et al. Guide to asphaltene solubility. Energy Fuels, 2015, 29, 2951-2961. (Year: 2015).*
McClean, J. D. et al. Effects of asphaltene aggregation in model heptane-toluene mixtures on stability of water-in-oil emulsions. Journal of Colloid and Interface Science, 1997, 196, 23-34. (Year: 1997).*
Stark J L et al: "New method prevents desalter upsets from blending incompatible crudes", Oil and and Gas Journal, Pennwell, Houston, TX, US. vol. 100, No. 11, Mar. 18, 2002. pp. 89-81.
European Patent Application No. 12884399.2, filed Apr. 9, 2015, first named Inventor: John F. Schabron, Extended European Search Report dated Apr. 19, 2016, 6 pages.

(56) References Cited

OTHER PUBLICATIONS

International Application No. PCT/US12/1087, filed Dec. 20, 2012, first Named Inventor: John F. Schabron, International Search Report dated Mar. 12, 2013. 3 pages.
International Application No. PCT/US12/71087, filed Dec. 20, 2012, first Named Inventor: John F. Schabron, Written Opinion of the International Searching Authority dated Mar. 12, 2013. 31 pages.
"Energy and Environmental Profile of the US Petroleum Refining Industry," 1988, Prepared by Energetics Inc. for U.S. Department of Energy Office of Industrial Technologies, pp. 4-5, 27, 33, 49 and 62-63, (1998).
"Standard Test Method for Molecular Weight (Relative Molecular Mass) of Hydrocarbons by Thermoelectric Measurement of Vapor Pressure," ASTM Designation: D 2503-82 (Reapproved 1997), 871-873.
Andersen, S.I. et al., 1991, "Aggregation of Asphaltenes as Determined by Calorimetry," Journal of Colloid and Interface Science, 142, 497-502, 1991.
Barton, A.F., 1974, "Solubility Parameters," Chemical Reviews, 75 (6), 731-753.
Bodusynski, M.M. et al., 1982,☐☐Separation of Solvent-Refined Coal into Solvent-Derived Fractions, Analytical Chemistry, 54, 372-375.
Burrell, H., 1955, "Solubility Parameters" Interchemical Review, 3-16.
Carrier, H. et al; "Acoustic method for measuring asphaltene flocculation in crude oil", Journal of Petroleum Science and Engineering, pp. 111-117 (2000).
Cartz, L., ch. 3, Utrasonic Testin, Nondestructive Testing, 1995, pp. 81-98.
Del Bianco, A. et al., 1993, Thermal Cracking of Petroleum Residues 1. Kinetic Analysis of the Reaction. Fuel, 72 (1), 7-80.
Heithaus, J.J., 1962, "Measurement and Significance of Asphaltene Peptization," Journal of the Institute of Petroleum 48 (458), 45-53.
Jones et al. "Development of an ultrasonic oil stability monitor for the assessment of asphaltene aggregation inhydrocarbon stream", Proceed. Intern. Conf. Mitigat. Heat Exch. Foul. Econ. Envir. Implic. Banff, AB, Canada, Jul. 1999, 84-94.
Long, R.B. et al., 1989,"Studies in Petroleum Composition" Revue de Institute Francais du Petrole, abstract.
Long, R.B., 1979, "The Concept of Asphaltenes" Preprints, Div. Petroleum Chemistry, American Chemical Society, 24, 891-901.
Magaril, R.Z. et al., 1968, Study of the Mechanism of Coke Formation in the Cracking of Petroleum Resins, International Chemical Engineering 8 (4), 727.
McClements, D.J.,"Ultrasonic Measurements in Particle Size Analysi", University of Massachusetts, Amherst, USA, Encyclopedia of Analytical Chemistry (Applications, Theory and Instrumentation) pp. 5581-5587.
Pal R. et al., 1989, Viscosity/Concentration Relationships for Emulsions. Journal of Rheology, 33 (7), 1021-1045.
Pauli, A.T. 1996, "Asphalt Compatibility Testing Using the Automated Heithaus Titration Test" Preprints, Division of Fuel Chemistry, American Chemical Society, 41 (4), 1276-1281.
Pauli, A.T. et al., 1998, Relationships Between Asphaltenes, Heithaus Compatibility Parameters, and Asphalt Viscosity. Petrol. Science and Technology, 16 (9&10), 1125-1147.
Scatchard, G. 1931, "Equilibria in Non-Electrolyte Solutions in Relation to the Vapor Pressure and Densities of the Components" Chemical Reviews, 321-333.
Pauli, A.T. et al.,"Stability and Compatibility Testing of Petroleum and Asphalt" American Laboratory, Sep. 2003, 2 pages.
Phillips, C.R, et al. 1985, Kinetic Models for the Thermal Cracking of Athabaska Bitumen, Fuel 64(5), 678-691.
Schabron, J.F. et al."Coking indexes using the Heithaus titration and asphaltene solubility," Preprints—American Chemical Society, Division of Petroleum Chemistry (1999), 44(2), 187-189.

Schabron, J.F. et al., 1998, "The Solubility and Three-Dimensional Structure of Asphaltenes" Petroleum Science and Technology, 16 (3-4), 361-376.
Schabron, J.F. et al., 1999 "Petroleum Residua Solubility Parameter/ Polarity Map: Stability Studies of Residua Pyrolysis" Department of Energy Report under contract # DE-FC26-98FT40322 Task, 1.2, 24 pages.
Schabron, J.F. et al., 2000 "Deposition from Heavy Oils" Department of Energy Report under contract # DEFC26-98FT40322, 35 pages.
Schabron, J.F. et al., 2001b, Molecular Weight / Polarity Map for Residua Pyrolysis, Fuel, 80 (4), 529-537.
Schabron, J.F. et al., 2001c, Non-Pyrolytic Heat Induced Deposition from Heavy Oils, Fuel, 80 (7) 919-928.
Schabron, J.F., et al., 2002b, Residua Coke Formation Predictability Maps, Fuel, 81 (17) 2227-2240.
Schabron, J.F. et al., 2001a, Predicting Coke Formation Tendencies, Fuel, 80 (10) 1435-1446.
Schabron, J.F. et al., 2002a, Characterization of Residua During Pyrolysis, Preprints, Div. of Petroleum Chemistry, American Chemical Society, 47 (1), 17-21.
Schabron, J.F. et al., 1993,"The Characterization of Petroleum Residua" U.S. Dept of Energy Report under contract # DE-FC21-86MC110761, 68 pages.
Schabron, J.F. et al , 2002,"Coke Formation Process Model for Petroleum Refining Efficiency Improvement", US Department of Energy Report under contract # DE/FG36/01G011018, 40 pages.
Schabron, J.F. et al., 2004, Refinery Efficiency Improvement Ultrasonic Spectroscopy and WRI Coking Indexes, WRI Report 04-R009 to DOE under Cooperative Agreement DE-FC26-98FT40322.
Singh, I.D., V. Kothiyal, V. Ramaswamy, and R. Krishna, 1990, Characteristic Changes of Asphaltenes During Visbreaking of North Gujarat Short Residue. Fuel, 69 (3), 289-292.
Small, P.A., 1953,"Some Factors Affecting the Solubility of Polymers" Journal of Applied Chemistry, 71-80.
Snyder, L.R., 1968, "Principles of Adsorption Chromatography" Marcel Dekker, Inc., New York, 206-210.
Wiehe, I.A., 1993, A Phase-Separation Kinetic Model for Coke Formation, Ind. Eng. Chem. Res., 32 (11), 244-2454.
Wiehe, I.A., 1996, "Two-Dimensional Solubility Parameter Mapping of Heavy Oils" Fuel Science and Technology International, 14 (1&2), 289-312.
Bodusynski, M.S. et al., 1987, "Composition of heavy petroleums: 1. molecular weight, hydrogen deficiency, and heteroatom concentration as a function of atmospheric equivalent boiling point up to 1400 degrees F" Energy & Fuels, 1, 2-11.
Schabron, J.F., et al., 2006, "Initial studies using ultrasonic spectroscopy for monitoring changes in residua with pyrolysis," Fuel 85, 2093-2105.
Chiantore, Oscar and Simonelli, Alessandra, "Precipitation-redissolution Liquid Chromatography of Styrene-ethyl Acrylate Copolymers," Polymer Engineering and Science, Aug. 1999, vol. 39 No. 8, p. 1383-1388.
Cortell, Jessica M. et al., "Influence of Vine Vigor on Grape (*Vitis vinifera* L. Cv. Pino Noir) Anthrocyanins. 2. Anthocyanins and Pigmented Polymers in Wine," J. Agric. Food Chem. 2007, 55, p. 6585-6595.
Aske, Narve et al.; "Determination of Saturate, Aromatic, Resin, and Asphaltenic (SARA) Components in Crude Oils by Means of Infrared and Near-Infrared Spectrocopy," Energy & Fuels, 2001, 15, 1304-1312.
Corbett, L.W., "Composition of Asphalt Based on Generic Fractionation, Using Solvent Deasphaltening, Elution-Adsorption Chromatography, and Densimetric Characterization," Analytical Chemistry, p. 576-579 , vol. 41, No. 4, Apr. 1969.
McCarthy, James E. et al.; "EPA's Regulation of Coal-Fired Power: Is a "Train Wreck" Coming?", Congressional Research Service, CRS Report for Congress, Aug. 8, 2011, 7-5700, R41914.
"Standard Test Method for n-Heptane Insulbles1", Designation: D 3279-97 (Reapproved 2001).

(56) References Cited

OTHER PUBLICATIONS

Schabron, J.F., et al., "Asphaltene Determinator Method for Automated On-Column Precipitation and Redissolution of Pericondensed Aromatic Asphaltene Components," Energy Fuels 2010, 24, 5984-5996, DOI: 10.102/ef100822f.
Fan, T. et al., "Rapid and Accurate SARA Analysis of Medium Gravity Crude Oils," Energy & Fuels 2002, 16, 1571-1575.
Schabron, J.F., et al., "On-column precipitation and re-dissolution of asphaltenes in petroleum residua," Fuel 87 (2008) 165-176.
Grizzle, Patrick L, et al., "Automated Liquid Chromatographic Compound Class Grou-Type Separation of Crude Oils and Bitumens Using Chemically Bonded Aminosilane," Anal. Chem. 1986, 58, 2389-2396.
Jewell, D.M. et al., "Ion-Exchange, Coordination, and Adsorption Chromatographic Separation of Heavy-End Petroleum Distillates," Laramie Energy Research Center, Analytical Chemistry, vol. 44, No. 8, Jul. 1972, p. 1391.
Jiang, C et al., "TLC-FID (Iatroscan) analysis of heavy oil and tar sand samples," Organic Geochemistry 39 (2008) 1210-1214.
Karlsen, D.A. et al., "Analysis of petroleum fractions by TLC-FID: applications to petroleum reservoir description," Org. Geochem. vol. 17, No. 5, pp. 603-617, 1991.
Kharrat, A. et al., "Issues with Comparing SARA Methodologies," Energy & Fuels 2007, 21, 3618-3621.
Masson, J-F et al., "Dynamics of Bitumen Fractions by Thin-Layer Chromatography/Flame Ionization Detection," Energy & Fuels 2001, 15, 955-960.
Radke, M et al., "Preparative Hydrocarbon Group Type Determination by Automated Medium Pressure Liquid Chromatography," Anal. Chem. 1980, 52, 406-411.
Schabron, J.F. et al.; "Petroleum Processing Efficiency Improvement," Topical Report, May 2011.
Wiehe, Irwin A. et al.; "The Oil Compatibility Model and Crude Oil Incompatibility," Energy & Fuels 2000, 14, 56-59.
Fan, Z et al.; "Challenges in Processing Bitumens and Heavy Oils," Prepr. Pap.-Am. Chem. Soc., Div. Petr. Chem. 2009, 54 (1), 4.
"Canada regulator approves Enbridge diluent Line," Reuters, Business & Financial News, Feb. 19, 2008, Calgary, Alberta.
"Opportunity Crudes Report II: Technologies and Strategies for Meeting Evolving Market and Environmental Challenges," Hydrocarbon Publishing Company, an updated and expanded study of the 2006 report titled "Opportunity Crudes: Technical Challenges and Economic Benefits." www.hydrocarbonpublishing.com/Report2011/.
http://www.specialchem4adhesives.com/resources, Determining Critical Surface Tension of Solid Substrates, printed Sep. 13, 2011, 3 pages.
Energy Information Administration/Capacity Report 2001.
Robinson, P. R., Petroleum Processing Overview, Practical Advances in Petroleum Processing 2006:1-78.
Rogel, E. et al. Asphaltene Stability in Processed Samples using Solubility Profile Analysis, Prepr. Pap.-Am. Chem. Soc. Div. Pet. Chem. 2011, 56(1), 3.
Ovalles, C. et al. Characterization and Preparative Separation of Heavy Crude Oils, their fractions and thermally Cracked Products by the Asphaltene solubility Fractions Method, Prepr. Pap.-Am. Chem. Soc. Div. Pet. Chem. 2011, 56(1), 8.
Schabron J. F. et al., Total Pericondensed Aromatic (TPA) Determination as an Alternative to Gravimetric Asphaltenes, Prepr. Pap.-Am. Chem. Soc. Div. Pet. Chem. 2011, 56(1), 38.
Rogel, E. et al. Determination of Asphaltenes in Crude Oil and Petroleum Products by the on Column Precipitation Method, Energy Fuels 2009, 23, 4515-4521.
Ovalles, C. et al. Characterization of Heavy Crude Oils, Their Fractions, and Hydrovisbroken Products by the Asphaltene Solubility Fraction Method, dx.doi.org/10.1021/ef201499f | Energy Fuels 2012, 26, 549-556, Published: Dec. 7, 2011.
Lopez-Linares, F. et al. Adsorption of Athabasca Vacuum Residues and Their Visbroken Products over Macroporous Solids: Influence of Their Molecular Characteristics, dx.doi.org/10.1021/ef201047z | Energy Fuels 2011, 25, 4049-4054, Published Aug. 17, 2011.
Rogel, E., Asphaltene Chemical Characterization as a Function of Solubility: Effects on Stability and Aggregation, dx. doi.org/10.1021/ef2013979 | Energy Fuels, Published Nov. 7, 2011.
Schabron, J. F. et al. The Waxphaltene Determinator Method for Automated Precipitation and Re-Dissolution of Wax and Asphaltene Components, Energy Fuels, Article ASAP, DOI: 10.1021/ef300184s, Feb. 27, 2012.
Ovalles, C. et al. Predicting Reactivity of Feedstocks to Hydroprocessing by Using Asphaltene Characteriziation Techniques. Prepr. Pap.-Am. Chem. Soc., Div. Energy Fuels Chem. 2012, 57(2), 763.
Schabron, J.F. Use of the Aphaltene Determinator™ Method to Monitor Vacuum Residue Stability to Improve Refinery Distillation Efficiency, 2011.
McLean J. B. et al. Reactivity Screening of Feedstocks for Catgalytic Coal/Oil Co-Processing, Sep. 1986, http://web.anl.gov/PCS/acsfuel/preprint%20archive/Files/31_4_ANAHEIM_09-86_0169.pdf.
Mariaca-DomAnguez et al. "Reactivity of Fluid Catalytic Cracking Feedstocks as a Function of Reactive Hydrogen Content", Petroleum Science and Technology, 2004, vol. 22, Issue 1-2, pp. 13-29.
Baker, C. A. et al. A new chromatographic procedure and its application to high polymers, J. Chem. Soc., 1956, 2352-2362.
Watkinson, et al. Fouling of a Sweet Crude Oil under Inert and Oxygenated Conditions, Energy and Fuels 2000, 14, 64-69.
Sundarm et al., Thermodynamic Model of Sediment Deposition in the LC-FINING Process, Energy and Fuels 2008, 22, 3226-3236.
Zhang, L. Y. et al. Asphaltene Monolayers at a Toluene/Water Interface, Energy & Fuels 2005, 19, 1330-1336.
Yang, X., et al. Investigation of Subfractions of Athabasca Asphaltenes and their role in Emulsion Stability, Energy & Fuels 2004, 18, 770-777, Apr. 15, 2004.
Hawkins, D.J., et al., Diluent availability will constrain Canada's heavy oil, bitumen development, Oil & Gas Journal, Oct. 29, 2002, vol. 100, Issue 44, p. 64.
Kharrat, A.M., Characteriztion of Canadian heavy oils using sequential extraction approach, Energy & Fuels 2009, 23, 828-834.
Maqbool, T., P. Srikiratiwong, and H.S. Fogler, 2011, Effect of Temperature on the Precipitation Kinetics of Asphaltenes, Energy & Fuels, 25, 694-700.
Pauli, A.T. et al., Assessment of physical property prediction based on asphalt average molecular structures, Prepr. Pap.-Am. Chem. Soc., Div. Pet. Chem. 2005, 50(2) ,255-259.
Pratt, S., NAFTA bumps into Alberta's upgrader plans; Trade deal would prohibit the province from reducing the flow of bitumen to the United States once it starts, Edmonton Journal, Jun. 7, 2008, p. A19.
Storm, D.A., et al., Development of solid properties and thermochemistry of asphalt binders in the 26-65 degreeC temperature range, Energy & Fuels, 1996, 10, 855-864.
Storm, D.A. et al., Rheological study of Ratawi vacuum residue in the 298-673 K temperature range, Energy & Fuels, 1995, 9, 168-176.
Fortuny et al., Effect of Salinity, Temperature, Water Content, and pH on the Microwave Demulsification of Crude Oil Emulsions, Energy & Fuels 2007, 1358-1364.
Lemos, et al. Demulsification of Water-in-Crude Oil Emulsions Using Ionic Liquids and Microwave Irradiation. Energy & Fuels, 2010, 24, 4439-4444.
Guzman-Lucero, et al. Ionic Liquids as Demulsifiers of Water-in-Crude Oil Emulsions: Study of the Mircowave Effect. Energy & Fuels, 2010, 24, 3610-3615.
PCT Application No. PCT/US2012/071087, filed Dec. 20, 2012. Inventors: John F. Schabron, Jeramie J. Adams, Joseph F. Rovani, and Jean-Pascal Planche.
PCT Application No. PCT/US2012/071087, International Search Report dated Mar. 12, 2013.
PCT Application No. PCT/US2012/071087, Written Opinion dated Mar. 12, 2013.
E. Rogel et al., "Asphaltene Stability in Crude Oil and Petroleum Materials by Solubility Profile Analysis," Energy and Fuel, 24 (8), pp. 4369-4374 (2010) (Published on Web Jul. 28, 2010).

(56) References Cited

OTHER PUBLICATIONS

F.P. Burke et al., "Liquid Column Fractionation: A Method of Solvent Fractionation of Coal Liquefication and Petroleum Products," Fuel, vol. 58, pp. 539-541 (1979).

F.K. Schweighart et al., "Development of SRC-I Product Analysis. vol. 2. Evaluation of Analytical Techniques for SRC-I Characterization, Recycle Solvent Studies, and Product Fractionation Studies," published Sep. 1, 1983.

M.M. Boduszynski, "Composition of Heavy Petroleums. 1. Molecular Weight, Hydrogen Deficiency, and Heteroatom Concentration as a Function of Atmospheric Equivalent Boiling Point up to 1400 F (760 C)," Energy & Fuels, vol. 1, No. 1, pp. 2-11 (1987).

M.M. Boduszynski et al, "Separation of Solvent0Refined Coal into Solvent-Derived Fractions," Analyical Chemistry, vol. 54, pp. 372-375 (1982).

Goual, et al. Adsorption of bituminous components at oil/water interfaces investigated by quartz crystal microbalance: implications to the stability of water-in-oil emulsions. Langmuir, 2005, 21, 8278-8289.

International Application PCT/US13/59538, filed Sep. 12, 2013. First named inventor: John F. Schabron. International Search Report dated Jan. 29, 2014. 4 pages.

International Application PCT/US13/59538, filed Sep. 12, 2013. First named inventor: John F. Schabron. Opinion of the International Search Report dated Jan. 29, 2014. 15 pages.

Schabron, J.F. et al., 2002, "Coke Formation Process Model for Petroleum Refining Efficiency Improvement", US Department of Energy Report DE/FG36/01G011018, 18 pages.

Snyder, L.R., 1968, "Principles of Adsorption Chromatography" Marcel Dekker, Inc., New York, 207-211.

Spectrometry, Energy and Fuels, 21, 963-972, 2007.

U.S. Appl. No. 13/723,058, filed Dec. 20, 2012. First Named Inventor: Schabron. Office Action dated Aug. 22, 2016. 14 pages.

U.S. Appl. No. 13/723,058, filed Dec. 20, 2012. First Named Inventor: Schabron. Office Action dated Mar. 11, 2015. 11 pages.

U.S. Appl. No. 13/723,058, filed Dec. 20, 2012. First Named Inventor: Schabron. Office Action dated Nov. 27, 2015. 12 pages.

U.S. Appl. No. 13/723,058, filed Dec. 20, 2012. First Named Inventor: Schabron. Restriction Requirement dated Oct. 16, 2014. 7 pages.

U.S. Appl. No. 11/510,491, filed Aug. 25, 2006. First Named Inventor: Schabron. Office Action dated Mar. 30, 2010. 10 pages.

U.S. Appl. No. 11/510,491, filed Aug. 25, 2006. First Named Inventor: Schabron. Notice of Allowance dated Dec. 9, 2010. 5 pages.

Zaki, et al. Effect of asphaltene and resins on the stability of water-in-waxy oil emulsions. Petroleum Science and Technology, vol. 18. pp. 945-963. (2000).

* cited by examiner 3g crude oil and 3g distilled water

Emulsified at 3,000 cpm for 2 minutes 0.3590g Silica   1.5mL H$_2$O   With 6g emulsion Time during elution experiment ⟶

CONTINUOUS DESTABILIZATION OF EMULSIONS

This is the United States national phase of international patent application (PCT application) PCT/US2013/059538, filed 12 September, 2013, which claims priority to and benefit of: U.S. Provisional application 61/700,090, filed Sep. 12, 2012; and U.S. Provisional application 61/775,924, filed Mar. 11, 2013; said international application also a continuation-in-part of and claims priority to PCT application PCT/US2012/71087 filed Dec. 20, 2012, each said application incorporated herein in its entirety.

TECHNICAL FIELD

The inventive technology disclosed herein relates generally to the field of emulsions and control and manipulation thereof, including but not limited to stabilizing emulsions, creating or generating emulsions, and destabilizing emulsions.

BACKGROUND ART

Vast amounts of heavy oils from Venezuela, Canadian oil sands, other non-conventional sources, and enhanced oil recovery are steadily becoming refining staples as lighter crudes become exhausted. The enhanced density and viscosity of heavy oil is largely due to increased amounts of larger molecules spanning a gamut of structures most of which have a central polyaromatic core. These structures are soluble in aromatic solvents but insoluble in alkanes and are classically defined as asphaltenes. At the molecular level asphaltene component molecules are attracted to one another forming solvated nanoaggregates and, depending on conditions, these nanoaggregates can further associate to form suspended clusters of nanoaggregates which can become unstable leading to flocculation. If the conditions are right (or rather wrong) eventually precipitation can occur. Asphaltenes are problematic throughout the entire production chain starting at the well and continuing until the asphaltene-rich residual byproducts are disposed of by converting them to coke, to be burned as fuel, or using them as a binder for paving asphalt (and other asphalt applications).

Whether crude oils or heavy oils are pumped from underground reservoirs or extracted from oil sands they are subject to emulsion formation either during the recovery process or at various stages in refining. In some cases emulsion formation is desirable, for example in enhanced oil recovery processes, for special handling applications of oil products like asphalt emulsions, or for particular calorific properties like fuel emulsions. Generally these emulsions are oil-in-water, but they can also be water-in-oil or other mixed forms of oil-in-water and water-in-oil. Oils recovered from underground reservoirs can be subject to emulsion formation within the reservoir due to naturally occurring water, from flooding processes, or other enhanced oil recovery processes. However, once the emulsified oils are recovered the emulsions need to be destabilized, or broken, to recover the oil by separating it from brine and sediments. Emulsions are problematic because they may increase the viscosity of the resulting fluid and entrain significant amounts of water making them difficult and inefficient to refine.

Emulsions from bitumen extraction of oil sands, on the other hand, are intentionally formed when hot water is used to extract the bitumen which is then air blown in a flotation process causing the bitumen to float to the surface where it is collected. The collected bitumen is still rich in solids and excess fouling asphaltenes which are removed by either partial precipitation using naphthenic or paraffinic solvents, through centrifuging, or addition of polymers or chemicals to induce water droplet flocculation. These methods, especially when coupled with surfactants, are effective for removing most of the emulsified water, however around 3% of micro emulsified water still remains, Wang (2011).

Emulsions are also deliberately made in cold and semi-warm mix asphalt formulations to lower the product viscosity and improve its workability. Stable emulsions are formulated using nonionic, cationic, anionic, and/or amphoteric surfactants. Once the emulsion is laid down on a road it is mainly broken by contact with aggregates which allows the water to evaporate providing a solid paving surface.

Emulsions are also formed during oil spills and oil-contaminated fresh water, waste water, or salt water which is often treated with chemical dispersants.

In addition to oil recovery and asphalt emulsion issues, a major emulsion problem from reservoir-derived oils occurs at the refinery where the incoming oils are pretreated to remove salts and sediments. The oils are pumped into a desalter unit which mixes the oil with water to significantly reduce the indigenous or introduced (due to flooding or enhanced oil recovery methods) salts while also removing contaminating sediments. At the oil/water interface within desalter units a stable emulsified film is produced which is not problematic as long as it doesn't become unstable leading to uncontrollable growth filling the unit with emulsion, or if it becomes too viscous to allow separating water or oil to pass through it. Additionally, if significant amounts of solids build up at the interface this causes a very thick sludge which prohibits the mixing of the oil and water (pudding, rag layer, sludge).

Oils are very complex systems of molecules containing a wide variety of surface active materials which can be significantly different between sources. Difficulties in interpreting data are further complicated by the addition of surface active molecules in the form of surfactants, drilling fluids, flocculation inhibitors, corrosion inhibitors, and enhanced oil recovery concoctions. For some asphaltenic type molecules to accumulate at oil/water interfaces they must have an amphiphilic structure having both hydrophilic and hydrophobic regions, but this is not the case for most asphaltenic type molecules consisting of large polyaromatic structures. A recent review by Kilpatrick (2012) has outlined three main contributors to emulsion stabilization: asphaltenes, naphthenic acids (carboxylic organic acids some of which come for the resins fraction), fine inorganic particles, and their combinations (metal soaps are also a more specialized impurity within certain oils which can cause significant emulsion stability). Several other factors such as pH, how well solvated are the asphaltenes, and salinity can affect emulsion stability.

It is known that nano-sized colloidal silica gel has the ability to coalesce bitumen-in-water emulsions under shear conditions (Legrand et al, 2005). It is also well known that smaller particles can enhance emulsions by building up at the oil/water interface whereas larger particles can destabilize emulsion (Sullivan and Kilpatrick 2002). Hydrophilic particles, rendered partially hydrophobic by wetting with water, have a decreased ability to stabilize emulsion because they cannot readily adsorb asphaltenes directly onto their surface (Sullivan and Kilpatric 2002). It has been demonstrated that asphaltenes can be adsorbed onto a water layer, of approximately 20 layers in thickness, when the water is supported on a silica surface (Goual et al. 2005). It has also been demonstrated that fine (5 μm) silica gel can effectively coagulate bitumen that is contaminated by fine clay particles, water, and surfactant with stirring to liberate bitumen (Zhou et al. 1999). These findings support our recent observations and work to develop a non-consumptive particle (hydrophilic, hydrophobic, or mixed hydrophilic/hydrophobic) supported system to induce a cascade effect of emulsion destabilization which is not based on filtration through membranes which can become clogged. This method has an inherent cost advantage over addition of chemical demulsifiers since the coalescing surfaces are not passivated or consumed and should not exacerbate emulsion problems due to addition of too much, too little, or the wrong kind of demulsifier.

Methods based on a new breakthrough on-column precipitation and re-dissolution separation technique, developed at WRI, offer significant advancement for the characterization of the pericondensed aromatic and polar materials and waxes in petroleum and residua. The methods provide solubility profiles for oil components. The development work and example separations with representative materials have been described in detail in U.S. Pat. No. 7,875,464, Schabron and Rovani 2008, Goual et al. 2008, and Schabron et al. 2010. The separations are performed using an inert stationary phase consisting of ground polytetrafluoroethylene (PTFE). Although high-performance liquid chromatography (HPLC) instrumentation and detectors are used, there are no chromatographic interactions between the material being separated and the stationary phase. It is solubility based.

Asphaltene Measurement

The novel WRI Asphaltene Determinator™ method separates oils into four solubility fractions using four step gradient solvent changes at 30° C.: heptane, cyclohexane, toluene, and methylene chloride:methanol (98:2 v:v) (Schabron et al. 2010). Other methods based on the technique such as re-dissolution with a continuous increase in solvent polarity are also possible. The Asphaltene Determinator™ method allows for quantification of the most polar and aromatic components in oil. In one example, these are the materials that elute with the last, or strongest solvent, methylene chloride:methanol (98:2 v:v). This method was used to evaluate emulsions involving petroleum materials. The results show that the most polar and pericondensed material in oil asphaltenes plays a significant role in stabilizing water and oil emulsions, and that they are enriched in the emulsions (Schabron et al. 2012).

Asphaltene Component Adsorption and Deposition

Asphaltenes are defined as a solubility class of associated chemical complexes which precipitate when petroleum is dissolved in a low polarity paraffinic solvent such as heptane, pentane, or isooctane, for example. A wide variety of polar and highly pericondensed aromatic molecules containing sulfur, nitrogen, and oxygen as well as metal complexes containing nickel, vanadium, and iron are concentrated in the asphaltenes, and naphthenic acids. Asphaltenes can stabilize water and oil emulsions. These can be water-in-oil or oil-in-water emulsions, or complex emulsions. Asphaltenes act as the major viscosity builders in oil. In catalytic upgrading processes such as hydrotreating, the presence of these materials can shorten catalyst life. The petroleum industry has developed various deasphalteneing processes that involve dissolving oil in an excess of hydrocarbon solvent available in the refinery such as compressed propane, supercritical $CO_2$, or a liquid aliphatic solvent stream, resulting in asphaltene precipitation. The disadvantage of such processes is the high cost of operation resulting from gas compression or solvent removal and solvent recycling.

In prior work we have shown that asphaltene components of petroleum residua can adsorb onto on metal surfaces when the oil is heated to temperatures below the threshold for pyrolytic cracking (<340° C.). More deposits were observed on aluminum metal surfaces as the temperature of residua was increased from 100° C. to 300° C. (Schabron et al. 2001). The resulting asphaltenic material enriched in Ni and V was observed to deposit as dark spots on stainless steel and aluminum surfaces, but not on a non-polar polytetrafluoroethylene (PTFE) surface. This phenomenon appears to be due to the partitioning of the intermediate polarity material surrounding the aromatic asphaltene component molecules into the oil matrix solution, exposing the highly pericondensed aromatic or polar material. The pericondensed aromatic or polar material can flocculate, and/or adhere, or adsorb to the polar metal surface. This is a cause of heat-induced fouling of pipes and heat exchangers in refineries.

The Asphaltene Determinator on-column precipitation and re-dissolution method involves analytical scale precipitation of asphaltene components from oil within a column packed with ground inert PTFE using a heptane mobile phase (Schabron et al. 2010). The precipitated material is re-dissolved in three steps using solvents of increasing solubility parameter: cyclohexane, toluene, and methylene chloride:methanol (98:2 v:v). The amount of asphaltenes (heptane insolubles) and the total pericondensed aromatic (TPA) content can be determined in less than an hour. It was observed in the development work for this method that glass wool or glass beads strongly adsorbed asphaltene component molecules once they are separated from other peptizing molecules in the oil (Schabron and Rovani 2008). This undesired effect observed for the analytical method reinforced the concept of the possibility of asphaltene component molecule removal by adsorption onto a sorbent. In addition, the Asphaltene Determinator method is ideally suited to evaluate the efficiency of removing pericondensed aromatic molecules in sorbent-based asphaltene removal technology.

It is generally assumed that highly polar and/or pericondensed material in oils are solubilized by intermediate polarity peptizing molecules present in the oils, however when these structures are disrupted using heat, sorbents, or chemical treatments, the polar and/or highly pericondensed molecules become depeptized and they can then self-associate to form larger insoluble pre-coke and coke complexes. The surface energy of the polar and/or pericondensed material is the highest of any component in oil (Pauli et al. 2005). This and other observations related to heat-induced deposition have led us to discover that the most pericondensed, viscosity building aromatic structures could be selectively removed from oil by heating or pre-treating the oil and exposing it to high surface energy polar or highly aromatic sorbent material. The resulting oil would be deficient in the most refractory polar and pericondensed aromatic structures and the product oil is more stable and less viscous than the original oil. The pericondensed material adsorbed on the sorbent can be desorbed by solvent rinsing, and these non-surfactant (depending on the source can contain some surfactant material) highly polar pericondensed aromatic materials can be used to stabilize water and oil emulsions or foams.

Prior Art: Components in the oil, especially those reporting to the asphaltenes can contribute to the emulsion stability. The emulsions can be water-in-oil, or oil-in-water depending on the process and source. Most refinery desalter emulsions are believed to be water-in-oil emulsions that consist of spherical particles of water, each surrounded by a shell which stabilizes the emulsion structure (FIG. 1). Spherical droplet diameters of 1-28 microns have been observed (Ortiz and Yarranton 2010). Asphaltenes have been shown to stabilize the emulsions, while intermediate polarity resins can act as destabilizers (Spieker and Kilpatrick 2004). The emulsions also can be stabilized by fine inorganic particles such as clays in the oils (Menon and Wasan 1988, Sztukowski and Yarranton 2005). For enhanced oil or bitumen recovery, ionic surfactants such as amines and sulfonic acid surfactants as well as non-ionic and ionic surfactants have been used. These are often oil-in-water emulsions. The emulsions must be destabilized, often by chemical demulsifiers, before processing. The use of a magnetic field has been described for destabilizing emulsions (Peng et al. 2012). Microwave assisted coalescence has been described by Fortuny et al. (2007), deMoranes et al. (2009), Lemos et al. (2010), and Kovaleva et al. (2011). Electrocoalescence has been described by Mousavichoubeh et al. (2010) and Perles et al. (2012). The use of ionic liquids to destabilize emulsions has been described by Guzman-Lucero et el. (2010) and Lemos et al. (2010).

Asphalt emulsion technology has been discussed in detail in Circular E-C102 from the Transportation Research Board (2006). Asphalt emulsions also require the use of surfactants or emulsifiers that can be classified into anionic, cationic and non-ionic depending on the charge of their polar portion in water which is heavily dependent on pH. Those emulsifiers are typically fatty amines, quaternary ammonium salts, fatty acids or phenols (TRB 2006). In an emulsion break test, silica flour is blended into an emulsion to cause a break due to a surface area effect (TRB 2006). Foamed asphalts are usually made directly by injecting water into hot asphalt or occasionally by adding surfactants in asphalt prior to water injecting.

Prior U.S. patent art related to stabilizing and destabilizing petroleum emulsions deals mainly with various types of surfactants including non-ionic, anionic, cationic, and amphoteric. Only a few examples are provided here. For stabilizing asphalt and water emulsions, various types of surfactants are used (U.S. Pat. No. 8,114,927, and 7,700,672). Demulsifier formulations are found in U.S. Pat. Nos. 5,445,765 and 5,164,116. U.S. Pat. No. 8,124,183 describes the use of calcium chloride, calcium nitrate, aluminum chloride, and ferric chloride to break emulsions. U.S. application 2010/0116716 describes adding light hydrocarbon solvent to break oil and water emulsions.

Asphaltenes and Emulsions

Molecules which report to the asphaltenes, more so than any other component within crude oil, have been shown to contribute to the stability of water and crude oil emulsions (Sztukowski et al. 2003, Wu 2003, Hemmingsen et al. 2005, Jestin et al. 2007). Certain surface active asphaltene molecules or supramolecular asphaltene aggregates generate frameworks responsible for the stabilizing of these emulsions (Jestin et al. 2007, Czarnecki 2009, Czarnecki 2012). Upon agitation these networks concentrate at oil and water interfaces to produce either oil-in-water or water-in-oil emulsions. It is known that not all types of asphaltene molecules are responsible for stabilizing emulsion interfaces (Czarnecki and Moran 2005, Czarnecki 2012). The less aromatic resinous material in the oils or the asphaltenes can help solvate the aggregated material back into the oil phase and away from the interface, causing emulsion destabilization (Alvarez et al. 2009).

It is well known that small solids, especially those with high surface energy, concentrate at organic liquid and water interfaces to stabilize emulsions. Those emulsions are also called Pickering emulsions (Hannisdal et al. 2006, Wikipedia 2012). The size of the particles can have a direct effect on the stability of the emulsions: smaller particles create more stable emulsions.

It is also known that the adsorption of asphaltenes on minerals and reservoir rocks decreases when the surfaces are coated with water (water wet) but that asphaltene adsorption continues despite the buildup of several ordered layers of water at the surface (Collins and Melrose 1983). In a previous study designed to investigate enhanced oil recovery methods, a variety of oil/water emulsions were prepared using neat brine and dilutions of brine as the aqueous component of the emulsions to evaluate the effect of salinity on the quality of oil produced after emulsions were created and broken. The emulsion oils were characterized using the Asphaltene Determinator, and the results indicated distinct behavioral trends particularly in the asphaltenes component of the oil (Rovani et al. 2009). The results suggested for the first time that the Asphaltene Determinator could be applied in the design of core flood investigations to help understand the complex chemical interactions that occur in underground oil, water, and rock during secondary oil recovery water-flood operations.

Asphaltene Removal

There is a great deal of prior art in U.S. Patents that describe various approaches for removing asphaltenes from oil. Only a few examples are described here. U.S. Pat. No. 7,981,277 is a recent one that describes asphaltene removal using solvent precipitation. U.S. Pat. No. 4,888,108 describes the agglomeration of asphaltenes during solvent precipitation. Solvent deasphaltening in the presence of inorganic salt flocculating agents is described in U.S. Pat. No. 4,525,269. Asphaltene separation by cooling and crushing the solid frozen oil mixture, oil followed by particle size separation is described in U.S. Pat. No. 4,498,971. U.S. Pat. No. 4,765,885 describes a reaction of oil with sodium silicate for extracting asphaltenes into an aqueous phase, where the agglomerate and complex with metals present in the oil and settle to the bottom of a vessel. U.S. Pat. Nos. 4,514,287 and 4,424,114 describe the use of acidic compounds such as transition metal oxides to selectively remove the basic components of oil and asphaltenes by catalyst selective adsorption. U.S. Pat. No. 4,006,077 describes removal of metal containing compounds from asphaltene-containing oils using sorptive attapulgus clay. Selective oxidation of heteroatoms in oil is described in U.S. Pat. No. 8,197,671. The use of carbon-based sorbents is described in U.S. patent application 2012/0132566.

SUMMARY OF INVENTION

The inventive technology, in at least one embodiment, may be described as a method of destabilizing an aqueous hydrocarbon emulsion comprising the steps of: effecting contact between a sorbent and said aqueous hydrocarbon emulsion; effecting relative motion between said sorbent and said aqueous hydrocarbon emulsion; and destabilizing said aqueous hydrocarbon emulsion. Applications include but are not limited to oil spill clean up, manufacturing of emulsions, oil refinery and production operations (anywhere along the production chain); even emulsions that do not include hydrocarbons (e.g., as may be found in the food industry) may find use for embodiments of the inventive technology described herein.

Goals of the inventive technology include but are not limited to less costly, more efficient, less material consumptive and more environmentally sound demulsification or emulsion destabilization techniques.

Of course other applications, goals and objectives of the inventive technology may be indicated elsewhere herein.

MODES FOR CARRYING OUT THE INVENTION

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Refinery Desalter Emulsion Study

The solubility subfractions of asphaltenes that contribute to water/oil emulsion stability were evaluated in a recent study, which is described below (Schabron et al. 2012). This is a major issue in oil production and enhanced oil recovery, where emulsion formation is desired in many cases, followed by deliberate destabilization of emulsions, and in refineries where the oil is washed with a water-based solution to remove salt and sediment, where persistent pudding-like emulsions are detrimental. In the study described below, the components of various oils that appear to stabilize oil and water emulsions were evaluated.

Figure 1:
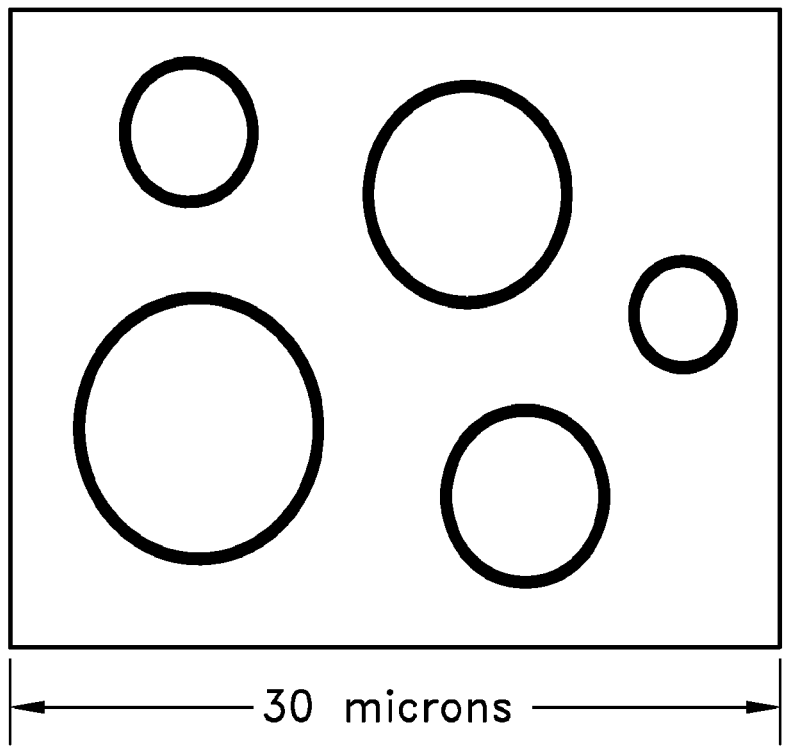
FIG. 1—Drawing of conceptual water droplets in oil with emulsion stabilizing skin.
Figure 2:
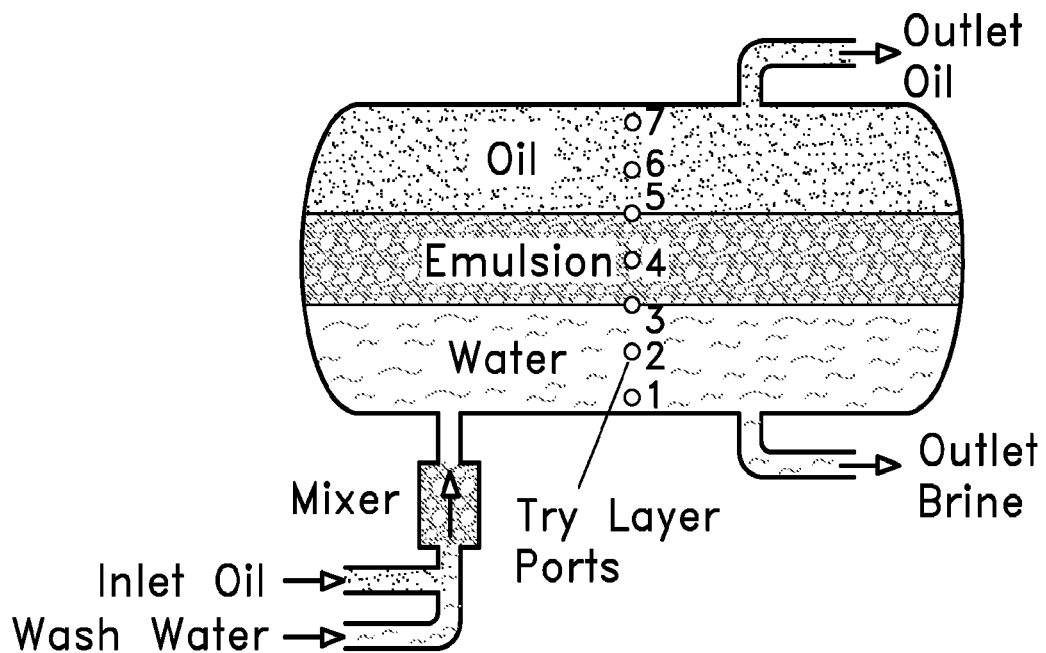
FIG. 2—Generic schematic for a refinery desalter unit and try layers.

Before an incoming crude oil is distilled in a refinery, the first step is to remove salt and sediment using a fresh water-based wash. The separated salt and sediment emerge from the unit in an aqueous outlet brine bottom layer, often containing polyaromatic contaminants. A generic diagram of a desalter unit showing "try layer" sample port placement is shown in FIG. 2. For some oils and conditions, a large undesired middle emulsion phase forms which interferes with efficient operation of the unit. This results in a rag layer or pudding-like emulsion of oil and water which is persistent and difficult to break.

Experimental

Samples and Solvents Crude oil samples and desalter emulsion samples were from petroleum refineries. Solvents and chemicals used in the study were reagent grade. Isolation of the most polar and aromatic (methylene chloride:methanol soluble) components from Lloydminster vacuum, residuum heptane asphaltenes is described in Schabron et al. 2010.

Gravimetric Isolation of Asphaltenes To prepare asphaltenes for the preparative Asphaltene Determinator separation, a sample of residuum or oil was weighed and mixed with an excess of n-heptane. The mixture was stirred overnight to allow full precipitation of asphaltenes. The mixture was then filtered using a medium (10 µm) sintered glass filter frit with repeated rinsing with n-heptane, and any residual solvent was removed using a vacuum oven at 110° C. This was followed by filtration through 0.45 micron PTFE filters with repeated heptane rinsing. The precipitates were dried and weighed.

Saturates, Aromatics, and Resins (SARA) Separation Open-column chromatographic separations of maltenes into saturates, aromatics, and resins fractions were conducted using a 400 mm×19 mm id glass column. The column was slurry packed with 35 g Aldrich grade 62, 60-200 mesh silica gel that had been activated overnight at 120° C. Sample amounts of 350 mg maltenes in heptane solution (1 wt. % loading) were place on the top of the column. Saturates, aromatics, and resins fractions were eluted with heptane, toluene, and toluene:methanol (80:20 v:v), respectively. The eluted fractions were rotovapped at 70° C. to near dryness, and then dried in a vacuum oven at 100° C. for 1 hour prior to weighing for gravimetric determination of the amounts in each fraction.

Emulsion Centrifugation Desalter emulsions were centrifuged in a manner similar to ASTM D-4007-02, but without adding a demulsifier. The emulsions were centrifuged in an International Centrifuge; Universal Model UV, with 100 mL centrifuge tubes at 2,500 rpm with 16 inches tube tip to tube tip diameter while rotating. The centrifuging was performed in a series of three 10 minute intervals, with volume separations checked between each interval to ensure that there were no changes between the last two intervals.

Analytical Asphaltene Determinator Separation The on-column asphaltene precipitation and re-dissolution experiments were conducted using a Waters 717plus autosampler, a Waters 60F pump with a model 600 controller, a Waters 2489 ultraviolet/visible absorbance detector, and a Waters 2424 evaporative light scattering detector (ELSD) as described in Schabron et al. (2010b). Solutions of residua and asphaltenes in chlorobenzene were injected onto a 7 mm i.d.×250 mm stainless steel column packed with 0.25-0.42 mm ground polytetrafluoroethylene (PTFE) (40-60 mesh). The optical absorbance detector in dual wavelength mode at 500 nm and 700 nm was used to monitor the separation profile for a standard reference oil (Lloydminster vacuum residuum), which was injected daily to detect the possible onset of adsorption effects in the stationary phase. If adsorption is observed, the in-line pre-filter disc (Supelco 5-9271, 0.5 μm) and/or the column PTFE packing material is replaced to restore proper operation. Solvent flow rates were 2 mL/min with step changes between solvents. Peak area integrations were performed using Waters Empower software. ELSD and optical absorbance peak areas were electronically blank subtracted prior to integration to correct for small blank peaks due to the step gradient solvent changes. A 20 μL injection of 10% Lloydminster vacuum residuum is made daily as a QC check sample to ensure that there is no adsorption occurring on the column. Solutions of the sample oils and residua are prepared as 10% (w/v) or less solutions in chlorobenzene. Portions of 20 μL were injected in duplicate for the analytical scale Asphaltene Determinator separation. The optimized separation conditions are as follows:

Column: 7 mm id×250 mm stainless steel column
Packing: 40-60 mesh ground PTFE
Detectors:
  Waters 2489 absorbance detector set at 500 nm and 700 nm
  Waters 2424 evaporative light scattering detector (ELSD) 60° C. tube, 12° C. nebulizer, 35 psi nitrogen, gain=1
Solutions: Sample and QC solutions are 10% wt/vol in chlorobenzene
Injection amount: 20 μL Solvents used for step gradient changes: n-heptane, cyclohexane, toluene, methylene chloride:methanol (98:2) (v:v), all at 2 mL/min Step gradient times:

| | |
|---|---|
| 0 min. | n-heptane |
| 15 min. | cyclohexane |
| 25 min. | toluene |
| 35 min. | methylene chloride:methanol (98:2) |
| 45 min. | heptane |
| 60 min. | next injection |

All separation profiles are electronically blank subtracted prior to peak integration Three representative sample sets were obtained from petroleum refinery operations. These include incoming feed oils to the desalter, rag layer emulsions taken from the desalter units, and the desalted effluent oils, each set was taken on the same day from a refinery desalter unit. One group of samples is for a light crude oil (API gravity~40), and another group is for a mixture of heavy and light crude oils (API gravity~25). A third group is for much heavier oil than the first two groups (API gravity~20). Differences in the Asphaltene Determinator solubility fraction profiles of the rag layer asphaltenes were observed in the current study when compared to the inlet and outlet oils. Results for the three sample sets are provided below.

Light Oil Sample Set

Examples of results from the light oil group are provided in Tables 1-4. The incoming oil (Table 1) and desalted outlet oil (Table 2) appear very similar from the Asphaltene Determinator analyses corrected for ELSD volatiles losses. They also are similar in total heptane gravimetric asphaltenes content. However, the gravimetric asphaltenes from the desalted oil contain less toluene soluble and methylene chloride:methanol (98:2 v:v) soluble material than the asphaltenes from the feed oil (Tables 1-2). The gravimetric asphaltenes from the whole rag layer oil water emulsion (Table 3), which has the consistency of pudding, contain more methylene chloride:methanol (98:2 v:v) soluble asphaltene components than the asphaltenes from the incoming or desalted oils. To illustrate this, the area percent values for the 500 nm methylene chloride:methanol (98:2 v:v) peaks for the oils and 10-micron asphaltenes for the whole oil, the rag layer oil with water, and the desalted oil are summarized in Table 4.

The centrifuged emulsion contained 40% oil by volume, 54% water, and 6% sediment. The centrifuged rag layer supernatant oil (Table 5) contains about 20 times more gravimetric asphaltenes than the inlet feed oil or the desalted oil and these asphaltenes contain significantly higher methylene chloride:methanol (98:2 v:v) soluble asphaltene components than the gravimetric asphaltenes from the incoming oil. These results for an emulsion set with a single oil suggest that the most pericondensed and highest surface energy components of oil could be involved in stabilizing oil/water emulsions.

Medium Oil Sample Set

Results for the two medium oil sets collected from a refinery desalter unit on the same day are provided in Tables 6-9. The rag layer emulsions were centrifuged in a manner similar to ASTM D-4007-02 as described above, without adding a demulsifier. The rag layer from Set 1 contains 60% oil by volume, 38% water, and 2% sediment. The rag layer emulsion for Set 2 contains 80% oil by volume, 14% water, and 6% sediment. The Asphaltene Determinator characterization data show that the inlet oils (Table 6) and outlet oils (Table 7) are similar in composition. The desalted effluent oil from Set 2 however has about half the amount of gravimetric asphaltenes as the incoming oil (Table 7). The explanation for this is not straightforward. It could be related to the timing of the sampling for the two materials. The gravimetric heptane asphaltenes from the whole rag layer oil/water emulsions, which have the consistency of pudding, contain significantly more methylene chloride:methanol (98:2 v:v) soluble asphaltene components than the incoming oils (Tables 6 and 8). This represents highly pericondensed and polar asphaltene material. The relative amounts of methylene chloride:methanol soluble material for the centrifuged emulsion oils are similar to the values for the inlet and outlet oils (Tables 6, 7 and 9). The supernatant oils from the centrifuged rag layer emulsions contain about half the amount of gravimetric asphaltenes relative to the incoming or effluent oils from Set 1 and about half the incoming oil from Set 2 (Tables 6, 7 and 9).

The area percent values for the 500 nm methylene chloride:methanol (98:2 v:v) peaks for the oils and 10-micron asphaltenes for the whole oil, the rag layer oil with water, and the desalted oil are summarized in Table 10. Enrichment of the most pericondensed and polar material represented by the methylene chloride:methanol soluble material in the rag layer emulsions suggest that the most pericondensed and highest surface energy components of oil could be involved in stabilizing oil/water emulsions.

Heavy Oil Sample Set

For the heavy oil series, we were provided with samples from various try layer ports in a refinery desalter unit, as well as the incoming and desalted oils. The heavy oil sample set was for heavy oil (~20 API gravity) samples collected from the "try layer" ports of a refinery desalter.

As with the light and medium oil sample sets, analyses were conducted using the Asphaltene Determinator separation and by gravimetric asphaltene precipitation followed by the Asphaltene Determinator. The samples that were analyzed included the whole samples shaken as received, the middle emulsion layers drawn from the samples, the oil from the centrifuged emulsions, and oily residue from the water which was evaporated from the centrifuged emulsions. The many tables of analysis results for this simple set are provided in Appendix A. The more significant results are provided in summary tables as described below. The oil, water, and sediment amounts in the emulsions obtained by centrifugation are provided in Table 11.

Data for the area percents of the methylene chloride:methanol (98:2) soluble material peaks detected by 500 nm absorbance are provided in Table 12. The amounts of this most polar and aromatic material are significantly higher in the whole samples containing emulsions and in the emulsions themselves. The try layer 5 and 7 oil samples, which did not contain emulsions, are more similar to the inlet and desalted oils. Relative volatiles-corrected ELSD area percents for the most pericondensed material are provided in Table 13. For the emulsions, the relative ELSD peak areas were corrected for both the water and volatile oils materials. The residues remaining from evaporation of the water layer after centrifuging contain a larger area percent of heptane insoluble material (asphaltenes) than the whole samples or emulsions.

Selected non-volatile component ELSD area percents are provided in Table 14. The material represented by non-volatile ELSD components is in the boiling range slightly above the nominal initial boiling point for atmospheric residua (>640° F., >340° C.). The ELSD area percents of heptane insolubles and the total pericondensed aromatic contents are highest for the evaporated emulsion centrifuged water residue material when compared with the data for the whole oils or emulsions.

The relative 500 nm absorbance detector area percents for the gravimetric asphaltenes from the oils and emulsions are provided in Table 15. The percents for the toluene soluble asphaltene components are for the most part similar for all the oils and emulsions. However, the relative peak areas for the methylene chloride:methanol soluble materials are significantly higher for the samples that contain emulsions.

These results show that the most polar pericondensed aromatic pre-coke material in the oils, represented by the methylene chloride:methanol soluble peaks, are enriched in the rag layer emulsion samples relative to the incoming oil or outlet desalted oils. The incoming crude and desalted crude oils are similar in composition to each other as expected. The oils from the emulsions after being centrifuged are somewhat similar to the incoming and desalted oils. The results support the hypothesis that the most pericondensed material in the oils contribute to rag layer emulsion stability.

Applications

Typically various surfactant formulations are used to stabilize or destabilize emulsions. Asphaltene components are not typical surfactants which consist of hydrophobic and hydrophilic components in the same molecule (Czarnecki et al. 2012). However, some oils may contain varieties of carboxylic acids or carboxylic salts that can act as surfactants. It is known that certain components of asphaltenes can stabilize emulsions, and less polar resins components of oils can destabilize emulsions (Stanford et al. 2007). The work described above and in Schabron et al. (2012) confirms that a relatively small subfraction of asphaltenes, the most polar and pericondensed asphaltene component molecules, are enriched in water and oil emulsions, and therefore can act as powerful agents for stabilizing emulsions. Conversely, by selectively removing or disrupting associations of the most polar and aromatic components from an emulsion using sorbents, the emulsion can be destabilized and broken. By developing approaches to apply the new asphaltene solubility profile separation methods to evaluate oil components that contribute to emulsion stability, emulsions can be better made, formulated, or destabilized.

In addition, asphalt paving processes involving warm mix, semi-warm mix, cold mix, slurries and sealants, and foam emulsion formulations utilize emulsion chemistry. Understanding the interplay of the asphaltene subfractions on emulsions will help to control foam or emulsion formation and stability, which is a key issue for asphalt emulsion chemistry. The invention is not limited to petroleum oils. Oils can include but are not limited to asphalts, distillation residua, processed oils such as from catalytic hydrotreating, tar sands oils, shale oils, coal oils, synthetic oils, fuel oils, biologically derived oils, modified and unmodified asphalt binders and formulations, roofing shingles, fuel emulsions, caulks, and sealants.

The invention is also not limited to downstream oil refining processes or asphalt emulsion formulations. Because the Asphaltene Determinator technique may also be used to evaluate the quality of oil produced by enhanced oil recovery techniques, the invention may lead to the development or refinement of chemicals such as emulsifiers, surfactants, or additives that may be used to "tune" the quality of the oil produced by water floods. With a better understanding of the complex chemistry that occurs in underground oil, water, and rock formations, it may be possible to use the invention to develop a technique to retain the most polar pericondensed components of the oil underground while producing higher-quality oil that is deficient in these materials.

The invention is also dealing with adding asphaltenes or subfractions of asphaltenes to product formulations such as, but not limited to, petroleum or asphalts in order to make foams or any type of oil/water emulsions (oil-in-water, water-in-oil, and mixed water-in-oil/oil-in-water).

On the other hand, the invention deals with a continuous destabilizing, or breaking, emulsions without necessarily using chemical additives. Sorbent based continuous adsorption can be used to attract surface active material and asphaltenic type material from oil/water interfaces causing the entrained phase to flocculate or coalesces while the asphaltenic material is redispersed into the continuous oil phase. This has applications for breaking emulsions in-situ the reservoirs during production or enhanced oil recovery procedures, during piping, transporting, or refining of emulsions, especially within desalter units, treating waste water and brine, contaminated water, and oil spills.

Obtaining Asphaltene Subfractions

There are several ways that the most polar and pericondensed subfraction of asphaltenes can be isolated. The on-column asphaltene precipitation and re-dissolution technology can be used to obtain asphaltenes or asphaltene solubility subfractions for use in stabilizing water-in-oil or oil-in-water emulsions or complex emulsions. They can also be separated further by the solubility separation of asphaltenes using the in-vessel material generation technology described in U.S. Pat. No. 7,875,464 and continuations thereof. For example, asphaltene can be precipitated on an inert stationary phase using a low polarity alkane solvent- and then re-dissolved all at once or in portions using a solvent or solvents of higher polarity. Manual asphaltene precipitation and partial re-dissolution using various solvent mixtures can also be used to isolate asphaltene subfractions for use in stabilizing emulsions. The most polar and/or pericondensed portion of asphaltenes can also be isolated by selective adsorption from oil or emulsions onto sorbents which can be desorbed using various strong solvents. The isolated asphaltenic material can be used to stabilize water and oil emulsions.

Emulsions

Addition of asphaltenes or asphaltene subfractions such as the most polar and/or aromatic components of asphaltenes or surrogates thereof can be used to stabilize water and oil emulsions or foams/froths (the term foam will further be used only). One application of the invention includes adding asphaltenic oil components to emulsion formulations which result in stable emulsion or foam formation. Another application involves treating or removing the asphaltene components by selective adsorption (may be adsorption at the surface, at a thin water layer, or electrostatic attraction) to destabilize or break emulsions in oil production processes. The technology can also be used to predict, monitor, and destabilize undesirable emulsion formation in reservoirs, pipelines, bitumen extraction processes, or in refinery desalter units. The technology can also be used to formulate emulsions or foams for warm-mix or cold-mix asphalt paving or overlay operations.

The on-column asphaltene precipitation and re-dissolution technique can be used to evaluate and predict the propensity of an oil and/or its asphaltenes to form or resist emulsion formation with aqueous phases such as water, salt water, enhanced oil recovery concoctions, and brine systems. The technique can also be used to monitor the use of additives, asphaltenes, and asphaltene subfractions to create or stabilize, or alternatively to destroy or destabilize emulsions.

The current configuration for the preparative Asphaltene Determinator developed at WRI which uses an inert stationary phase for solubility separation, allows for the separation and collection of four distinct asphaltene fractions of increasing polarity and aromaticity. In one study, the fractions were eluted with heptane, cyclohexane, toluene, and methylene chloride, respectively (Schabron et al, 2010). These four solubility defined subfractions of asphaltenes have distinct physicochemical properties. With increasing solubility parameters of the dissolution eluting solvents there is an increase in aromaticity and polarity of the redissolved asphaltenic material. Other solvents or combination of solvents can be used to separate similar fractions using the technique More resinous (less polar and less aromatic) asphaltenes subfractions from the heptanes or possibly cyclohexane fractions can be added to emulsions to terminate supramolecular aggregation giving smaller discrete aggregates. These less aromatic resins materials can disrupt the ability of the supramolecular framework to dynamically make and break bonds between other aggregates that stabilize asphaltene networks at the oil and water interface. This approach could be useful for treating and destabilizing or inhibiting emulsions in oil production or refinery desalter units. They could also be used at other key points along the production chain which currently use surfactant additives to mitigate unwanted emulsions in oil production operations.

Due to favorable aggregation, adsorption energy, surface energy, and bond forming sites, the more polar and/or pericondensed aromatic asphaltene subfractions that elute with toluene and methylene chloride, for example can be used to enhance emulsions. These fractions can be used independently or combined with other additives to be blended in with other asphalt/asphaltene materials to increase emulsion stability.

Another part of the invention is that selective use of asphaltenes or asphaltene subfractions can be used to control the type of emulsion formed (oil-in-water vs. water-in-oil, and combinations of both (bicontinuous)). This can involve adding different amounts of asphaltene materials, or different polarity and aromatic types of asphaltene subfractions materials. This invention also concerns micro emulsions, (oil-in-water, water-in-oil, and bicontinuous) not requiring high shear mixing.

Road asphalt and sealants, roofing asphalt and sealants, aerosol and non-aerosol sealants, and fuel oil emulsions can be formulated using the most polar and aromatic subfractions from asphaltenes, such as the toluene- and/or methylene chloride soluble asphaltene subfractions after removal of the heptane- and cyclohexane-soluble subfractions, for example. Other similar solvent schemes can be used to separate asphaltenes into less polar pericondensed and more polar pericondensed aromatic asphaltene molecular constituents.

Sorbents to Destabilize Emulsions

Sorbents can be used to destabilize water and oil emulsions. Oil and water emulsions can be effectively destabilized by adding sorbent particles, or sorbents bound to a solid surface to adsorb or otherwise attract asphaltene component molecules from the water-oil droplet interface onto the water-solid surface interface. The surfaces can be solids preferably with high surface energy, charge, very hydrophobic or hydrophilic, or a combination of hydrophobic or hydrophilic material. If the particles are sufficiently large, they can attract asphaltenes from the emulsion interface, resulting in breaking the emulsion. Asphaltenes which are attracted to the water-solid surface can be adsorbed, at least in part, to the solid surface. In the event that asphaltene become adsorbed onto the solid sorbent surface, the adsorbed asphaltenes in some cases can be rinsed off with organic solvents like toluene, methylene chloride, pyridine, or N-methyl-2-pyrrolidone regenerating the sorbent for further use. The rinsed asphaltenes can be used as feedstocks for road or roofing asphalt, sealants, fuel oil, or further upgraded by processes such as hydrocracking. They also can be used to stabilize emulsion for other applications. The sorbent can be one with high surface energy that is selective to attraction of asphaltenes or solid-water-asphaltene adsorption of asphaltene component molecules such as highly polar and pericondensed aromatic molecules. Examples of the sorbents which may be particularly useful include but are not limited to metals, ceramics, zeolites, clays, silica, limestone, hydrated lime or lime derivatives, calcium carbonate, dolomite, sodium sesquicarbonate, sodium carbonate, glass, quartz, sand, alumina, metal oxides, silica-alumina, metal oxides impregnated on alumina, silica, zeolites, aluminosilicates, or silica-alumina, high surface energy carbonaceous materials such as petroleum coke, coal, charcoal, activated carbon, carbon nanotubes, nanoparticles, rare earth oxides, polymers, perfluoro polymers, polytetrafluoroethylene (PTFE), functionalized carbonaceous material, silica, alumina, or clays, combination of these or similar materials. Other sorbents such as non-dissolving solid salts, acids, or bases might be useful also.

Continuous Sorbent-Based Emulsion Breaking Process

Sorbents can also be used in a continuous process where, in certain embodiments, the asphaltene component molecules are temporarily attracted to the sorbent surface, resulting in a destabilized associated asphaltene shell around a water droplet for water-in-oil emulsions, or around an oil droplet for oil-in-water emulsions, causing the dispersed phase in the emulsion to coalesce causing the emulsion to break. The sorbents can be loose, powder, granular, in fixed or fluid beds, or bound on surfaces or in membranes. Examples using silica as a sorbent are provided below. The process does not result in the passivation or consumption of the silica (at least not for a plurality of emulsion destabilization cycles, as explained below). Indeed, hydrocarbon emulsions can be destabilized using solid surfaces in a continuous fashion that does not consume the solid surface or passivate it. Such continuous destabilization is not dependent on nor based on filtration of fine emulsion supporting solid materials that occur naturally in the oil. Examples of the sorbents which may be particularly useful include but not limited to metals, ceramics, zeolites, clays, silica, limestone, hydrated lime or lime derivatives, glass, quartz, sand, alumina, metal oxides, alumina silicates, metal oxides impregnated on alumina or silica or zeolites or alumina silicates, or high surface energy carbonaceous materials such as petroleum coke, coal, charcoal, activated carbon, polytetrafluoroethylene (PTFE) or similar materials. Other sorbents such as salts or acids or bases might be useful also. Continuous destabilization as disclosed herein may have implications for and applications to breaking emulsions within reservoirs such as those, e.g., where indigenous water is present, where water, including steam are used to flood the reservoir, to enhanced oil recovery, to aqueous mixtures that are used to increase production, to breaking emulsions at any point along the extraction, transportation, refining and production of oils, to desalting operations in desalter units, to breaking emulsions created by oil sand, heavy oil, pitch and bitumen extraction (perhaps which use hot water, steam, or any aqueous mixture for extraction of the hydrocarbon). Additional applications include but are not limited to clarification of "cloudy" diesel fuel (which results from an emulsion), removing hydrocarbon from wastewater, water and emulsions formed by oil released into fresh or salt water (offering significant advantages over environmentally detrimental chemical dispersants conventionally used to achieve similar goals). Additional applications include but are not limited to breaking of emulsions used in the paving, food, cosmetic and pharmaceutical industries. Additional applications may be as described elsewhere herein.

Note that the less polar and more polar asphaltene subfractions (whether precipitated, absorbed, dissolved, or isolated) need not total the total asphaltenes; indeed, they may together amount to less than the total amount of asphaltenes (even significantly less than the total amount of asphaltenes). Typically, such subfractions do not overlap. In certain embodiments, one asphaltene subfraction may be defined as those asphaltenes that have a parameter value that is above (or below and including) a certain value, while the other asphaltene subfraction may (but not of necessity) have a value (of that same parameter) that is below and including (or above) such certain value. The more polar asphaltene subfraction may be a subfraction that is poorly soluble in a solvent (including, not dissolving at all or only in de minimus amounts).

Experimental Results

To evaluate the emulsion stabilizing ability of the most polar and pericondensed material in oil, several experiments were conducted using oil or asphaltenic toluene solutions and water in 9-mL vials. Toluene and water are not miscible and they do not form a natural emulsion when shaken or blended together.

Emulsions Stabilized by Preparative Asphaltene Determinator Subfractions

Figure 3:
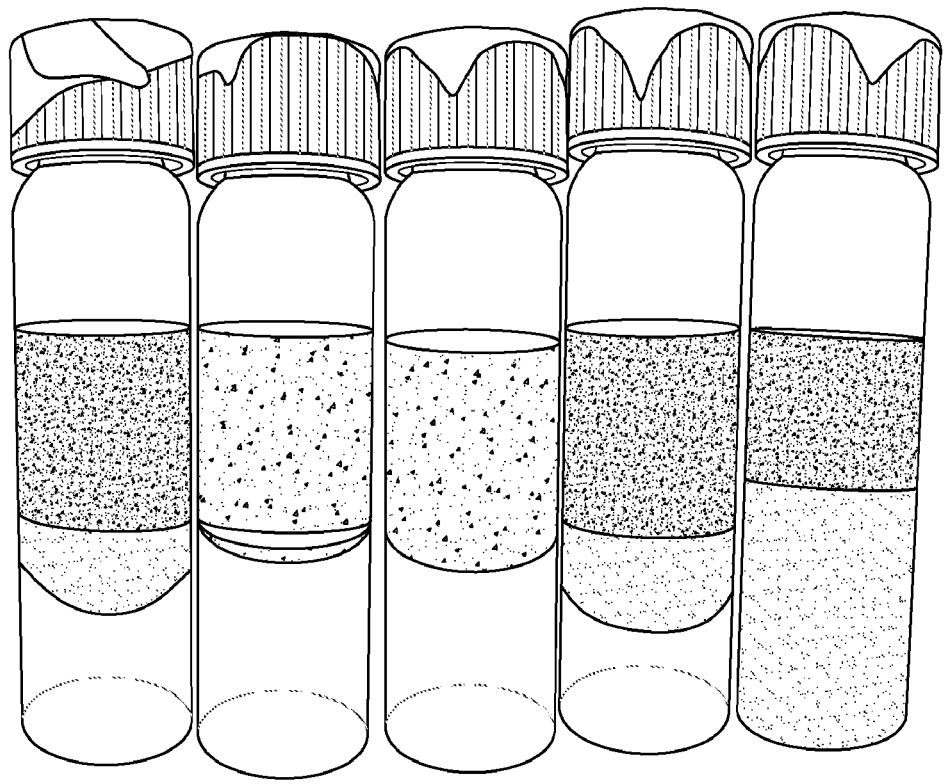
FIG. 3—Toluene and water mixtures with Fractions 1-4 material (5.2 mg) from preparative Asphaltene Determinator separation of Lloydminster vacuum residuum asphaltenes after 50 hrs. From left to right, unfractionated 10 µm Lloydminster asphaltenes (control); Fraction 1 material (heptane-soluble); Fraction 2 material (cyclohexane-soluble), Fraction 3 material (toluene-soluble), Fraction 4 material (methylene chloride-soluble).

A preparative Asphaltene Determinator separation was conducted on 3.0004 g of n-heptane asphaltenes from Lloydminster vacuum residuum as described in (Schabron et al. 2010). Four solubility subfractions were obtained: Fraction 1 (heptane-soluble, 0.1349 g), Fraction 2 (cyclohexane-soluble, 0.7363 g), Fraction 3 (toluene-soluble, 2.0875 g), and Fraction 4 (methylene chloride-soluble, 0.0401 g) subfractions were obtained. These represent increasing polarity and/or aromaticity subfractions of asphaltenes. Portions of these asphaltene subfractions and unfractionated asphaltenes (5.2 mg) were dissolved in 3 mL toluene to which was added 3 mL of distilled water in 9-mL vials. These were blanketed with argon, shaken by hand for 15 seconds, and agitated using a vortex mixture at 3,000 rpm for 2 min. Prior to preparing the solution, the methylene chloride-soluble material was taken up in methylene chloride and filtered through a 0.45 µm filter to remove a small amount of solids. The results of the emulsions are shown in FIG. 3. No emulsion formed with the heptane-soluble Fraction 1 material, a small amount of emulsion formed with the cyclohexane-soluble Fraction 2 material, a larger amount of emulsion was evident with the toluene-soluble Fraction 3 material (which was the same as unfractionated asphaltenes), and the greatest amount of emulsion was formed with the methylene chloride-soluble Fraction 4 material, which consists of the most polar and/or pericondensed aromatic material component of the asphaltenes.

Figure 4:
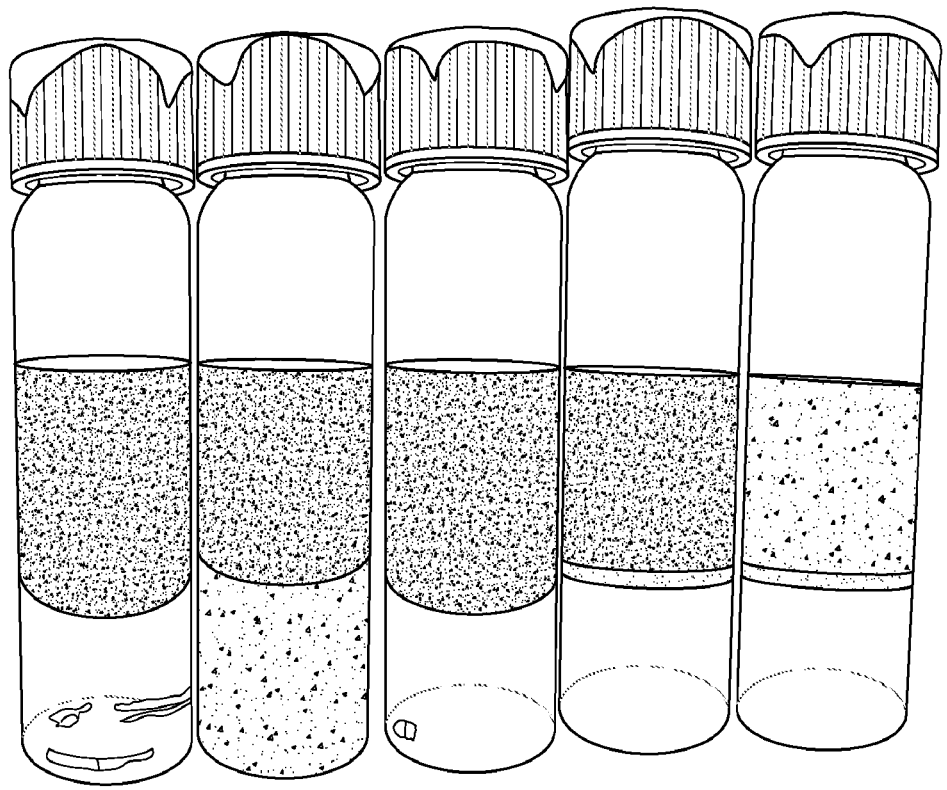
FIG. 4—Toluene and water mixtures with Fraction 1-4 material (5.3 mg) from preparative Asphaltene Determinator separation of desalter inlet crude asphaltenes after 30 hrs. From left to right, unfractionated 10 µm desalter inlet crude asphaltenes (control); Fraction 4 material (methylene chloride-soluble), Fraction 3 material (toluene-soluble), Fraction 2 material (cyclohexane-soluble), Fraction 1 material (heptane-soluble).

A preparative Asphaltene Determinator separation was conducted on 3.0004 g of n-heptane asphaltenes from a desalted heavy crude oil as described in (Schabron et al. 2010). Four solubility subfractions were obtained: Fraction 1 (heptane-soluble, 0.1730 g), Fraction 2 (cyclohexane soluble, 0.518 g), Fraction 3 (toluene soluble, 2.2958 g), and Fraction 4 (methylene chloride-soluble, 0.0472 g) subfractions were obtained. These represent increasing polarity and/or aromaticity subfractions of asphaltenes. Portions of these asphaltene subfractions and unfractionated asphaltenes (5.3 mg) were dissolved in 3 mL toluene to which was added 3 mL of distilled water in 9-mL vials. These were blanketed with argon, shaken by hand for 15 seconds, and agitated using a vortex mixture at 3,000 rpm for 2 min. The results of the emulsions are shown in FIG. 4. A thin skin of emulsion formed with the heptane-soluble Fraction 1 and cyclohexane-soluble Fraction 2 material, no emulsion was evident with the toluene-soluble Fraction 3 material (which was the same as unfractionated asphaltenes), and a tremendous amount of emulsion was formed with the methylene chloride-soluble Fraction 4 material, which consists of the most polar and/or pericondensed aromatic material component of the asphaltenes.

Emulsion Stabilized by Desorbed Asphaltene Subfraction

Figure 5:
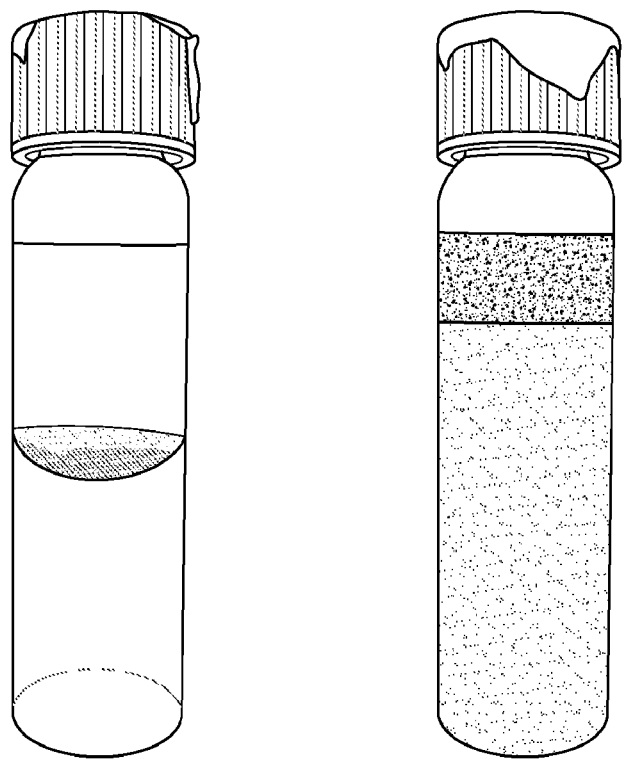
FIG. 5—Left: Toluene and water blank mixture. Right: Water in oil emulsion between toluene and water stabilized by adding 5.2 mg of asphaltenic material desorbed from silica gel following sorbent treatment of Canadian Bitumen (Canmet Energy).

A 25.0 g portion of Canadian Bitumen (Canmet Energy) was mixed with 9.4599 g activated silica Grade 646 (35-60 mesh) at 300° C. in a sealed vessel under argon inert atmosphere for 4 hours with agitation. This treatment results in heat-induced adsorption of very polar and pericondensed asphaltene material onto polar surfaces, such as aluminum, steel or silica gel (Schabron et al. 2001). The asphaltenic material was desorbed from the silica gel. A portion of 5.2 mg of this material was added to a 9-mL vial and suspended in 3.5 mL toluene. The suspension was mechanically shaken for 30 minutes until it dissolved, 3.5 mL distilled water was added, and the mixture was agitated using a vortex mixture for 60 seconds. A significant emulsion resulted (FIG. 5). The results show that heat-induced deposition of asphaltene components onto sorbents can be used to isolate material from oil that can be used to stabilize water and oil emulsions.

Oil-in-Water and Water-in-Oil Emulsion Formation Control

Figure 6:
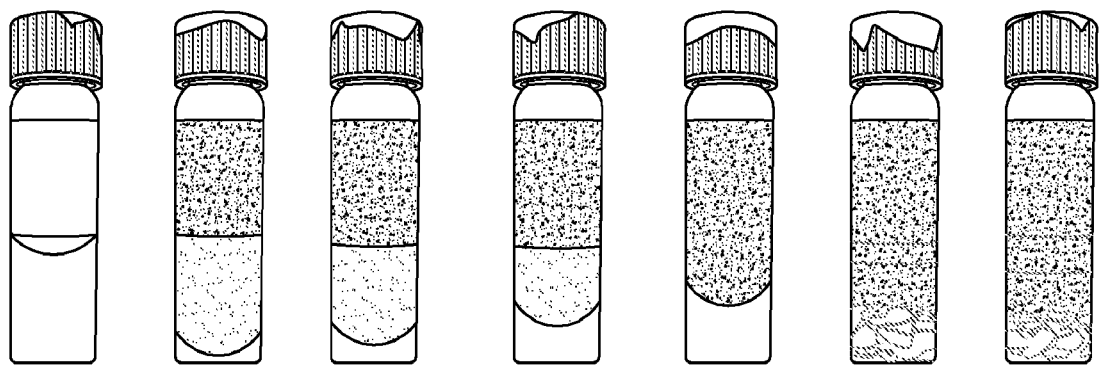
FIG. 6—Toluene and water emulsions created by adding increasing amounts of Peak 3 (toluene soluble) asphaltene subfraction material from Lloydminster vacuum residuum n-heptane asphaltenes. From left to right: toluene/water blank mixture; 5.0 mg, 10.5 mg, 21.0 mg, 42.0 mg, 85.0 mg, 170 mg toluene soluble material added.

Different amounts of the Lloydminster vacuum residuum toluene-soluble subfraction of asphaltenes from the preparative separation above were added to 9-mL vial and suspended in 3.5 mL toluene. The suspensions were mechanically shaken until all of the asphaltenes were dissolved, 3.5 mL distilled water were added to the solution, and then these were agitated using a vortex mixer for 60 seconds. The results are shown in FIG. 6 after sitting at ambient temperature for 5 days. The blank toluene/water mixture is on the far left. From left to right, the various portions of the toluene soluble asphaltene Fraction 3 material added are: 5.0 mg, 10.5 mg, 21.0 mg, 42.0 mg, 85.0 mg, and 170.0 mg. It appears that the emulsion on the left, in which had the smallest amount of the Fraction 3 material added, is an oil-in-water emulsion. At >42 mg, the appearance of the emulsion changes. For the last 170 mg sample, it is possibly a mixed oil-in-water and water-in-oil emulsion. These results show that the type of emulsion (oil-in-water vs. water-in-oil) can be controlled by adding various amounts of asphaltenes or asphaltene subfractions materials.

Emulsion Destabilization Using Sorbents

Figure 7:
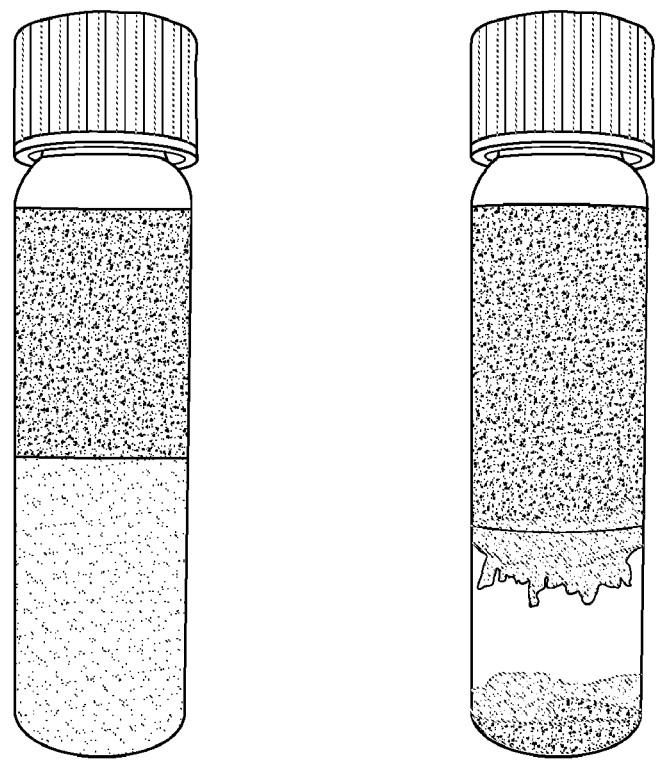
FIG. 7—Effect of adding about 100 mg silica gel to a toluene and water emulsion stabilized by 13 mg of the most polar and pericondensed Peak 4 material from a preparative Asphaltene Determinator separation of Lloydminster vacuum residuum asphaltenes: left—no silica gel, right—100 mg silica gel added.

Portions of the most polar and pericondensed material from Lloydminster asphaltenes were added to two toluene and water mixtures in 9-mL vials. This methylene chloride soluble Fraction 4 asphaltene subfraction material was obtained from a preparative Asphaltene Determinator separating of Lloydminster vacuum residuum asphaltenes as described in Schabron et al. (2010). This material represents about 1.75% of the asphaltenes from the vacuum residuum oil. The two identical mixtures consisted of 4.5 mL of distilled water, 3.5 mL of toluene, and about 13 mg of the Fraction 4 material. They were then shaken for about 30 seconds to form stable partial emulsions. The mixture on the left in FIG. 7 is the stable emulsion in the bottom water layer. About 100 mg of activated silica gel Grade 62 was added to the mixture in the vial on the right in FIG. 7. After being shaken briefly, the emulsion was broken, and clear water was evident in the bottom layer.

Figure 8:
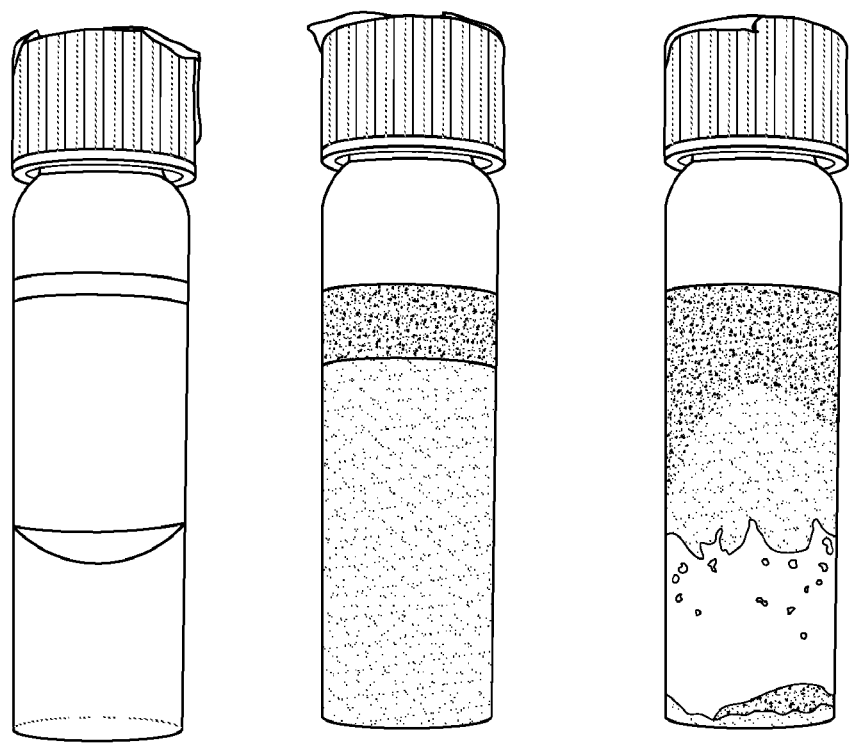
FIG. 8—Effect of adding silica gel to a toluene and water emulsion stabilized by 5.1 mg of the most polar and pericondensed aromatic Peak 4 material (methylene chloride-soluble fraction) from a preparative Asphaltene Determinator separation of Lloydminster vacuum residuum asphaltenes: left—toluene and water; middle—no silica gel; right—silica gel added.

Results of a similar experiment with a different batch of methylene chloride soluble Fraction 4 asphaltene material from Lloydminster vacuum residuum asphaltenes are shown in FIG. 8. The two identical mixtures consisted of 3.5 mL of distilled water, 3.5 mL of toluene, and about 5.1 mg of the Fraction 4 material. They were then agitated in a vortex mixture for about 60 seconds to form partial emulsions that were stable. The mixture on the left in FIG. 8 is the stable emulsion in the bottom water layer. About 107 mg of activated silica gel Grade 62 was added to the mixture in the vial on the right in FIG. 8. After being shaken briefly, the emulsion was broken, and clear water was evident in the bottom layer. These results illustrate the ability of a sorbent to destabilize emulsions by removing some of the most polar and pericondensed material from the system, possibly from the water droplet walls.

Generating Model Emulsions

Figure 9:
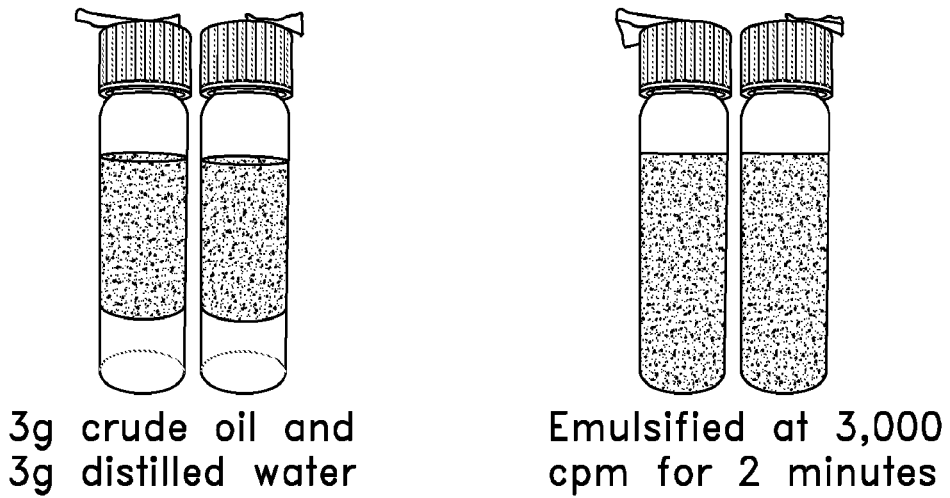
FIG. 9—Crude oil and water emulsion preparation.
Figure 10:
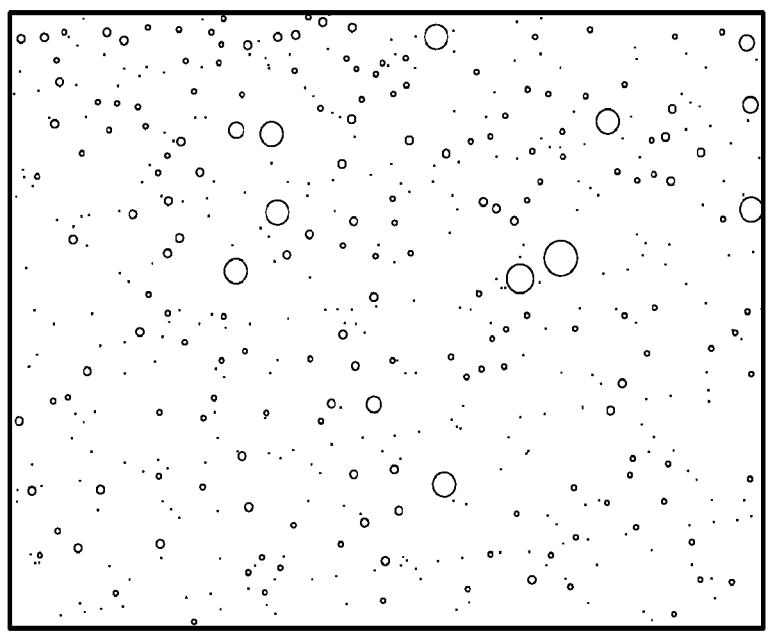
FIG. 10—Microscopic photograph (30x) of Minnelusa water in oil emulsion (4.5 mm across).

Emulsions were made by adding 3.00 grams of crude oils and 3.00 grams of distilled water in a 9 mL vial and shaking the biphasic mixtures by hand for 14 seconds followed by mixing for 2 minutes at 3,000 rpm using a Vortex mixer (FIG. 9). The emulsions were determined to be water-in-oil emulsions by optical microscopy (FIG. 10).

Continuous Oil Emulsion Breaking Experiments

A small plug of $CH_2Cl_2$ rinsed glass wool was packed into a tip of a 5 mL disposable glass pipette and 1.4 mL of Davisil grade 62 silica gel (~0.54 g, Aldrich, 150 Å pore diameter, 60-200 mesh) was added to the pipette. The silica gel was wetted with 2 mL of distilled water which was forced through and aspirated though the silica gel using a pipette bulb to remove excess water. About 6 grams of a Minnelusa crude oil emulsion were loaded onto the silica gel. The emulsion was forced through the silica gel by generating positive pressure with a pipette bulb. As the emulsion passed through the silica gel and began eluting from the pipette tip biphasic droplets were observed, which were confirmed by optical microscopy. The droplets were collected in a 9 mL vial resulting in an initial biphasic mixture of crude oil residing on a layer of colorless distilled water. As the thickness of the crude layer increased, coalesced water did not readily pass through the significantly more viscous crude layer. After the first emulsion aliquot had drained through the pipette a second 6 gram aliquot of emulsion was added to the pipette and the procedure was repeated. After passing though 11 grams of emulsion the ability of the silica gel to break the emulsions was still observed which shows that the silica gel had not become passivated. The collection vials were allowed to sit undisturbed for 3 days which allowed the trapped coalesced water to penetrate the oil layer and accumulate in the water layer. The trapped water could possibly be released faster by heating the oil and/or gentle agitation.

Figure 11:
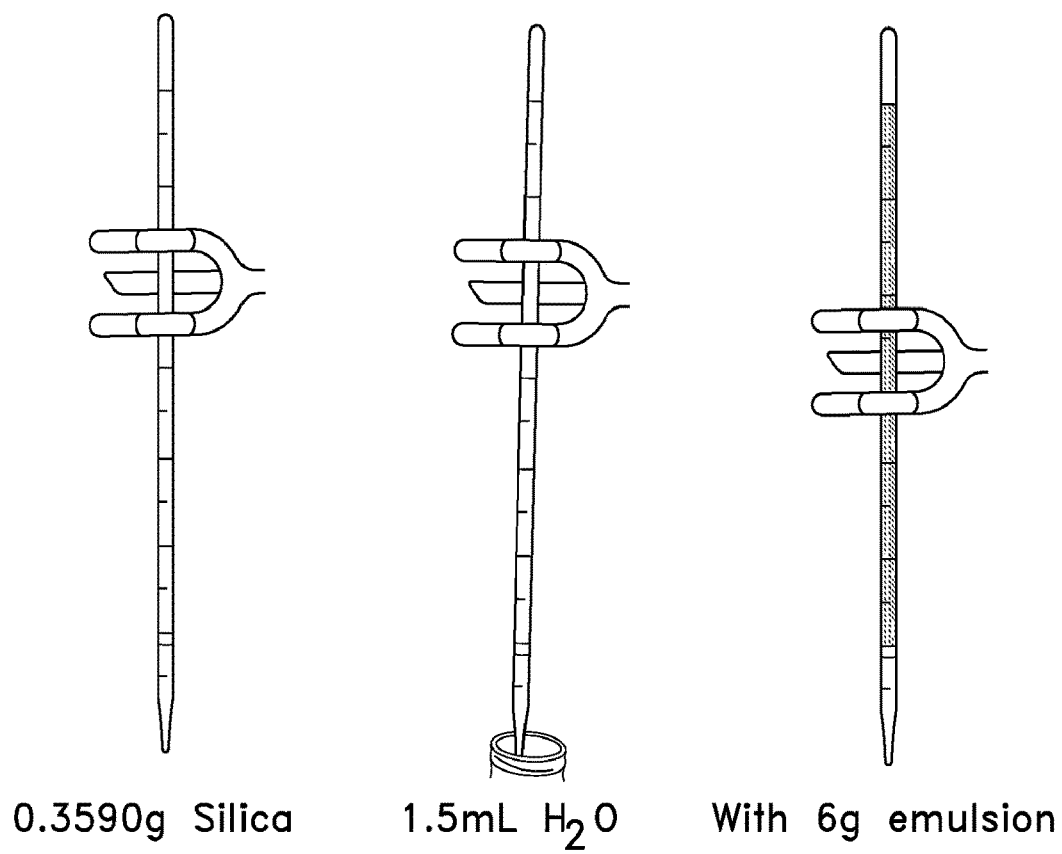
FIG. 11—Silica gel in pipette to break water in oil emulsion.
Figure 12:
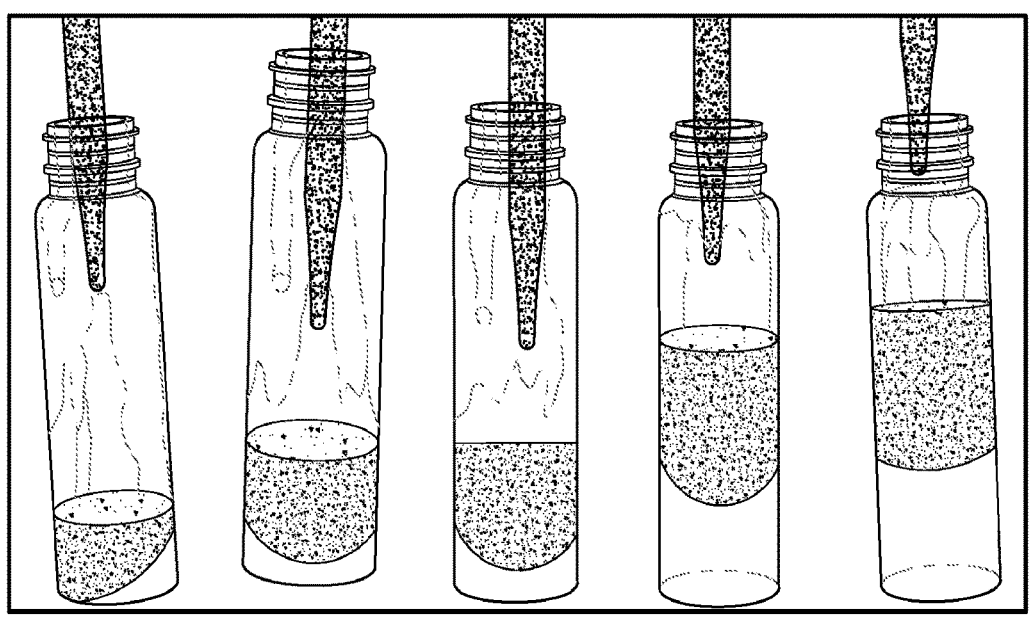
FIG. 12—Continuous flow-through demulsification experiment.
Figure 13:
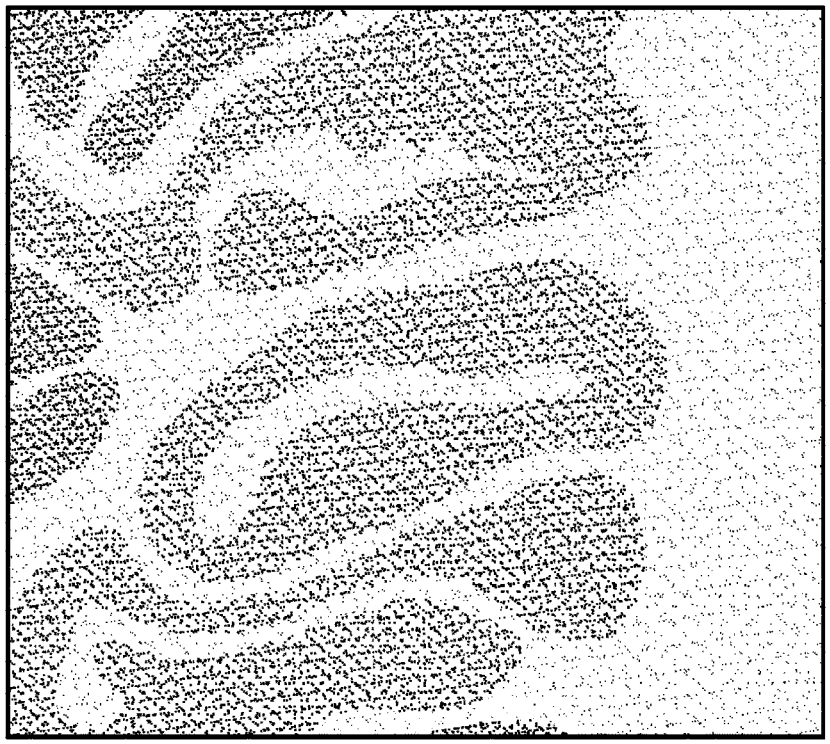
FIG. 13—Microscopic photograph (40x) showing that the flocculated asphaltenes responsible for stabilizing the emulsion are not filtered out upon breaking the emulsion: left—desalter inlet crude; right—desalter inlet crude after emulsified and the emulsion broken over silica gel.
Figure 13:
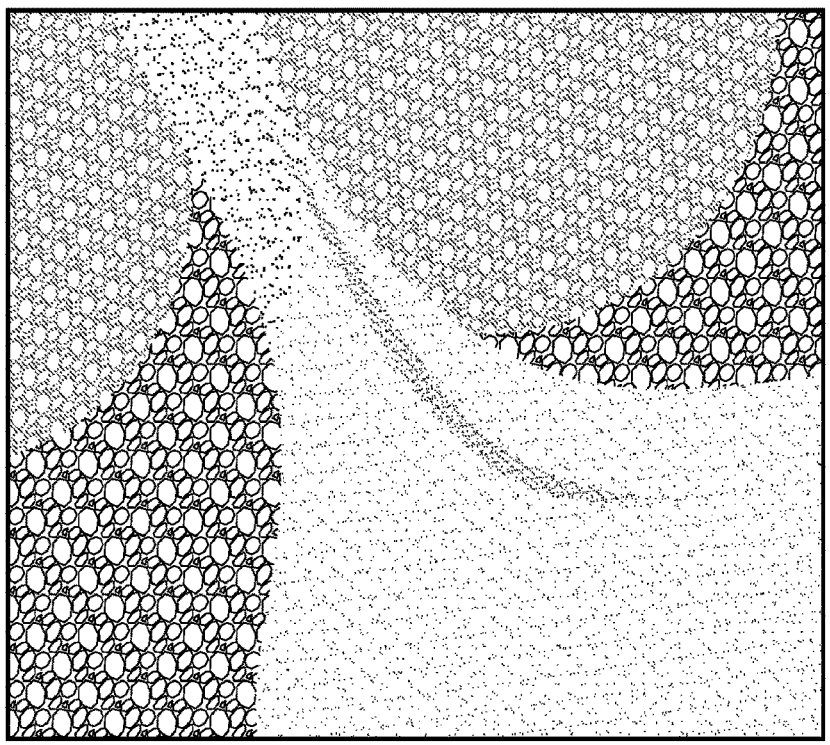

A similar experiment was performed using a lighter desalter inlet crude oil. The column was prepared in similar manner to the Minnelusa oil experiment except 1 mL (0.36 g) of grade 62 silica gel was added to the pipette and 1 mL of distilled water was used to wet the silica (FIG. 11). An emulsion was prepared as above using 3 g of a desalter inlet crude oil and 3 g distilled water. The emulsion was passed through the wetted silica gel. As with the Minnelusa oil experiment, two separate oil and water phases emerged from the bottom of the column. The oil and water separated rapidly in the collection vial due to the larger density difference between the desalter inlet crude oil and water and because the crude oil was significantly less viscous than Minnelusa (FIG. 12). It was confirmed by microscopy at 40 times magnification that the method of continuous emulsion breaking was not filtration of the emulsion stabilizing particulate. FIG. 13 shows an image of the desalter inlet crude on the right and the image on the right shows the oil after the emulsion had been broken using silica gel.

Accordingly, at least one embodiment of the inventive technology may be described as a method of destabilizing (e.g., breaking) an aqueous hydrocarbon emulsion comprising the steps of: effecting contact between a sorbent and said aqueous hydrocarbon emulsion; effecting relative motion between said sorbent and said aqueous hydrocarbon emulsion; and destabilizing said aqueous hydrocarbon emulsion. Of course, effecting as used here indicates causing the specified result in any of a variety ways (e.g., effecting contact indicates causing contact in some manner).

More particularly as to the step of destabilizing, this may be done continuously, as where (in at least one embodiment) the sorbent is neither consumed nor passivated for at least a non-negligible time. Non-negligible time may, but need not, include at least 10 seconds, at least 1 minute, at least 10 minutes, at least 1 hour, at least 12 hours, at least one day, at least one week, at least one month, or may include the time associated with 2 cycles, 5 cycles, 10 cycles, 50 cycles, 100 cycles, 1000 cycles, 10,000 cycles, 100,000 cycles and 1,000,000 cycles. In continuous destabilization embodiments, the sorbent surface may be modified the instant it comes into contact with the emulsion. Such modification— the exact nature of which may depend on, e.g., the type of emulsion, and which part of the emulsion (e.g., either the aqueous or water phase of the aqueous hydrocarbon emulsion) contacts the sorbent first—may remain throughout the continuous destabilization process, although what may change is the volume of oil or water surrounding ("encased" around) or against the sorbent surface (e.g., surface of a silica particle); such volume may reach a critical volume and then rupture, returning oil material back to the oil and the aqueous portion back to the aqueous portion. After the rupture, the modified sorbent surface is exposed to another emulsion portion, and it again has water or oil against it (e.g., around it if it is a sorbent particle), which it starts accepting more of until it again reaches a critical volume, rupturing and returning material back into their respective phases. This may be what results in a continuous destabilization. Accordingly, a "cycle" (of the continuous emulsion destabilization) may be said to start when an emulsion droplet (or other material portion) impinges on the sorbent surface and ends with the aforementioned rupture, where the surface can then accept more incoming emulsion impinging on the surface (marking the beginning of a new cycle). Even if the aforementioned rupture occurs only a few times, the resulting destabilization is said to be continuous (and during such "cycles", it is neither consumed nor passivated). Indeed, certain embodiments of the inventive technology may involve the step of cyclically destabilizing different emulsion portions. In a first cycle (whose end is marked by the aforementioned rupture), a first emulsion portion may be destabilized, then a second cycle (whose beginning is marked by the aforementioned impingement of "new" emulsion material on the sorbent surface and whose end is marked by a subsequent rupture) may be commenced, during which a second emulsion portion may be destabilized.

During such cycling, the sorbent is neither completely passivated nor completely consumed (there may be a slow, aggregated passivation that occurs throughout continual cycling for some period of time, where eventually the sorbent is passivated and the cyclical destabilization can no longer occur). The cyclical destabilization process may continue for a while (at least a plurality of cycles), perhaps assisted at least in part through a cascading effect, whereby emulsion droplets near the liberated oil or water become destabilized. Again, although indefinite emulsion destabilization may be desired, this may be hard to achieve because the sorbent may slowly become passivated and/or consumed. However, certain particular embodiments may experience only very slow, or even no, passivation and consumption of the sorbent, as where a water layer surrounding a wetted hydrophilic sorbent surface may prevent asphaltenes and/or other surface active material of the emulsion from adsorbing directly onto the sorbent surface (instead they may adsorb onto the water layer surrounding the sorbent surface). Such may, in certain embodiments, be what prevents or precludes adsorption directly onto the sorbent surface, and thus what prevents or precludes consumption or passivation of the sorbent (at least at the rate that would be seen without sorbent wetting). Essentially, in such embodiments, water may have a strong preference to adsorb onto a hydrophilic surface because it can hydrogen bond to that surface, but the asphaltenes adsorb to the water layer, not onto the sorbent. Direct adsorption onto sorbent surfaces may preclude continuous, cyclical destabilization of an emulsion, as such adsorption may require the sorbent surface to be regenerated once it becomes saturated with material.

Note that because the above-described, continuous process does not depend on added chemicals (i.e., that absorbed or entrained, e.g., into the emulsion) or thermal treatment, it may be termed chemically and thermally independent. Nonetheless, certain chemicals and/or heat treatments may indeed speed the demulsifying process, enhance or improve its effectiveness in some way, and/or create some other benefit (e.g., extend sorbent life before passivation or consumption). As such, in certain embodiments, the emulsion and/or sorbent may be heated (or more generally, thermally treated), or chemically treated (e.g., via addition of chemicals).

As mentioned, the continual demulsification, in any embodiment described herein, may involve, at least in part, a cascading demulsification, as follows: once the sorbent effects initial destabilization, a cascading effect may help to continue, ease, and perhaps expedite the destabilization. The cascading, as mentioned elsewhere herein, in certain embodiments, may be from top to bottom or from bottom to top. It may reflect a relatively large, initial resistance to destabilization that, once overcome, yields to a comparatively reduced resistance to additional destabilization. Particular embodiments of the inventive technology may exploit this phenomenon, and the sorbent, as long as additional emulsion is brought into contact therewith, may enable the cascading effect.

Contact between the sorbent and the aqueous hydrocarbon emulsion may be between the sorbent surface of a material and the aqueous hydrocarbon emulsion. Such material may be the sorbent (e.g., where the sorbent is in particle or powder, as one example), or such material may be a material other than the sorbent (as where the sorbent is infused onto, coated on, or otherwise applied onto the surface of a non-sorbent material).

More particularly as to the step of effecting relative motion between the sorbent and the aqueous hydrocarbon emulsion, such step may involve moving the sorbent (e.g., as where the sorbent is a propeller-like, or a moving blade, paddle or auger in a container of emulsion) and/or moving the emulsion (e.g., as where the emulsion is poured over a sorbent (which itself may move or be fixed, as where it is secured, perhaps to a container component or support bracket, and immovable during the demulsification process), or in the case of convectively moving the emulsion). Of course, both may occur (e.g., as where an emulsion with sorbent particles admixed is blended or agitated via a sorbent paddle, propeller, agitator, beater, blade or auger). Note that the step of effecting relative motion may need to be monitored or limited so that the relative motion does not agitate the separated hydrocarbon and water so much that the emulsion is re-created after destabilization.

Note that in certain embodiments, contact and relative motion may be effected merely by the sorbent-induced emulsion destabilization process in that upon destabilization, oil and segregated water may naturally migrate away from the sorbent surface (or an oil or water layer over such surface), only to be replaced (perhaps simply because of changes in viscosity, density or convective forces) by an additional emulsion portion to be destabilized. Note that this phenomenon may be seen only in low viscosity emulsions, and where the diffusion rate is high, and the relative emulsified droplet size is small. As such, this "diffusion" based manner of establishing contact and relative motion between the emulsion and the sorbent may be the observed phenomenon that effects the relative motion between sorbent and emulsion; as such, neither physically (e.g., where an emulsion is forcibly moved against a sorbent, or a sorbent is forcibly moved against an emulsion, or a combination of both), gravimetrically, nor convectively-induced relative motion is a required feature of the inventive technology.

Often, as mentioned, the step of effecting relative motion involves the step of physically effecting relative motion (e.g., rotating a sorbent coated paddle or auger, or pouring an emulsion against a sorbent (which may, but need not, be fixed)). However, it also, or instead, may involve convectively effecting such relative motion (e.g., where the emulsion is heated from below and thermally induced expansion and rising of the heated emulsion brings it into contact with a sorbent and causes relative motion between it and the sorbent, or where heating occurs through sunlight cycles and/or environmental temperature and convective effects ensue) and/or gravimetrically effecting relative motion (e.g., where sorbent particles that are more dense than an emulsion are dropped from above into a pool of emulsion, or where emulsion is poured through a bed of sorbent). Of course, such methods may be combined in any fashion.

Many types of sorbent may be used. In particular embodiments, the sorbent may be hydrophilic, hydrophobic, or mixed (combined) hydrophilic and hydrophobic. On a hydrophilic sorbent surface water may adsorb as ordered layers of water; asphaltenes may then adsorb onto the water. In a hydrophobic sorbent system, oil may surround the sorbent, with an asphaltene layer and water phase outside the oil. In mixed hydrophilic and hydrophobic systems, one may see penetration (or more facile penetration) of the hydrophobic/hydrophilic boundary between the oil and water layers (e.g., easier penetration of the oil/water boundary of the material in the emulsion supporting layer).

Certain hydrophilic sorbents may (likely, but not necessarily, as "hydrophilicity" may depend on the emulsion also) include hydrophilic material generally, silica, silica gel, glass, alumina, silica-alumina, zeolites, $TiO_2$, hydrated lime or lime derivatives, aluminosilicates, ceramics, metal oxides, polymers, ionic exchange resins, functionalized carbonaceous material, functionalization of these materials, and combinations of aforementioned materials, metals, acidic or basic metal catalysts, insoluble inorganic, organic, or polymeric acids or bases, ceramics, limestone, lime or lime derivatives, calcium carbonate, dolomite, sodium sesquicarbonate, sodium carbonate, glass, quartz, sand, functionalized polymers, or similar materials, and any combination of these materials.

Certain hydrophobic (likely, but not necessarily, as "hydrophobia" may depend on the emulsion also) may include hydrophobic material, PTFE, rare earth oxides, sulfides, or metal sulfides, carbonaceous materials, petroleum coke, coal, charcoal, activated carbon, graphene, graphite, carbon nanotubes, and combinations of these materials.

Certain combined hydrophilic and hydrophobic sorbents may include hydrophilic material rendered partially hydrophobic and partially hydrophilic by wetting or coating with water, alcohols, amines, silanes, phosphines, sulfides, or other chemicals, hydrophilic materials coated or impregnated with: carbonaceous material (e.g., graphene, carbon, active carbon, coke, carbon nanotubes, asphaltenes (such as adsorbed asphaltenes)), alkyl groups, arly groups, flouro groups, perfluoroaryl groups, or perflouroalkyl groups, PTFE (from PTFE emulsion or other methods), rare earth oxides, or sulfides, metal oxides coated on or impregnated with aluminosilicates, zeolites or silica-alumina, silated aluminosilicates, silica-alumina, silica, silica gel, alumina and glass. Additional mixed (hydrophobic and hydrophilic) sorbents may include (but, like other lists of materials, are not limited to) hydrophobic materials which can be rendered partially hydrophilic, PTFE modified with hydrophilic material, functionalized polymers, functionalized carbonaceous materials such as petroleum coke, coal, charcoal, graphene, graphite, carbon nanotubes, hydrophilic materials with adsorbed asphaltenes, or similar materials, and combinations of these materials. Note that the sorbent may be particle (particulate), loose, powder, granular, gelatinous, in a fixed bed, in a fluid bed, or sorbent bound to a material or membrane or surface to form an exposed sorbent surface, as but a few examples. The fixed (or moving) sorbent may be in the form of a paddle, rod, sieve, membrane, screen, propeller, auger, ported substrate, and pored substrate, as but a few examples. It may be mixed oil-wet and water-wet (biwettable)

More particularly as to the emulsion, it is may be an aqueous hydrocarbon emulsion, although this is not necessarily a required feature, as other emulsions may indeed find application of the inventive technology (e.g., food emulsions that might not include hydrocarbons, as but one example). An aqueous emulsion, not unlike a water emulsion (an emulsion that includes water among its "ingredients), includes water, in any of its many types (e.g., freshwater, saltwater, indigenous water, brine, water with additive, brine, aqueous drilling fluid solution, well flooding water, water of an intentionally created emulsion, water of an unintentional emulsion, water of an oil spill emulsion, and water of an oil contaminated emulsion as but a few examples). The hydrocarbon of the aqueous hydrocarbon emulsion may be, or comprise, asphalts, distillation residua, processed oil, crude oil, processed oil from catalytic hydrotreating, processed oil from catalytic hydroprocessing, tar sands oil, shale oil, coal oil, synthetic oil, fuel oil, diesel fuel, biologically derived oil, modified asphalt binder, modified asphalt formulation, unmodified asphalt binder, unmodified asphalt formulation, roofing shingles, fuel, caulk, and sealant. The emulsion may be (as but a few examples) a paving emulsion, a cosmetic product emulsion, pharmaceutical emulsion, oil production emulsion, oil refining emulsion, oil desalting operation emulsion, oil spill emulsion, contaminated oil emulsion, asphalt emulsion, enhanced oil recovery emulsion, intentionally created emulsion, unintentionally created emulsion, oil reservoir emulsion, enhanced oil recovery emulsion, steam emulsion, froth, foam, diesel fuel emulsion (e.g., appearing as a "cloudy" diesel), wastewater emulsion, freshwater emulsion, and saltwater emulsion. It may be referred to as an oil and water emulsion, oil in water emulsion, water in oil emulsion, bi-layer emulsion, bi-continuous emulsion, oil in water in oil emulsion, water in oil in water emulsion, foam, froth, bi-layer emulsion, micro-emulsion, macro-emulsion, mixed emulsion, fuel emulsion, asphalt emulsion, heavy oil emulsion, light oil emulsion, medium oil emulsion, cosmetics emulsion, pharmaceutical emulsion, food emulsion, personal care product emulsion, oil spill emulsion, and diesel fuel emulsion, for example.

Note that particular embodiments of the inventive technology (especially where the demulsification process does not involve heating or thermally treating the emulsion) may be said to be a comparatively lower energy method (compared to conventional demulsification techniques). Such energy conservation, as well as an absence of chemical treatment (in particular embodiments), may be reasons why embodiments of the inventive technology may be referred to as environmentally improved demulsification methods.

A closely related apparatus version of particular embodiments of the inventive technology may be referred to as an apparatus for destabilizing an aqueous hydrocarbon emulsion comprising: a sorbent; an environment for effecting contact and relative motion between said aqueous hydrocarbon emulsion and said sorbent; and an environment allowing destabilization of said aqueous hydrocarbon emulsion and segregation of hydrocarbon of said aqueous hydrocarbon emulsion from water of said aqueous hydrocarbon emulsion. The environment for effecting the aforesaid contact and relative motion may be, for example, a large container (e.g., a vat type environment) where, e.g., sorbent may be added to the emulsion, or where the emulsion may be flowed (e.g., via a pump, such that such environment may include a pump) so as to contact the sorbent (whether fixed or otherwise), as but a few examples. The environment for allowing destabilization may simply be that environment (e.g., a container environment) that enables separation, and segregation and possibly retention (for at least a short time) of the water and hydrocarbon that have been partitioned out of the emulsion during the destabilization process. As such, the environment for effecting the aforesaid contact and relative motion, and the environment allowing the aforesaid destabilization, may be the same (however, in particular embodiments, such as a ship, floating platform, or shore-based oil spill system may have an environment for effecting contact and relative motion that includes a pump that outputs into a container against a fixed or moveable sorbent, while its environment for destabilizing the emulsion may exclude the pump but include the container). Analogously to the related method technology, the environment allowing for destabilization may allow for continuous destabilization, such as sorbent non-consumptive destabilization where sorbent is, for at least a non-negligible time, including a plurality of emulsion destabilization cycles, not consumed and/or sorbent non-passivation where sorbent is, for at least a non-negligible time, including a plurality of emulsion destabilization cycles, not passivated. As with the related method, the relative motion may be effected in a variety of ways (moving the sorbent and/or moving the emulsion); relative motion may be effected physically (as where a sorbent surface is moved, or the emulsion is poured over the surface, as but two examples), convectively, diffusively, or gravimetrically. The sorbent itself, and the emulsion, may be as described elsewhere in this disclosure. Note that in certain embodiments, a container may include a rotating auger that effects contact and relative motion between the sorbent and the emulsion. As long as the auger is not rotated too fast, the auger may effect the contact and the relative motion and not re-create the emulsion. As such, the auger and the container may be the environment that effects the contact and the relative motion, and the environment that allows for destabilization.

The apparatus may further comprise an environment (again, a large container, as but one example) for chemically treating and/or thermally treating the aqueous hydrocarbon emulsion; the environment allowing for destabilization of the emulsion and the environment for chemically treating and/or thermally treating the emulsion may, of course, be the same (although they need not be, as where the emulsion is treated elsewhere, perhaps before the demulsification process where the sorbent is brought into contact with the emulsion in some manner). As mentioned, the environment allowing for destabilization may be an environment allowing for chemically independent and thermally independent destabilization.

An independent aspect of the inventive technology may be described as a method of destabilizing an aqueous hydrocarbon emulsion that comprises the steps of: effecting contact between a sorbent and said aqueous hydrocarbon emulsion; effecting relative motion between said sorbent and said aqueous hydrocarbon emulsion; and effecting at least some destabilization of said aqueous hydrocarbon emulsion through chemically independent and thermally independent effects of said sorbent on said emulsion. The contact and relative motion may be as described elsewhere in this disclosure, as may the sorbents and the emulsion itself. Indeed, the destabilization may be continuous, such as "sorbent non-consumptive" or "sorbent non-passivating". Regardless, this independent aspect may achieve an enhanced demulsification process through use of chemical and/or thermal treatment of the emulsion.

While a sorbent material's interaction (i.e., whether it is hydrophilic, hydrophobic or mixed) with an emulsion may depend on the emulsion itself, typically, where the emulsion is an aqueous hydrocarbon emulsion, the sorbents may be characterized as follows:

HYDROPHILIC MATERIALS: hydrophilic material generally, water wet sorbents, perhaps with a continuous water layer, silica, silica gel, alumina, silica-alumina, zeolites, $TiO_2$, hydrated lime or lime derivatives, aluminosilicates, ceramics, metal oxides, polymers, ionic exchange resins, functionalized carbonaceous material, functionalization of these materials, and combinations of aforementioned materials, metals, acidic or basic metal catalysts, insoluble inorganic, organic, or polymeric acids or bases, ceramics, limestone, lime or lime derivatives, calcium carbonate, dolomite, sodium sesquicarbonate, sodium carbonate, glass, quartz, sand, functionalized polymers, or similar materials, and any combination of these materials.

HYDROPHOBIC MATERIALS: hydrophobic material generally, oil wet sorbents, perhaps with a continuous oil layer, PTFE, rare earth oxides, or sulfides, carbonaceous materials, petroleum coke, coal, charcoal, activated carbon, graphene, graphite, carbon nanotubes, and combinations of these materials.

COMBINED HYDROPHILIC & HYDROPHOBIC MATERIALS: combined hydrophilic and hydrophobic material generally, hydrophilic material rendered partially hydrophobic, hydrophilic material rendered partially hydrophobic and partially hydrophilic by wetting or coating with water, alcohols, amines, silanes, phosphines, sulfides, or other chemicals, hydrophilic materials coated or impregnated with: carbonaceous material (e.g., graphene, carbon, active carbon, coke, carbon nanotubes, asphaltenes (such as adsorbed asphaltenes)), alkyl groups, aryl groups, flouro groups, perfluoroaryl groups, or perflouroalkyl groups, PTFE (from PTFE emulsion or other methods), rare earth oxides, or sulfides. Other sorbents which are generally hydrophobic but can be rendered partially hydrophilic are rare earth oxides and other naturally hydrophobic metal oxides coated on or impregnated with silica, silica gel, alumina, aluminosilicates, zeolites or silica-alumina. Other materials that are hydrophobic but which can be rendered partially hydrophilic are PTFE, carbonaceous materials such as petroleum coke, coal, charcoal, graphene, graphite, carbon nanotubes, or similar materials, modified with hydrophilic materials mentioned above, polymers, and carbonaceous materials such as petroleum coke, coal, charcoal, graphene, graphite, carbon nanotubes, or similar materials, which have been functionalized, and combinations of these materials. It is note that, of the several possible sorbent materials listed or otherwise indicated anywhere in this disclosure (whether as presented as finding use alone or as a coating on a material, or as an impregnation or coating intended to render a hydrophilic material hydrophobic (or vice versa)), each of such sorbents may find application alone, or as coatings or impregnations on a different material (whether to render a hydrophilic material hydrophobic (or vice versa), or not). Indeed, a wide variety of combined materials, in addition to a wide variety of materials used alone, are envisioned as finding possible use in this inventive technology.

Note that, technology described in any of U.S. Pat. Nos. 7,875,464; 8,241,920; 8,273,581; 8,530,240; 8,367,425; and 8,492,154, each of which are incorporated herein in its entirety, may find application relative to the inventive technology disclosed herein, whether in determining asphaltenic component makeup to predict which sorbent would work best, or to assessing the effectiveness of a destabilization operation, as but two examples.

Possible Desalter Configurations for a Chemechanical Demulsifier Device

Figure 14:
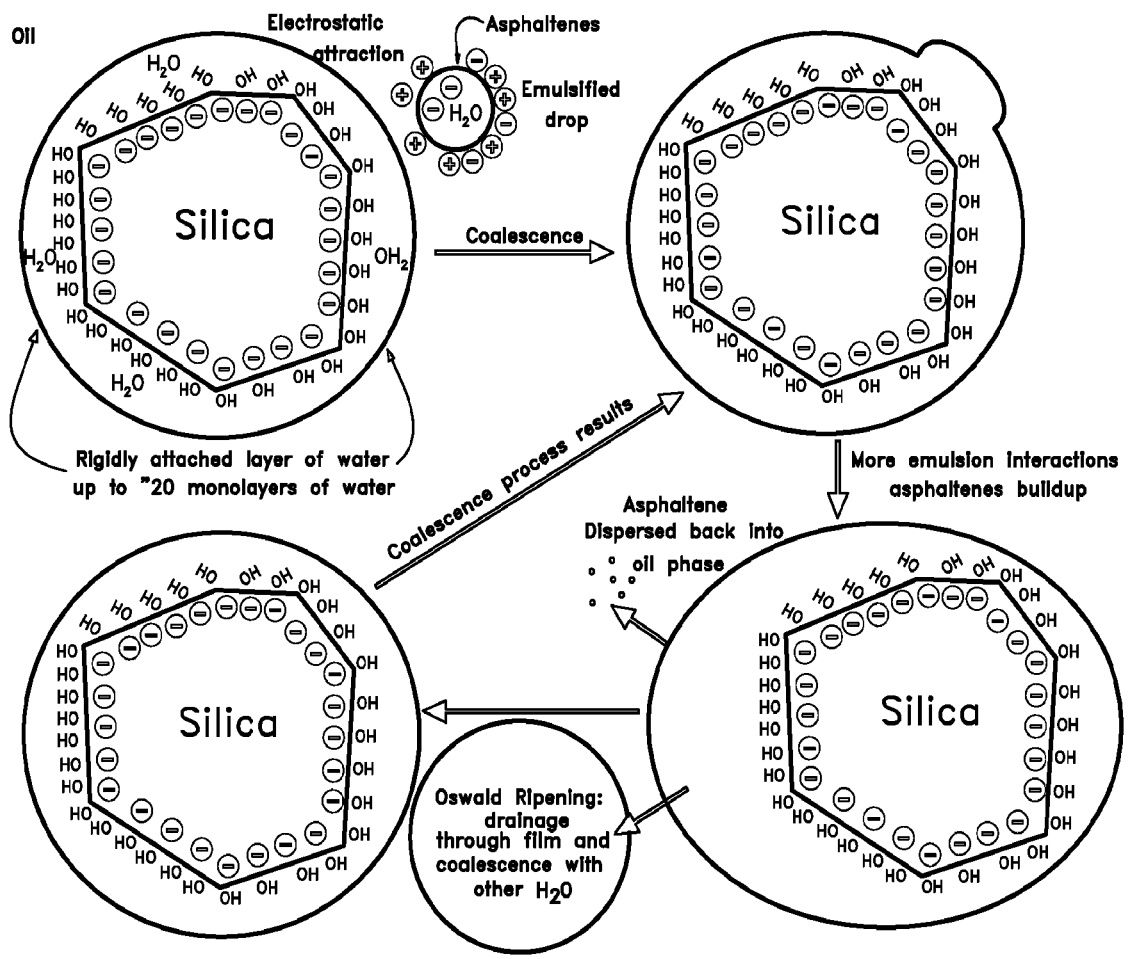
FIG. 14—Possible mechanism for continuous sorbent-based emulsion destabilization FIG. 15—Three possible configurations of bound silica substrate surfaces to disrupt emulsions in a refinery desalter unit.

It is well known that due to ionizable acid-base functional groups asphaltene aggregates are charged in aqueous solutions and they have even been demonstrated to have a net +1 charge in nonaqueous solutions. One of the potential mechanism for the coalescence of emulsified water droplets is shown in FIG. 14. It can be envisioned that the charged asphaltene layer stabilizing an emulsion droplet becomes attracted to a charged surface supporting several water monolayers, such as the negatively charged surface of silica (other surfaces such as limestone and dolomite would have a positive charge, and other surfaces have mixed positive and negative regions). As the emulsion droplet becomes attracted to the silica the attractive forces of the water layers supported by the silica surface (through hydrogen-bonding) and those inside the droplet coalesce as the asphaltene layer attempts to spread out over the water-coated negatively charged silica surface. This process continues and the emulsifying asphaltenes are attracted to the water supported on silica until a critical amount of water is trapped around the silica which must drain past the asphaltene layer through Ostwald ripening, because it has become too large to be supported in an orderly manner by the silica. Upon draining the emulsifying asphaltene layer thickens and is not supported as a thin layer, disrupting what was once the asphaltene emulsion skin, allowing a portion of it be released into the oil phase. This effectively regenerates the water supported silica surface for further coalescence.

Figure 15:
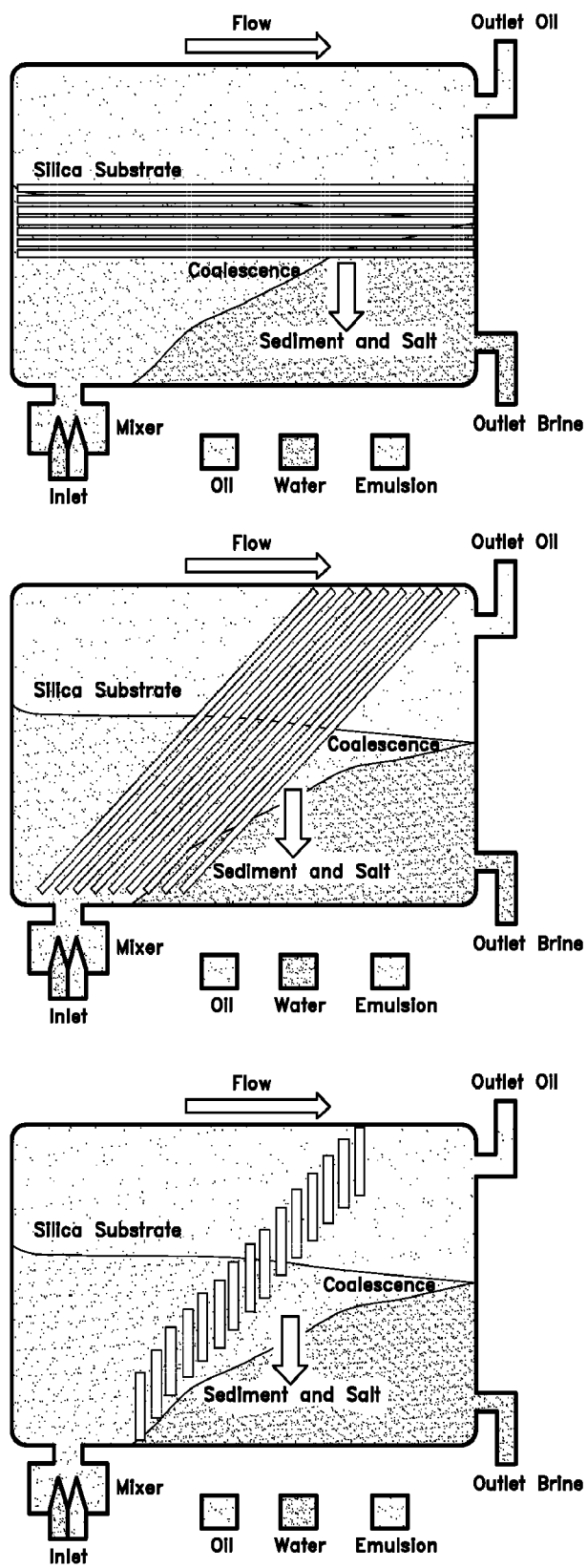

Three possible configurations for passive bound sorbent deployment in a refinery demulsifier are illustrated in FIG. 15, which shows conceptual designs of how a desalter unit could be fitted with surface coalescing material in a continuous flow configuration. At critical points along the emulsion flow the emulsion needs to impinge on the surface facilitating coalescence. The coalesced droplets of oil and water should further help in aiding the coalescence of the surrounding emulsion. Since this method does not remove asphaltenes, and other emulsion stabilizing material, it is important to consider the flow path and rates within the system so that coalesced water and oil do not inadvertently remix to reform emulsions. A cascade from top to bottom or bottom to top is preferred so that liberated water or oil can efficiently escape into the brine or desalted layers. This should also help to facilitate liberating of solids into the brine layer reducing catastrophic sludge/pudding formation. The inventive concept is not limited to these configurations or to passive devices. A majority of the emulsion must contact silica or other bound surface (ports, flow direction, flow rates, angle, rods or array, propeller, auger, etc.)

Figure 16:
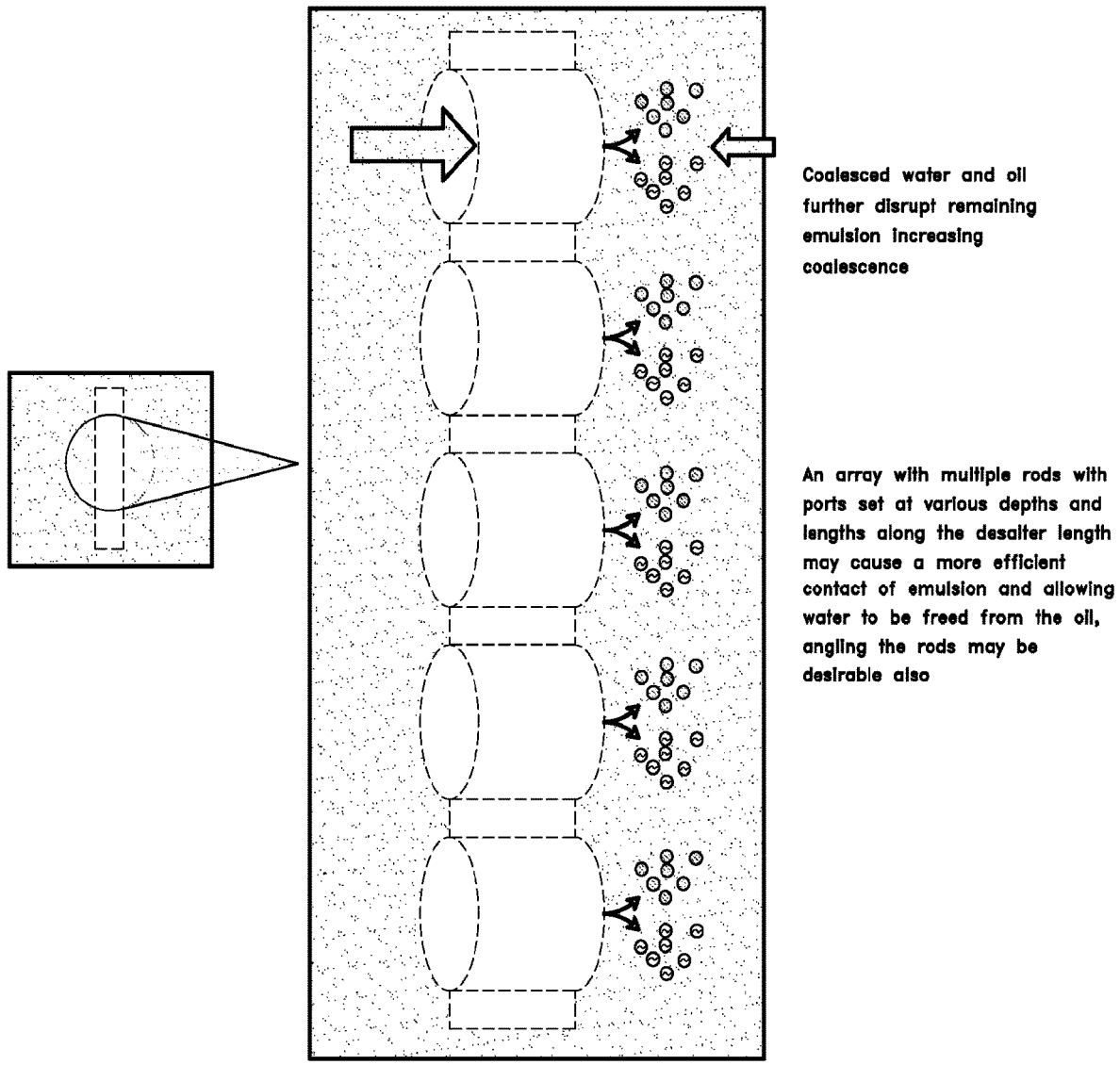
FIG. 16—Silica substrate configuration with ports.

The resulting coalesced water must be directed away from the oil so that it does not become entrained allowing it to drain into the water and be expelled with the effluent (critical for heavier more viscous oils). A silica substrate with large ports instead of pores is illustrated in FIG. 16 as one design that could facilitate contact of the emulsion with a surface while allowing coalesced water and oil to separate from each other and may be more efficient if their supports are angled. Ports are possibly preferred over pores so that clogging does not become an issue as with ultrafiltration membranes. An array of multiple silica rods fitted with ports can be positioned at various lengths and depths along the desalter length to enhance emulsion contact with the silica surface allowing water to be efficiently liberated.

Similar configurations can be envisioned for cleaning waste water contaminated by petroleum and contaminated water from oil spills. It is possible to configure waste water storage tanks, pump systems used to recover spilled crude oil, and skimmers into a similar flow system allowing the emulsified or contaminated water to impinge at the surface to destabilize emulsions. This application may also be used to treat cloudy diesel caused by very fine droplets of emulsified water.

Mixed hydrophilic/hydrophobic membranes have been demonstrated to efficiently interact at the oil/water interfaces, destabilizing the layer of material which stabilized the droplet and allowed the entrapped water to drain away from the material (Kota et al. 2012). Particles that have mixed oil-wet and water-wet (bi-wettable) character accumulate better at oil/water interfaces than do purely hydrophilic or hydrophobic particles. Therefore, particles that are bi-wettable should be more effective at penetrating and disrupting the oil/water interface facilitating drainage of entrained water within the emulsion.

Partial Coalescence of Emulsions Using Silica Gel, Alumina, and Polytetrafluoroethylene (PTFE)

A portion of 0.200 g of Davisil grade 62 silica gel, activated Brookman alumina (neutral, acidic, and basic, 150 Å pore diameter, 150 mesh, Aldrich), and ground PTFE (60-100 mesh) were added to different vials containing 6 grams of Minnelusa oil emulsion (as prepared above). The mixtures were left undisturbed at ambient temperature. For the emulsion treated with basic alumina the alumina accumulated at the bottom of the vial with a layer of coalesced water around it after about 1 hour. For the emulsions treated with acidic and neutral alumina, significant buildup of alumina with coalesced water did not appear until after 3 days which was visible on the sides of the vials. For the emulsion treated with ground PTFE no coalescence was observed for the time scale of the treatment. For all the samples the amount of coalesced water increased over the course of two weeks.

As a brief summary of certain of the many possible sorbents that may find application in the inventive technology: hydrophilic: silica, alumina, silica-alumina, zeolites, $TiO_2$, hydrated lime or lime derivatives, ceramics, metal oxides. These sorbents may be rendered partially hydrophobic by wetting with water. Others include hydrophobic or partially hydrophobic: silane coated silica or alumina; hydrophilic substrates that are alkyl, flouro, or perflouroalkyl functionalized; hydrophilic surfaces coated with PTFE (from PTFE emulsion or other methods); hydrophilic surfaces coated with other naturally hydrophobic material such as rare earth oxides, other metal oxides, or sulfides. Examples of other sorbents which may be particularly useful include but not limited to metals, ceramics, zeolites, clays, limestone, lime or lime derivatives, calcium carbonate, dolomite, sodium sesquicarbonate, sodium carbonate, glass, quartz, sand, alumina, metal oxides, alumina silicates, metal oxides impregnated on alumina or silica or zeolites or alumina silicates, or high surface energy carbonaceous materials such as petroleum coke, coal, charcoal, activated carbon, or similar materials. Other sorbents such as salts or acids or bases might be useful also. Surfaces made up of a combination of hydrophilic and hydrophobic materials such as metal oxides and rare earth oxides can offer substantially longer life than membranes coated with a thin layer of polymers. The hydrophobicity of rare-earth metal oxides is discussed in Azimi et al. (2013).

The use of this concept is not limited to refinery desalter units. Other applications could include oil field and other petroleum industry related water treatment and oil spill residues. Emulsion formation and destabilization is a major consideration in the use of dispersants to clean oil spills in both fresh and salt water. Embodiments herein could be used in conjunction with conventional oil spill clean up, or even as an alternative entirely to such conventional technologies. Other applications could include the food industry such as salad dressings spreads, dips, cheeses, milk and milk substitutes. Other applications could apply to the and pharmaceutical industries, and also the formulation of various hand creams, shampoos, conditioners, liquid soaps, and detergents. Accordingly, any of the inventive technologies described herein is not limited to application to destabilization of aqueous hydrocarbon emulsions. Indeed, several other types of emulsion (e.g., food oil and water emulsion (e.g., canola oil, sunflower oil, safflower oil, olive oil, soybean oil, etc.) may be broken or destabilized using embodiments of the inventive technology (upon use of an appropriate sorbent). Cosmetics products emulsion also may find application of the inventive technology. More generally, in certain embodiments, the inventive technology may be said to be useful in destabilizing aqueous emulsions (which are in emulsion with at least one other emulsion ingredient).

As can be easily understood from the foregoing, the basic concepts of the present invention may be embodied in a variety of ways. It involves both emulsion stability related techniques as well as devices to accomplish the appropriate destabilization/stabilization. In this application, the emulsion stability-related techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this provisional application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "destabilizer" should be understood to encompass disclosure of the act of "destabilizing"—whether explicitly discussed or not—and, conversely, were there effectively disclosure of the act of "destabilizing", such a disclosure should be understood to encompass disclosure of a "destablizer" and even a "means for destabilizing" Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of references below or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

U.S. PATENTS

| Patent Number | Kind Code | Pub/Issue Date | Inventor/Applicant |
| --- | --- | --- | --- |
| 6,773,921 | | Aug. 10, 2004 | Schabron et al. |
| 462,804 | | Dec. 9, 1986 | Maes |
| 4,493,765 | | Jan. 15, 1985 | Long, et al. |
| 5,092,983 | | Mar. 3, 1992 | Eppig, et al. |
| 5,574,215 | | Nov. 12, 1996 | Bunger, et al. |
| 5,861,228 | | Jan. 19, 1999 | Descales, et al. |
| 4,990,773 | | Feb. 5, 1991 | Supernaw et al. |
| 5,969,237 | | Oct. 19, 1999 | Jones et al. |
| 4,865,741 | | Sep. 12, 1989 | Nolte et al. |
| 4,988,446 | | Jan. 29, 1991 | Haberman et al. |
| 7,875,464 | B2 | Jan. 25, 2011 | Schabron et al. |
| 4,634,680 | | Jan. 6, 1987 | Kingsley |
| 8,241,920 | B2 | Aug. 14, 2012 | Schabron et al. |
| 8,273,581 | B2 | Sep. 25, 2012 | Schabron et al. |
| 4,006,077 | | 1977 Feb. 1 | Wegner et al. |
| 4,036,732 | | 1997 Jul. 19 | Iranietal. |

-continued

U.S. PATENTS

| Patent Number | Kind Code | Pub/Issue Date | Inventor/Applicant |
| --- | --- | --- | --- |
| 4,088,540 | | 1978 May 9 | Bunas |
| 4,101,415 | | 1978 Jul. 18 | Crowley |
| 4,125,459 | | 1978 Nov. 14 | Garwin |
| 4,395,330 | | 1983 Jul. 26 | Aubior et al. |
| 4,403,765 | | 1983 Sep. 13 | Billion et al. |
| 4,419,219 | | 1983 Dec. 6 | Long et al. |
| 4,422,926 | | 1983 Dec. 27 | Gould et al. |
| 4,424,114 | | 1984 Jan. 3 | Murrell et al. |
| 4,498,971 | | 1985 Feb. 12 | Angelov et al. |
| 4,502,944 | | 1985 Mar. 5 | Nelson |
| 4,502,950 | | 1985 Mar. 5 | Ikematsu et al. |
| 4,514,287 | | 1985 Apr. 30 | Ikematsu et al. |
| 4,514,787 | | 1985 Apr. 30 | Kaneko et al. |
| 4,525,269 | | 1985 Jun. 25 | Ikematsu et al. |
| 4,572,781 | | 1986 Feb. 25 | Krasuk et al. |
| 4,765,885 | | 1988 Aug. 23 | Sadeghi et al. |
| 4,810,367 | | 1989 Mar. 7 | Chombart et al. |
| 4,816,140 | | 1989 Mar. 28 | Trambouze et al. |
| 4,888,108 | | 1989 Dec. 19 | Farnand |
| 5,124,025 | | 1992 Jun. 23 | Kolstad et al. |
| 5,124,026 | | 1992 Jun. 23 | Taylor, et al. |
| 5,152,886 | | 1992 Oct. 6 | Paris-Marcano |
| 5,258,117 | | 1993 Nov. 2 | Kolstad et al. |
| 5,326,456 | | 1994 Jul. 5 | Brons et al. |
| 5,893,302 | | 1999 Apr. 13 | Strom |
| 5,944,010 | | 1999 Aug. 31 | Hoffschmidt et al. |
| 5,944,984 | | 1999 Aug. 31 | Benguigui et al. |
| 7,223,603 | B2 | 2007 May 29 | Rovani, Jr. et al. |
| 7,718,049 | B2 | 2007 May 18 | Strack et al. |
| 7,736,900 | B2 | 2010 Jun. 15 | Pauli, et al. |
| 7,981,277 | B2 | 2011 Jul. 19 | Subramaniau et al. |
| 8,530,240 | B1 | 2013 Sep. 10 | Schabron et al. |
| 8,367,425 | B1 | 2013 Feb. 5 | Schabron et al. |
| 8,492,154 | B1 | 2013 Jul. 23 | Schabron et al. |

U.S. PATENT APPLICATION PUBLICATIONS

| Publication Number | Kind Code | Pub/Issue Date | Inventor |
| --- | --- | --- | --- |
| 20030211621 | A1 | Nov. 13, 2003 | Rovani et al. |
| 20110066441 | A1 | Mar. 17, 2011 | Ovalles et al. |
| 20110062058 | A1 | Mar. 17, 2011 | Rogel et al. |
| 20110120950 | A1 | May 26, 2011 | Schabron et al. |
| 20120160015 | A1 | Jun. 28, 2012 | Ovalles et al. |
| 20120016168 | A1 | Jan. 19, 2012 | Schabron et al. |
| 20030221992 | A1 | Dec. 4, 2003 | Gorbaty et al. |
| 20060113218 | A1 | Jun. 1, 2006 | Hart et al. |
| 20080230442 | A1 | Sep. 25, 2008 | Iqbal et al. |
| 20110215030 | A1 | Sep. 8, 2011 | Corscadden |
| 20110266198 | A1 | Nov. 3, 2011 | Hassan et al. |

FOREIGN PATENT DOCUMENTS

| Patent No. | Kind Code | Country | Pub/Issue Date |
| --- | --- | --- | --- |
| 2011113017A2 | A2 | WO | Sep. 15, 2011 |
| 0077120A2 | A2 | WO | Dec. 21, 2000 |
| 0077120A3 | A3 | WO | Dec. 21, 2000 |
| 02063292A1 | A1 | WO | Aug. 15, 2002 |
| 03096011A1 | A1 | WO | Nov. 20, 2003 |
| 400989A | A | EP | May 12, 1990 |
| 2011032123A2 | A2 | WO | Mar. 17, 2011 |
| 2011032125A2 | A2 | WO | Mar. 17, 2011 |

NON-PATENT LITERATURE DOCUMENTS

Nonpatent Literature Reference Document

"Energy and Environmental Profile of the US Petroleum Refining Industry," 1988, Prepared by Energetics Inc. for U.S. Department of Energy Office of Industrial Technologies, pp 4-5, 27, 33, 49 and 62-63.

"Standard Test Method for Molecular Weight (Relative Molecular Mass) of Hydrocarbons by Thermoelectric Measurement of Vapor Pressure," ASTM Designation: D 2503-82 (Reapproved 1997), 871-873.

Andersen, S. I. et al., 1991, "Aggregation of Asphaltenes as Determined by calorimetry," Journal of Colloid and Interface Science, 142, 497-502, 1991.

Barton, A. F., 1974, "Solubility Parameters," Chemical Reviews, 75 (6), 731-753.

Bodusynski, M. M. et al., 1982, Separation of Solvent-Refined Coal into Solvent-Derived Fractions, Analytical Chemistry, 54, 372-375.

Burrell, H., 1955, "Solubility Parameters" Interchemical Review, 3-16

Carrier, H. et al; "Acoustic method for measuring asphaltene flocculation in crude oil", Journal of Petroleum Science and Engineering, pp 111-117

Cartz, L., ch. 3, Utrasonic Testin, Nondestructive Testing, 1995, pp. 81-98.

Del Bianco, A. et al., 1993, Thermal Cracking of Petroleum Residues 1. Kinetic Analysis of the Reaction. Fuel, 72 (1), 7-80.

Heithaus, J. J., 1962, "Measurement and Significance of Asphaltene Peptization," Journal of the Institute of Petroleum 48 (458), 45-53

Hildebrand, J. H. et al., 1970, "Regular and Related Solutions" Van Nostrand Reinhold, NY, pp 24-27, pp 152-153, pp 212-215

Jones et al. "Development of an ultrasonic oil stability monitor for the assessment of asphaltene aggregation inhydrocarbon stream", Proceed. Intern. Conf. Mitigat. Heat Exch. Foul. Econ. Envir. Implic. Banff, AB, Canada, July, 1999, 84-94

Long, R. B. et al., 1989, "Studies in Petroleum Composition" Revue de Institute Francais du Petrole, abstract Long, R. B., 1979, "The Concept of Asphaltenes" Preprints, Div. Petroleum Chemistry, American Chemical Society, 24, 891-901

Magaril, R. Z. et al., 1968, Study of the Mechanism of Coke Formation in the Cracking of Petroleum Resins, International Chemical Engineering 8 (4), 727.

McClements, D. J., "Ultrasonic Measurements in Particle Size Analysi", University of Massachusetts, Amherst, USA, Encyclopedia of Analytical Chemistry (Applications, Theory and Instrumentation) pp 5581-5587

Pal R. et al., 1989, Viscosity/Concentration Relationships for Emulsions. Journal of Rheology, 33 (7), 1021-1045.

Pauli, A. T. 1996, "Asphalt Compatibility Testing Using the Automated Heithaus Titration Test" Preprints, Division of Fuel Chemistry, American Chemical Society, 41 (4), 1276-1281.

Pauli, A. T. et al., 1998, Relationships Between Asphaltenes, Heithaus Compatibility Parameters, and Asphalt Viscosity. Petrol. Science and Technology, 16 (9&10), 1125-1147.

Scatchard, G. 1931, "Equilibria in Non-Electrolyte Solutions in Relation to the Vapor Pressure and Densities of the Components" Chemical Reviews, 321-333

Pauli, A. T. et al., "Stability and Compatibility Testing of Petroleum and Asphalt" American Laboratory, September 2003, 2 pages Phillips, C. R, et al. 1985, Kinetic Models for the Thermal Cracking of Athabaska Bitumen, Fuel 64(5), 678-691

Schabron, J. F. et al. "Coking indexes using the Heithaus titration and asphaltene solubility," Preprints—American Chemical Society, Division of Petroleum Chemistry (1999), 44(2), 187-189

Schabron, J. F. et al., 1998, "The Solubility and Three-Dimensional Structure of Asphaltenes" Petroleum Science and Technology, 16 (3-4), 361-376

Schabron, J. F. et al., 1999 "Petroleum Residua Solubility Parameter/Polarity Map: Stability Studies of Residua Pyrolysis" Department of Energy Report under contract # DE-FC26-98FT40322 Task, 1.2, 24 pages.

Schabron, J. F. et al., 2000 "Deposition from Heavy Oils" Department of Energy Report under contract # DEFC26-98FT40322, 35 pages Schabron, J. F. et al., 2001b, Molecular Weight/Polarity Map for Residua Pyrolysis, Fuel, 80 (4), 529-537.

Schabron, J. F. et al., 2001c, Non-Pyrolytic Heat Induced Deposition from Heavy Oils, Fuel, 80 (7) 919-928.

Schabron, J. F., et al., 2002b, Residua Coke Formation Predictability Maps, Fuel, 81 (17) 2227-2240.

Schabron, J. F. et al., 2001a, Predicting Coke Formation Tendencies, Fuel, 80 (10) 1435-1446.

Schabron, J. F. et al., 2002a, Characterization of Residua During Pyrolysis, Preprints, Div. of Petroleum Chemistry, American Chemical Society, 47 (1), 17-21.

Schabron, J. F. et al., 1993, "The Characterization of Petroleum Residua" U.S. Dept of Energy Report under contract # DE-FC21-86MC110761, 68 pages.

Schabron, J. F. et al, 2002, "Coke Formation Process Model for Petroleum Refining Efficiency Improvement", US Department of Energy Report DE/FG36/01G011018, 18 pages Schabron, J. F. et al, 2002, "Coke Formation Process Model For Petroleum Refining Efficiency Improvement", US Department of Energy Report under contract # DE/FG36/01G011018, 40 pages Schabron, J. F. et al., 2004, Refinery Efficiency Improvement Ultrasonic Spectroscopy and WRI Coking Indexes, WRI Report 04-R009 to DOE under Cooperative Agreement DE-FC26-98FT40322

Singh, I. D., V. Kothiyal, V. Ramaswamy, and R. Krishna, 1990, Characteristic Changes of Asphaltenes During Visbreaking of North Gujarat Short Residue. Fuel, 69 (3), 28-292.

Small, P. A., 1953, "Some Factors Affecting the Solubility of Polymers" Journal of Applied Chemistry, 71-80

Snyder, L. R., 1968, "Principles of Adsorption Chromatography" Marcel Dekker, Inc., New York, pp. 125-131 and 155-181

Snyder, L. R., 1968, "Principles of Adsorption Chromatography" Marcel Dekker, Inc., New York, pp. 155-199

Snyder, L. R., 1968, "Principles of Adsorption Chromatography" Marcel Dekker, Inc., New York, 206-210

Wiehe, I. A., 1993, A Phase-Separation Kinetic Model for Coke Formation, Ind. Eng. Chem. Res., 32 (11), 244-2454.

Wiehe, I. A., 1996, "Two-Dimensional Solubility Parameter Mapping of Heavy Oils" Fuel Science and Technology International, 14 (1&2), 289-312

Bodusynski, M. S. et al., 1987, "Composition of heavy petroleums: 1. molecular weight, hydrogen deficiency, and heteroatom concentration as a function of atmospheric equivalent boiling point up to 1400 degrees F." Energy & Fuels, 1, 2-11.

Schabron, J. F., et al., 2006, "Initial studies using ultrasonic spectroscopy for monitoring changes in residua with pyrolysis," Fuel 85, 2093-2105.

Chiantore, Oscar and Simonelli, Alessandra, "Precipitation-redissolution Liquid Chromatography of Styrene-ethyl Acrylate Copolymers," Polymer Engineering and Science, August 1999, Vol. 39 No. 8, p. 1383-1388.

Cortell, Jessica M. et al., "Influence of Vine Vigor on Grape (Vitis vinifera L. Cv. Pino Noir) Anthrocyanins. 2. Anthocyanins and Pigmented Polymers in Wine," J. Agric. Food Chem. 2007, 55, p. 6585-6595.

Aske, Narve et al.; "Determination of Saturate, Aromatic, Resin, and Asphaltenic (SARA) Components in Crude Oils by Means of Infrared and Near-Infrared Spectroscopy," Energy & Fuels, 2001, 15, 1304-1312.

Corbett, L. W., "Composition of Asphalt Based on Generic Fractionation, Using Solvent Deasphaltening, Elution-Adsorption Chromatography, and Densimetric Characterization," Analytical Chemistry, p. 576

McCarthy, James E. et al.; "EPA's Regulation of Coal-Fired Power: Is a "Train Wreck" Coming?", Congressional Research Service, CRS Report for Congress, Aug. 8, 2011, 7-5700, R41914.

"Standard Test Method for n-Heptane Insulbles1", Designation: D 3279-97 (Reapproved 2001)

"Standard Test Method for Separation of Asphalt into Four Fractions 1," ASTM International, Designation D4124-09.

Schabron, J. F., et al., "Asphaltene Determinator Method for Automated On-Column Precipitation and Redissolution of Pericondensed Aromatic Asphaltene Components," Energy Fuels 2010, 24, 5984-5996, DOI: 10.102/ef100822f.

Fan, T. et al., "Rapid and Accurate SARA Analysis of Medium Gravity Crude Oils," Energy & Fuels 2002, 16, 1571-1575.

Schabron, J. F., et al., "On-column precipitation and re-dissolution of asphaltenes in petroleum residua," Fuel 87 (2008) 165-176.

Grizzle, Patrick L, et al., "Automated Liquid Chromatographic Compound Class Grou-Type Separation of Crude Oils and Bitumens Using Chemically Bonded Aminosilane," Anal. Chem. 1986, 58, 2389-2396.

Jewell, D. M. et al., "Ion-Exchange, Coordination, and Adsorption Chromatographic Separation of Heavy-End Petroleum Distillates," Laramie Energy Research Center, Analytical Chemistry, vol. 44, No. 8, July 1972, p 1391.

Jiang, C et al., "TLC-FID (Iatroscan) analysis of heavy oil and tar sand samples," Organic Geochemistry 39 (2008) 1210-1214.

Karlsen, D. A. et al., "Analysis of petroleum fractions by TLC-FID: applications to petroleum reservoir description," Org. Geochem. Vol. 17, No. 5, pp. 603-617, 1991.

Kharrat, A. et al., "Issues with Comparing SARA Methodologies," Energy & Fuels 2007, 21, 3618-3621.

Masson, J-F et al., "Dynamics of Bitumen Fractions by Thin-Layer Chromatography/Flame Ionization Detection," Energy & Fuels 2001, 15, 955-960.

Radke, M et al., "Preparative Hydrocarbon Group Type Determination by Automated Medium Pressure Liquid Chromatography," Anal. Chem. 1980, 52, 406-411.

Schabron, J. F. et al.; "Petroleum Processing Efficiency Improvement," Topical Report, May 2011

Wiehe, Irwin A. et al.; "The Oil Compatibility Model and Crude Oil Incompatibility," Energy & Fuels 2000, 14, 56-59.

Fan, Z et al.; "Challenges in Processing Bitumens and Heavy Oils," Prepr. Pap.-Am. Chem. Soc., Div. Petr. Chem. 2009, 54 (1), 4.

"Canada regulator approves Enbridge diluent Line," Reuters, Business & Financial News, Feb. 19, 2008, Calgary, Alberta.

"Opportunity Crudes Report II: Technologies and Strategies for Meeting Evolving Market and Environmental Challenges," Hydrocarbon Publishing Company, an updated and expanded study of the 2006 report titled "Opportunity Crudes: Technical Challenges and Economic Benefits."

U.S. Provisional Application No. 60/711,599, filed Aug. 25, 2005, entitled Rapid Determination of Asphaltenes and the Cyclohexane Soluble Portion of Asphaltenes by Automated On-Column Precipitation and Re-Dissolution; Specification 24 pages, Drawings 8 pages http://www.specialchem4adhesives.com/resources, Determining Critical Surface Tension of Solid Substrates, printed Sep. 13, 2011, 3 pages Energy Information Administration/Capacity Report 2001

Robinson, P. R., Petroleum Processing Overview, Practical Advances in Petroleum Processing 2006:1-78

Rogel, E. et al. Asphaltene Stability in Processed Samples using Solubility Profile Analysis, Prepr. Pap.-Am. Chem. Soc. Div. Pet. Chem. 2011, 56(1), 3

Ovalles, C. et al. Characterization and Preparative Separation of Heavy Crude Oils, their fractions and thermally Cracked Products by the Asphaltene solubility Fractions Method, Prepr. Pap.-Am. Chem. Soc. Div. Pet. Chem. 2011, 56(1), 8

Schabron J. F. et al., Total Pericondensed Aromatic (TPA) Determination as an Alternative to Gravimetric Asphaltenes, Prepr. Pap.-Am. Chem. Soc. Div. Pet. Chem. 20011, 56(1), 38

Rogel, E. et al. Determination of Asphaltenes in Crude Oil and Petroleum Products by the on Column Precipitation Method, Energy Fuels 2009, 23, 4515-4521

Ovalles, C. et al. Characterization of Heavy Crude Oils, Their Fractions, and Hydrovisbroken Products by the Asphaltene Solubility Fraction Method, dx.doi.org/10.1021/ef201499f|Energy Fuels 2012, 26, 549-556, Published: Dec. 7, 2011

Lopez-Linares, F. et al. Adsorption of Athabasca Vacuum Residues and Their Visbroken Products over Macroporous Solids: Influence of Their Molecular Characteristics, dx.doi.org/10.1021/ef201047z|Energy Fuels 2011, 25, 4049-4054, Published Aug. 17, 2011

Rogel, E., Asphaltene Chemical Characterization as a Function of Solubility: Effects on Stability and Aggregation, dx. doi.org/10.1021/ef2013979|Energy Fuels, Published Nov. 7, 2011

Schabron, J. F. et al. The Waxphaltene Determinator Method for Automated Precipitation and Re-Dissolution of Wax and Asphaltene Components, Energy Fuels, Article ASAP, DOI: 10.1021/ef300184s, Feb. 27, 2012

Ovalles, C. et al. Predicting Reactivity of Feedstocks to Hydroprocessing by Using Asphaltene Characterization Techniques. Prepr. Pap.-Am. Chem. Soc., Div. Energy Fuels Chem. 2012, 57(2), 763

Rogel, E. et al. Sediment Formation in Residue Hydroconversion Processes and Its Correlation to Asphaltene Behavior. Prepr. Pap.-Am. Chem. Soc., Div. Energy Fuels Chem. 2012, 57(2), 745

Schabron, J. F. Use of the Asphaltene Determinator™ Method to Monitor Vacuum Residue Stability to Improve Refinery Distillation Efficiency, 2011

Parallel application Ser. No. 13/490,307; Office action dated Oct. 4, 2012

McLean J. B. et al. Reactivity Screening of Feedstocks for Catgalytic Coal/Oil Co-Processing, September 1986, http://web.anl.gov/PCS/acsfuel/preprint%20archive/Files/31_4_ANAHEIM_09-86_0169.pdf Mariaca-DomAnguez et al. "Reactivity of Fluid Catalytic Cracking Feedstocks as a Function of Reactive Hydrogen Content", Petroleum Science and Technology, 2004, Vol. 22, Issue 1-2, pp. 13-29

Johnson and Moyse, "Pretreatment of resid FCC feedstocks", July 2004, http://www.digitalrefining.com/article/1 000161

Baker, C. A. et al. A new chromatographic procedure and its application to high polymers, J. Chem. Soc., 1956, 2352-2362

Watkinson, et al, Fouling of a Sweet Crude Oil under Inert and Oxygenated Conditions, Energy & Fuels 2000, 14, 64-69

Sundaram et al., Thermodynamic Model of Sediment Deposition in the LC-FINING Process, Energy & Fuels 2008, 22, 3226-3236

Alvarez, G., et al., Heavy Oil-Water Interfacial Properties and Emulsion Stability: Influence of Dilution. Energy and Fuels, 23, 294-299, 2009

Collins, S. H., et al., Adsorption of Asphaltenes and Water on Reservoir Rock Minerals, Society of Petroleum Engineers, SPE 11800, 1983

Czarnecki, J., et al., On the Stabilization Mechanism of Water-in-Oil Emulsions in Petroleum Systems. Energy and Fuels, 19, 2074-2079, 2005

Czarnecki, J., Stabilization of Water in Crude Oil Emulsions. Part 2, 2009, Energy and Fuels, 23, 1253

Czarnecki, J., et al., Possible Role of Asphaltenes in the Stabilization of Water-in-Crude Oil Emulsions, Energy and Fuels, 26, ASAP article Aug. 13, 2012

Goual, L., et al. On-column Separation of Wax and Asphaltenes in Petroleum Fluids, Energy and Fuels, 22, 4019-4028, 2008

Hannisdal, A., et al., Particle-Stabilized Emulsions: Effect of Heavy Crude Oil Components Pre-Adsorbed onto Stabilizing Solids. Colloids and Surfaces A: Physicochem. Eng. Aspects, 276, 45-58, 2006

Hemmingsen, P. V., et al., Emulsions of Heavy Crude Oils. I: Influence of Viscosity, Temperature, and Dilution. J. of Dispersion Sci. Tech., 26, 615

Jestin, J., et al., A Small Angle neutron Scattering Study of the Adsorbed Asphaltene layer in Water-in-Hydrocarbon Emulsions: Structural Description Related to Stability Langmuir, 23, 10471-10478, 2007

Menon, V. B., et al., A Review of the Factors Affectoing the Stability of Solids-Stabilized Emulsions, Separation Science and Technology, 12-13, 2131-2142, 1988

Ortiz, D. P., et al., Effect of Surfactants on Interfacial Films and Stability of Water-in-Oil Emulsions Stabilized by Asphaltenes, J. Colloidal and Interface Science, 351 (2), 542-555, 2010

Pauli, A. T., et al., Assessment of Physical Property Prediction Based on Asphalt Average Molecular Structures, Prepr. Pap.-Am. Chem. Soc. Div. Pet. Chem., 255-259, 2005

Peng, J., et al., Novel Magnetic Demulsifier for Water Removal from Diluted Bitumen Emulsion, Energy and Fuels, 26, 2705-2710, 2012

Rovani, J. F., et al., Enhanced Oil Recovery: Investigation of Oil, Water, and Emulsion Chemistry, Western Research Institute Final Report WRI-09-027, Task 73 to the U.S. Department of Energy under Cooperative Agreement DEFC26-98FT40323 and to the University of Wyoming Enhanced Oil Recovery Institute, 2009

Spiecker, P. M., et al., Interfacial Rheology of Petroleum Asphaltenes at the Oil-Water Interface, Langmuir, 20,4022-4032, 2010, 2004

Stanford, L. A., et al., Compositional Characterization of Bitumen/Water Emulsion Films by Negative- and Positive-Ion Electrospray Ioinization and Field Desorption/Ionization Fourier Transform Ion Cyclotron Resonsnce Mass Spectrometry, Energy and Fuels, 21, 963-972, 2007

Sztukowski, D. M.; et al., Asphaltene Self-Association and Water-in-Hydrocarbon Emulsions. J. of Colloid and Interface Sci., 265, 179-186, 2003

Sztukowski, D. M., et al., Oilfield Solids and Water-in Oil Emulsion Stability, J. Colloidal and Interface Science, 285 (2), 821-833, 2005

Transportation Research Board, Asphalt Emulsion Technology, Circular E-C102, assembled by Delmar R. Salomon, Transportation Research Board of the National Academies, Washington, D.C., 2006

Wu, X., Investigating the Stability Mechanism of Water-in-Diluted Bitumen Emulsions through Isolation and Characterization of the Stabilizing Materials at the Interface. Energy and Fuels, 17, 179-190, 2003

Wikipedia, 2012, Pickering Emulsions, http://en.wikipedia.org/wiki/Pickering_emulsion Gu. G., et al. Influence of water-soluble and water-insoluble natural surface active components on the stability of water-in-toluene-diluted bitumen emulsion, Fuel 81 (2002) 1859-1869

Honse, S. O., et al. Separation and Characterization of Asphaltenic Subfractions, Quim. Nova, Vol. 35, No. 10, 1991-1994, 2012

Mullins, O. C. et al. Advances in Asphaltene Science and the Yen-Mullins Model, dx.doi.org/10.1021/ef300185p|Energy Fuels 2012, 26, 3986-4003

Nordgard, E. L, et al., Behavior of Asphaltene Model Compounds at W/O Interfaces, Langmuir 2010, 26(4), 2352-2360, Published on Web Oct. 23, 2009

Spiecker, P. M., et al. Aggregation and solubility behavior of asphaltenes and their subfractions, Journal of Colloid and Interface Science 267 (2003) 178-193

Spiecker, P. M., et al. Effects of petroleum resins on asphaltene aggregation and water-in-oil emulsion formation, Colloids and Surfaces A: Physicochem. Eng. Aspects 220 (2003) 9-27

Wang, S. Understanding Stability of Water-in-Dilutes Bitumen Emulsions by Colloidal Force Measurements, Thesis, Department of Chemical and Materials Engineering, Edmonton, Alterba, Calif.

Zhang, L. Y. et al. Asphaltene Monolayers at a Toluene/Water Interface, Energy & Fuels 2005, 19, 1330-1336

Yang, X., et al. Investigation of Subfractions of Athabasca Asphaltenes and their role in Emulsion Stability, Energy & Fuels 2004, 18, 770-777

Hawkins, D. J., et al., Diluent availability will constrain Canada's heavy oil, bitumen development, Oil & Gas Journal, Oct. 29, 2002, Vol. 100, Issue 44, Pg. 64

Kharrat, A. M., Characterization of Canadian heavy oils using sequential extraction approach, Energy & Fuels 2009, 23, 828-834

Maqbool, T., P. Srikiratiwong, and H. S. Fogler, 2011, Effect of Temperature on the Precipitation Kinetics of Asphaltenes, Energy & Fuels, 25, 694-700.

Pauli, A. T. et al., Assessment of physical property prediction based on asphalt average molecular structures, Prepr. Pap.-Am. Chem. Soc., Div. Pet. Chem. 2005, 50(2), 255-259

Perry, G. F., 2002, Diluent Availability will Constrain Canada's Heavy Oil, Bitumen Development, Oil and Gas Journal, 100, 44, Oct. 28, 2002.

Pratt, S., NAFTA bumps into Alberta's upgrader plans; Trade deal would prohibit the province from reducing the flow of bitumen to the United States once it starts, Edmonton Journal, Jun. 7, 2008, Page A19

Storm, D. A., et al., Development of solid properties and thermochemistry of asphalt binders in the 25-65 degree C. temperature range, Energy & Fuels, 1996, 10, 855-864.

Storm, D. A. et al., Rheological study of Ratawi vacuum residue in the 298-673 K temperature range, Energy & Fuels, 1995, 9, 168-176.

U.S. Provisional Application No. 61/775,924 filed 11 Mar. 2013 entitled Continuous Breaking of Water and Oil Emulsions.

U.S. Provisional Application No. 61/700,090 filed 12 Sep. 2012 entitled Reduction of Heavy Oil Viscosity Using Solid Sorbents.

Thus, the applicant(s) should be understood to have support to claim and make a statement of invention to at least: i) each of the emulsion stability changing devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

TABLE 1

Asphaltene Determinator Characterization of Light Desalter Inlet Oil.

Sample: WRI 1338-82-4 Date: Mar. 15, 2011
Desalter Inlet Light Oil

| Material/ Amt. Inj. | Wt. % ELSD Volatiles | Detector | Asphaltene Determinator Area Percent | | | | Coke Index Ratio Cy/CCl | AD Asphalt Aging Index Ratio T/H | Percent TPA |
|---|---|---|---|---|---|---|---|---|---|
| | | | Heptane | CyC$_6$ | Toluene | CH$_2$Cl$_2$:MeOH | | | |
| Whole Oil | 69.52 | ELSD | 98.95 | 0.47 | 0.43 | 0.14 | 3.4 | | 2.0 |
| 2.0016 mg | | 500 nm | 47.99 | 14.08 | 26.23 | 11.71 | 1.2 | 0.55 | |
| | | 700 nm | 32.42 | 18.18 | 28.56 | 20.85 | 0.9 | | |
| | | Whole Oil ELSD Area: 2016104 | | | | QC ELSD Area: 6615140 | | | |
| Corrected for | | ELSD | 99.68 | 0.14 | 0.13 | 0.04 | 3.4 | | 0.6 |
| Volatiles Loss | | 500 nm | 47.99 | 14.08 | 26.23 | 11.71 | 1.2 | 0.55 | |
| | | 700 nm | 32.42 | 18.18 | 28.56 | 20.85 | 0.9 | | |

| Material/ Amt. Inj. | Wt. % of Whole Oil | Gravimetric Asphaltenes Analysis | | | | | Area Percent Toluene + CH$_2$Cl$_2$:MeOH | Wt. % Toluene + CH$_2$Cl$_2$:MeOH | Total Wt. % Asphaltenes |
|---|---|---|---|---|---|---|---|---|---|
| | | Detector | Asphaltene Determinator Area Percent | | | | | | |
| | | | Heptane | CyC$_6$ | Toluene | CH$_2$Cl$_2$:MeOH | | | |
| C7 Asphaltenes | 0.05 | ELSD | 10.52 | 23.22 | 61.78 | 4.49 | 66.27 | 0.03 | 0.11 |
| 10μ | | 500 nm | 6.68 | 25.99 | 61.23 | 6.11 | 67.34 | | |
| ⁻0.6800 mg | | 700 nm | 4.44 | 26.38 | 62.46 | 6.72 | 69.18 | | |
| C7 Asphaltenes | 0.06 | ELSD | 33.96 | 26.60 | 37.04 | 2.40 | 39.44 | 0.02 | |
| 0.45μ | | 500 nm | 14.50 | 35.48 | 45.88 | 4.14 | 50.02 | | |
| ⁻0.8400 mg | | 700 nm | 10.94 | 37.21 | 46.97 | 4.88 | 51.85 | | |

TABLE 2

Asphaltene Determinator Characterization of Desalted Light Oil.

Sample: WRI 1338-82-3
Desalted Light Oil

| Material/ Amt. Inj. | Wt. % ELSD Volatiles | Detector | Asphaltene Determinator Area Percent | | | | Coke Index Ratio Cy/CCl | AD Asphalt Aging Index Ratio T/H | Percent TPA |
|---|---|---|---|---|---|---|---|---|---|
| | | | Heptane | CyC$_6$ | Toluene | CH$_2$Cl$_2$:MeOH | | | |
| Whole Oil | 70.34 | ELSD | 99.01 | 0.41 | 0.41 | 0.17 | 2.4 | | 1.8 |
| 2.0000 mg | | 500 nm | 46.38 | 14.09 | 26.99 | 12.53 | 1.1 | 0.58 | |
| | | 700 nm | 28.72 | 17.66 | 30.68 | 22.94 | 0.8 | | |
| | | Whole Oil ELSD Area: 1961945 | | | | QC ELSD Area: 6615140 | | | |
| Corrected for | | ELSD | 99.71 | 0.12 | 0.12 | 0.05 | 2.4 | | 0.5 |
| Volatiles Loss | | 500 nm | 46.38 | 14.09 | 26.99 | 12.53 | 1.1 | 0.58 | |
| | | 700 nm | 28.72 | 17.66 | 30.68 | 22.94 | 0.8 | | |

| Material/ Amt. Inj. | Wt. % of Whole Oil | Gravimetric Asphaltenes Analysis | | | | | Area Percent Toluene + CH$_2$Cl$_2$:MeOH | Wt. % Toluene + CH$_2$Cl$_2$:MeOH | Total Wt. % Asphaltenes |
|---|---|---|---|---|---|---|---|---|---|
| | | Detector | Asphaltene Determinator Area Percent | | | | | | |
| | | | Heptane | CyC$_6$ | Toluene | CH$_2$Cl$_2$:MeOH | | | |
| C7 Asphaltenes | 0.07 | ELSD | 20.30 | 20.68 | 55.47 | 3.55 | 59.02 | 0.04 | 0.12 |
| 10μ | | 500 nm | 6.29 | 26.81 | 61.29 | 5.61 | 66.90 | | |
| ⁻0.9600 mg | | 700 nm | 4.07 | 26.82 | 63.10 | 6.01 | 69.11 | | |
| C7 Asphaltenes | 0.05 | ELSD | 43.78 | 21.83 | 31.89 | 2.50 | 34.39 | 0.02 | |
| 0.45μ | | 500 nm | 16.46 | 32.84 | 45.66 | 5.04 | 50.70 | | |
| ⁻0.6800 mg | | 700 nm | 12.66 | 34.30 | 47.07 | 5.97 | 53.04 | | |

TABLE 3

Asphaltene Determinator Characterization of Light Oil Desalter Whole Emulsion, Shaken.

Sample: WRI 1338-82-5
Light Oil Deesalter Emulsion with 40 vol. % Oil, Shaken

| Material/ Amt. Inj. | Wt. % ELSD Volatiles | Detector | Asphaltene Determinator Area Percent | | | | Coke Index Ratio Cy/CCl | AD Asphalt Aging Index Ratio T/H | Percent TPA |
|---|---|---|---|---|---|---|---|---|---|
| | | | Heptane | $CyC_6$ | Toluene | $CH_2Cl_2$:MeOH | | | |
| Whole Oil 2.0018 mg | 90.66 | ELSD | 97.67 | 1.34 | 0.62 | 0.37 | 3.6 | | na |
| | | 500 nm | | Interference due to water turbidity for $CH_2Cl_2$:MeOH peak? | | | | na | |
| | | 700 nm | | Interference due to water turbidity for $CH_2Cl_2$:MeOH peak? | | | | | |
| | | Whole Oil ELSD Area: 617842 | | | | QC ELSD Area: 6615140 | | | |
| Corrected for Volatiles Loss | | ELSD | 99.78 | 0.13 | 0.06 | 0.03 | 3.6 | | na |
| | | 500 nm | na | na | na | na | na | na | |
| | | 700 nm | na | na | na | na | na | | |

| Material/ Amt. Inj. | Wt. % of Whole Oil | Gravimetric Asphaltenes Analysis | | | | | Area Percent Toluene + $CH_2Cl_2$:MeOH | Wt. % Toluene + $CH_2Cl_2$:MeOH | Total Wt. % Asphaltenes |
|---|---|---|---|---|---|---|---|---|---|
| | | Detector | Heptane | $CyC_6$ | Toluene | $CH_2Cl_2$:MeOH | | | |
| C7 Asphaltenes 10μ ~0.5600 mg | 0.04 | ELSD | 17.92 | 18.35 | 57.11 | 6.62 | 63.73 | 0.03 | 0.11 |
| | | 500 nm | 6.40 | 22.00 | 62.24 | 9.37 | 71.61 | | |
| | | 700 nm | 4.30 | 22.00 | 63.17 | 10.53 | 73.70 | | |
| C7 Asphaltenes 0.45μ ~1.0000 mg | 0.07 | ELSD | 28.55 | 25.55 | 42.86 | 3.05 | 45.91 | 0.03 | |
| | | 500 nm | 12.47 | 32.79 | 49.71 | 5.03 | 54.74 | | |
| | | 700 nm | 8.90 | 33.78 | 51.35 | 5.97 | 57.32 | | |

TABLE 4

Summary Results for the 500 nm Methylene Chloride:methanol Peak Areas for the Light Oil Series.
Asphaltene Determinator $CH_2Cl_2$:MeOH (98:2 v:v) Area Percent

| Light Crude API ~40 Material | 500 nm Relative Area Percent | |
|---|---|---|
| | Whole Oil | 10 Micron Asphaltenes |
| Inlet Crude | 11.71 | 6.11 |
| Rag layer Emulsion | na | 9.37 |
| Centrifuged Rag Layer Oil | na | 31.36 |
| Desalted Outlet Crude | 12.53 | 5.61 |

TABLE 5

Asphaltene Determinator Characterization of Light Supernatant Centrifuged Desalter Emulsion Oil.

Sample: WRI 1338-82-5
Light Oil from Emulsion Separated by Centrifugation

| Material/ Amt. Inj. | Wt. % ELSD Volatiles | Detector | Asphaltene Determinator Area Percent | | | | Coke Index Ratio Cy/CCl | AD Asphalt Aging Index Ratio T/H | Percent TPA |
|---|---|---|---|---|---|---|---|---|---|
| | | | Heptane | $CyC_6$ | Toluene | $CH_2Cl_2$:MeOH | | | |
| Whole Oil 2.0016 mg | 68.21 | ELSD | 97.95 | 1.10 | 0.25 | 0.70 | 1.6 | | na |
| | | 500 nm | | Interference due to water turbidity for $CH_2Cl_2$:MeOH peak? | | | | na | |
| | | 700 nm | | Interference due to water turbidity for $CH_2Cl_2$:MeOH peak? | | | | | |
| | | Whole Oil ELSD Area: 2026156 | | | | QC ELSD Area: 6373174.0 | | | |
| Corrected for Volatiles Loss | | ELSD | 99.35 | 1.10 | 0.25 | 0.70 | 1.6 | | na |
| | | 500 nm | na | na | na | na | na | na | |
| | | 700 nm | na | na | na | na | na | | |

TABLE 5-continued

Asphaltene Determinator Characterization of Light Supernatant Centrifuged Desalter Emulsion Oil.

| Material/ Amt. Inj. | Wt. % of Whole Oil | Gravimetric Asphaltenes Analysis | | | | | Area Percent Toluene + $CH_2Cl_2$:MeOH | Wt. % Toluene + $CH_2Cl_2$:MeOH | Total Wt. % Asphaltenes |
|---|---|---|---|---|---|---|---|---|---|
| | | Asphaltene Determinator Area Percent | | | | | | | |
| | | Detector | Heptane | $CyC_6$ | Toluene | $CH_2Cl_2$:MeOH | | | |
| C7 Asphaltenes 10µ (difficult to filter) 0.4007 mg | 1.93 | ELSD 500 nm 700 nm | 12.58 5.00 na | 28.32 15.02 14.32 | 35.61 48.63 45.70 | 23.48 31.36 39.98 | 59.09 79.99 85.68 | 1.14 | 2.32 |
| C7 Asphaltenes 0.45µ 0.4051 mg | 0.39 | ELSD 500 nm 700 nm | 63.05 14.18 9.60 | 11.26 22.66 22.71 | 17.66 46.18 44.54 | 8.03 16.97 23.15 | 25.69 63.15 67.69 | 0.10 | |

TABLE 6

Asphaltene Determinator Characterization of Medium Desalter Feed Oils from Sets 1 and 2.

Sample: WRI 1338-94-21
Desalter Inlet Medium Crude Set 1

| Material/ Amt. Inj. | Wt. % ELSD Volatiles | Asphaltene Determinator Area Percent | | | | | Coke Index Ratio Cy/CCl | AD Asphalt Aging Index Ratio T/H | Percent TPA |
|---|---|---|---|---|---|---|---|---|---|
| | | Detector | Heptane | $CyC_6$ | Toluene | $CH_2Cl_2$:MeOH | | | |
| Whole Oil 2.0012 mg | 54.33 | ELSD 500 nm 700 nm | 95.26 38.64 24.32 | 1.44 18.00 21.59 | 2.81 34.34 38.85 | 0.49 9.02 15.24 | 2.9 2.0 1.4 | 0.89 | 7.7 |
| | | Whole Oil ELSD Area: 3096016 | | | | QC ELSD Area: 6779303 | | | |
| Corrected for Volatiles Loss | | ELSD 500 nm 700 nm | 97.84 38.64 24.32 | 0.66 18.00 21.59 | 1.28 34.34 38.85 | 0.22 9.02 15.24 | 2.9 2.0 1.4 | 0.89 | 3.5 |

| Material/ Amt. Inj. | Wt. % of Whole Oil | Gravimetric Asphaltenes Analysis | | | | | Area Percent Toluene + $CH_2Cl_2$:MeOH | Wt. % Toluene + $CH_2Cl_2$:MeOH | Total Wt. % Asphaltenes |
|---|---|---|---|---|---|---|---|---|---|
| | | Asphaltene Determinator Area Percent | | | | | | | |
| | | Detector | Heptane | $CyC_6$ | Toluene | $CH_2Cl_2$:MeOH | | | |
| C7 Asphaltenes 10µ 0.4010 mg | 4.27 | ELSD 500 nm 700 nm | 18.53 11.68 6.48 | 25.10 26.19 26.94 | 52.81 55.91 58.44 | 3.56 6.21 8.14 | 56.37 62.12 66.58 | 2.41 | 4.87 |
| C7 Asphaltenes 0.45µ 0.4039 mg | 0.60 | ELSD 500 nm 700 nm | 22.94 12.86 8.53 | 25.25 27.55 28.16 | 47.72 53.33 55.36 | 4.10 6.26 7.95 | 51.82 59.59 63.31 | 0.31 | |

Sample: WRI 1338-94-22
Desalter Inlet Medium Crude Set 2

| Material/ Amt. Inj. | Wt. % ELSD Volatiles | Asphaltene Determinator Area Percent | | | | | Coke Index Ratio Cy/CCl | AD Asphalt Aging Index Ratio T/H | Percent TPA |
|---|---|---|---|---|---|---|---|---|---|
| | | Detector | Heptane | $CyC_6$ | Toluene | $CH_2Cl_2$:MeOH | | | |
| Whole Oil 2.0014 mg Apr. 15, 2011 | 54.87 | ELSD 500 nm 700 nm | 95.33 38.55 23.93 | 1.42 18.06 21.51 | 2.81 34.38 39.18 | 0.44 9.01 15.38 | 3.2 2.0 1.4 | 0.89 | 7.6 |
| | | Whole Oil ELSD Area: 3059784 | | | | QC ELSD Area: 6779303 | | | |
| Corrected for Volatiles Loss | | ELSD 500 nm 700 nm | 97.89 38.55 23.93 | 0.64 18.06 21.51 | 1.27 34.38 39.18 | 0.20 9.01 15.38 | 3.2 2.0 1.4 | 0.89 | 3.4 |

| Material/ Amt. Inj. | Wt. % of Whole Oil | Gravimetric Asphaltenes Analysis | | | | | Area Percent Toluene + $CH_2Cl_2$:MeOH | Wt. % Toluene + $CH_2Cl_2$:MeOH | Total Wt. % Asphaltenes |
|---|---|---|---|---|---|---|---|---|---|
| | | Asphaltene Determinator Area Percent | | | | | | | |
| | | Detector | Heptane | $CyC_6$ | Toluene | $CH_2Cl_2$:MeOH | | | |
| C7 Asphaltenes 10µ 0.4008 mg | 4.32 | ELSD 500 nm 700 nm | 19.02 11.94 6.45 | 25.81 27.16 28.07 | 51.75 54.78 57.50 | 3.41 6.12 7.98 | 55.16 60.90 65.48 | 2.38 | 4.82 |
| C7 Asphaltenes 0.45µ 0.4076 mg | 0.50 | ELSD 500 nm 700 nm | 20.46 13.49 6.74 | 24.31 26.11 26.84 | 47.97 52.51 55.43 | 7.25 7.89 10.99 | 55.22 60.40 66.42 | 0.28 | |

TABLE 7

Asphaltene Determinator Characterization of Medium Desalted Outlet Oils from Sets 1 and 2.

Sample: WRI 1338-94-23
Desalted Medium Crude Set 1

| Material/<br>Amt. Inj. | Wt. % ELSD<br>Volatiles | Asphaltene Determinator Area Percent | | | | | Coke Index<br>Ratio Cy/CCl | AD Asphalt<br>Aging Index<br>Ratio T/H | Percent<br>TPA |
|---|---|---|---|---|---|---|---|---|
| | | Detector | Heptane | CyC$_6$ | Toluene | CH$_2$Cl$_2$:MeOH | | | |
| Whole Oil | 53.58 | ELSD | 95.27 | 1.49 | 2.78 | 0.45 | 3.3 | | 7.8 |
| 2.0002 mg | | 500 nm | 39.06 | 18.50 | 33.77 | 8.67 | 2.1 | 0.86 | |
| | | 700 nm | 24.16 | 21.99 | 38.53 | 15.32 | 1.4 | | |
| | | Whole Oil ELSD Area: 3147093 | | | | QC ELSD Area: 6779303 | | | |
| Corrected for | | ELSD | 97.80 | 0.69 | 1.29 | 0.21 | 3.3 | | 3.6 |
| Volatiles Loss | | 500 nm | 39.06 | 18.50 | 33.77 | 8.67 | 2.1 | 0.86 | |
| | | 700 nm | 24.16 | 21.99 | 38.53 | 15.32 | 1.4 | | |

| Material/<br>Amt. Inj. | Gravimetric Asphaltenes Analysis<br>Wt. %<br>Whole Oil | Asphaltene Determinator Area Percent | | | | | Area Percent<br>Toluene +<br>CH$_2$Cl$_2$:MeOH | Wt. %<br>Toluene +<br>CH$_2$Cl$_2$:MeOH | Total<br>Wt. %<br>Asphaltenes |
|---|---|---|---|---|---|---|---|---|---|
| | | Detector | Heptane | CyC$_6$ | Toluene | CH$_2$Cl$_2$:MeOH | | | |
| C7 Asphaltenes | 4.22 | ELSD | 20.42 | 26.30 | 50.09 | 3.20 | 53.29 | 2.25 | 4.97 |
| 10μ | | 500 nm | 11.99 | 27.51 | 54.49 | 6.01 | 60.50 | | |
| 0.4004 mg | | 700 nm | 6.49 | 28.42 | 57.27 | 7.82 | 65.09 | | |
| C7 Asphaltenes | 0.75 | ELSD | 28.76 | 21.24 | 45.82 | 4.18 | 50.00 | 0.38 | |
| 0.45μ | | 500 nm | 13.01 | 24.80 | 55.31 | 6.87 | 62.18 | | |
| 0.4019 mg | | 700 nm | 7.42 | 25.43 | 58.17 | 8.98 | 67.15 | | |

Sample: WRI 1338-94-24
Desalted Medium Crude Set 2

| Material/<br>Amt. Inj. | Wt. % ELSD<br>Volatiles | Asphaltene Determinator Area Percent | | | | | Coke Index<br>Ratio Cy/CCl | AD Asphalt<br>Aging Index<br>Ratio T/H | Percent<br>TPA |
|---|---|---|---|---|---|---|---|---|
| | | Detector | Heptane | CyC$_6$ | Toluene | CH$_2$Cl$_2$:MeOH | | | |
| Whole Oil | 53.40 | ELSD | 95.60 | 1.47 | 2.48 | 0.45 | 3.3 | | 7.4 |
| 2.0006 mg | | 500 nm | 40.90 | 19.91 | 31.76 | 7.42 | 2.7 | 0.78 | |
| | | 700 nm | 26.69 | 24.00 | 37.83 | 11.48 | 2.1 | | |
| | | Whole Oil ELSD Area: 2723177 | | | | QC ELSD Area: 5843181 | | | |
| Corrected for | | ELSD | 97.95 | 0.69 | 1.16 | 0.21 | 3.3 | | 3.5 |
| Volatiles Loss | | 500 nm | 40.90 | 19.91 | 31.76 | 7.42 | 2.7 | 0.78 | |
| | | 700 nm | 26.69 | 24.00 | 37.83 | 11.48 | 2.1 | | |

| Material/<br>Amt. Inj. | Gravimetric Asphaltenes Analysis<br>Wt. %<br>Whole Oil | Asphaltene Determinator Area Percent | | | | | Area Percent<br>Toluene +<br>CH$_2$Cl$_2$:MeOH | Wt. %<br>Toluene +<br>CH$_2$Cl$_2$:MeOH | Total<br>Wt. %<br>Asphaltenes |
|---|---|---|---|---|---|---|---|---|---|
| | | Detector | Heptane | CyC$_6$ | Toluene | CH$_2$Cl$_2$:MeOH | | | |
| C7 Asphaltenes | 2.27 | ELSD | 10.93 | 23.33 | 62.27 | 3.46 | 65.73 | 1.49 | 2.6 |
| 10μ | | 500 nm | 8.51 | 24.60 | 61.87 | 5.03 | 66.90 | | |
| 0.4002 mg | | 700 nm | 4.78 | 24.89 | 64.05 | 6.28 | 70.33 | | |
| C7 Asphaltenes | 0.31 | ELSD | 23.69 | 21.36 | 51.98 | 2.97 | 54.95 | 0.17 | |
| 0.45μ | | 500 nm | 11.10 | 25.55 | 58.25 | 5.10 | 63.35 | | |
| 0.4120 mg | | 700 nm | 6.46 | 26.31 | 60.68 | 6.55 | 67.23 | | |

TABLE 8

Asphaltene Determinator Characterization of Medium Oil Desalter Emulsions from Sets 1 and 2.

Sample: WRI 1338-94-25
Medium Crude Emulsion Shaken (Contains 60 vol. % Oil) Set 1

| Material/<br>Amt. Inj. | Wt. % ELSD<br>Volatiles | Asphaltene Determinator Area Percent | | | | | Coke Index<br>Ratio Cy/CCl | AD Asphalt<br>Aging Index<br>Ratio T/H | Percent<br>TPA |
|---|---|---|---|---|---|---|---|---|
| | | Detector | Heptane | CyC$_6$ | Toluene | CH$_2$Cl$_2$:MeOH | | | |
| Whole Oil | 89.38 | ELSD | 93.87 | 1.61 | 3.21 | 1.31 | 1.2 | | 8.7 |
| 2.0000 mg | | 500 nm | 29.28 | 17.15 | 39.90 | 13.67 | 1.3 | 1.36 | |
| | | 700 nm | 14.85 | 18.09 | 45.02 | 22.04 | 0.8 | | |
| | | Whole Oil ELSD Area: 620678 | | | | QC ELSD Area: 5843181 | | | |

TABLE 8-continued

Asphaltene Determinator Characterization of Medium Oil Desalter Emulsions from Sets 1 and 2.

| | | | | | | | | |
|---|---|---|---|---|---|---|---|---|
| Corrected for Volatiles Loss | | ELSD | 99.35 | 0.17 | 0.34 | 0.14 | 1.2 | 0.9 |
| | | 500 nm | 29.28 | 17.15 | 39.90 | 13.67 | 1.3 | 1.36 |
| | | 700 nm | 14.85 | 18.09 | 45.02 | 22.04 | 0.8 | |

| | | Gravimetric Asphaltenes Analysis | | | | Area Percent | Wt. % | Total |
|---|---|---|---|---|---|---|---|---|
| Material/ | Wt. % | Asphaltene Determinator Area Percent | | | | Toluene + | Toluene + | Wt. % |
| Amt. Inj. | Whole Oil | Detector | Heptane | CyC$_6$ | Toluene | CH$_2$Cl$_2$:MeOH | CH$_2$Cl$_2$:MeOH | CH$_2$Cl$_2$:MeOH | Asphaltenes |

| | | | | | | | | | |
|---|---|---|---|---|---|---|---|---|---|
| C7 Asphaltenes 10μ 0.4075 mg | 1.62 | ELSD | 13.04 | 18.00 | 58.62 | 10.34 | 68.96 | 1.12 | 1.76 |
| | | 500 nm | 7.09 | 18.90 | 62.39 | 11.62 | 74.01 | | |
| | | 700 nm | 3.90 | 17.92 | 63.30 | 14.88 | 78.18 | | |
| C7 Asphaltenes 0.45μ 0.3900 mg | 0.14 | ELSD | 30.96 | 23.48 | 39.62 | 5.93 | 45.55 | 0.06 | |
| | | 500 nm | 14.89 | 26.44 | 44.84 | 13.83 | 58.67 | | |
| | | 700 nm | 7.93 | 24.62 | 42.63 | 24.82 | 67.45 | | |

Sample: WRI 1338-94-26
Medium Crude Emulsion Shaken (Contains 80 vol. % Oil) Set 2

| Material/ | Wt. % ELSD | Asphaltene Determinator Area Percent | | | | Coke Index | AD Asphalt Aging Index | Percent |
|---|---|---|---|---|---|---|---|---|
| Amt. Inj. | Volatiles | Detector | Heptane | CyC$_6$ | Toluene | CH$_2$Cl$_2$:MeOH | Ratio Cy/CCl | Ratio T/H | TPA |

| | | | | | | | | | |
|---|---|---|---|---|---|---|---|---|---|
| Whole Oil 2.0002 mg | 89.76 | ELSD | 94.06 | 1.57 | 3.02 | 1.35 | 1.2 | | 8.5 |
| | | 500 nm | 29.99 | 17.49 | 39.48 | 13.04 | 1.3 | 1.32 | |
| | | 700 nm | 19.13 | 19.43 | 41.43 | 20.00 | 1.0 | | |
| | | Whole Oil ELSD Area: 598385 | | | | QC ELSD Area: 5843181 | | | |
| Corrected for Volatiles Loss | | ELSD | 99.39 | 0.16 | 0.31 | 0.14 | 1.2 | | 0.9 |
| | | 500 nm | 29.99 | 17.49 | 39.48 | 13.04 | 1.3 | 1.32 | |
| | | 700 nm | 19.13 | 19.43 | 41.43 | 20.00 | 1.0 | | |

| | | Gravimetric Asphaltenes Analysis | | | | Area Percent | Wt. % | Total |
|---|---|---|---|---|---|---|---|---|
| Material/ | Wt. % | Asphaltene Determinator Area Percent | | | | Toluene + | Toluene + | Wt. % |
| Amt. Inj. | Whole Oil | Detector | Heptane | CyC$_6$ | Toluene | CH$_2$Cl$_2$:MeOH | CH$_2$Cl$_2$:MeOH | CH$_2$Cl$_2$:MeOH | Asphaltenes |

| | | | | | | | | | |
|---|---|---|---|---|---|---|---|---|---|
| C7 Asphaltenes 10μ 0.4004 mg | 2.16 | ELSD | 10.81 | 15.05 | 48.61 | 25.54 | 74.15 | 1.60 | 2.47 |
| | | 500 nm | 5.66 | 12.59 | 44.56 | 37.19 | 81.75 | | |
| | | 700 nm | 2.69 | 9.01 | 34.39 | 53.91 | 88.30 | | |
| C7 Asphaltenes 0.45μ 0.4160 mg | 0.31 | ELSD | 14.73 | 20.01 | 47.44 | 17.81 | 65.25 | 0.20 | |
| | | 500 nm | 7.70 | 16.93 | 41.97 | 33.40 | 75.37 | | |
| | | 700 nm | 3.50 | 12.89 | 32.36 | 51.25 | 83.61 | | |

TABLE 9

Asphaltene Determinator Characterization of Medium Desalter Centrifuged Oils from Emulsions from Sets 1 and 2.

Sample: WRI 1338-94-25
Medium Crude Emulsion Oil Separated by Centrifugation Set 1

| Material/ | Wt. % ELSD | Asphaltene Determinator Area Percent | | | | Coke Index | AD Asphalt Aging Index | Percent |
|---|---|---|---|---|---|---|---|---|
| Amt. Inj. | Volatiles | Detector | Heptane | CyC$_6$ | Toluene | CH$_2$Cl$_2$:MeOH | Ratio Cy/CCl | Ratio T/H | TPA |

| | | | | | | | | | |
|---|---|---|---|---|---|---|---|---|---|
| Whole Oil 2.0005 mg | 56.51 | ELSD | 94.70 | 1.89 | 2.93 | 0.48 | 3.9 | | 8.2 |
| | | 500 nm | 35.22 | 20.13 | 35.04 | 9.61 | 2.1 | 0.99 | |
| | | 700 nm | 22.71 | 23.39 | 39.16 | 14.74 | 1.6 | | |
| | | Whole Oil ELSD Area: 2979118 | | | | QC ELSD Area: 6849664 | | | |
| Corrected for Volatiles Loss | | ELSD | 97.70 | 0.82 | 1.27 | 0.21 | 3.9 | | 3.6 |
| | | 500 nm | 35.22 | 20.13 | 35.04 | 9.61 | 2.1 | 0.99 | |
| | | 700 nm | 22.71 | 23.39 | 39.16 | 14.74 | 1.6 | | |

| | | Gravimetric Asphaltenes Analysis | | | | Area Percent | Wt. % | Total |
|---|---|---|---|---|---|---|---|---|
| Material/ | Wt. % of | Asphaltene Determinator Area Percent | | | | Toluene + | Toluene + | Wt. % |
| Amt. Inj. | Whole Oil | Detector | Heptane | CyC$_6$ | Toluene | CH$_2$Cl$_2$:MeOH | CH$_2$Cl$_2$:MeOH | CH$_2$Cl$_2$:MeOH | Asphaltenes |

| | | | | | | | | | |
|---|---|---|---|---|---|---|---|---|---|
| C7 Asphaltenes 10μ | 1.84 | ELSD | 14.87 | 30.22 | 51.76 | 3.15 | 54.91 | 1.01 | 2.69 |
| | | 500 nm | 10.67 | 31.85 | 52.36 | 5.12 | 57.48 | | |

TABLE 9-continued

Asphaltene Determinator Characterization of Medium Desalter Centrifuged Oils from Emulsions from Sets 1 and 2.

| 0.3981 mg |      | 700 nm | 6.37 | 32.94 | 54.26 | 6.43 | 60.69 |      |
|-----------|------|--------|------|-------|-------|------|-------|------|
| C7 Asphaltenes | 0.85 | ELSD | 27.25 | 26.10 | 43.67 | 2.98 | 46.65 | 0.40 |
| 0.45μ     |      | 500 nm | 12.35 | 31.39 | 51.06 | 5.20 | 56.26 |      |
| 0.4240 mg |      | 700 nm | 7.41 | 32.65 | 53.25 | 6.69 | 59.94 |      |

Sample: WRI 1338-94-26
Medium Crude Emulsion Oil Separated by Centrifugation Set 2

| Material/<br>Amt. Inj. | Wt. % ELSD<br>Volatiles | Asphaltene Determinator Area Percent ||||| Coke Index<br>Ratio Cy/CCl | AD Asphalt<br>Aging Index<br>Ratio T/H | Percent<br>TPA |
|---|---|---|---|---|---|---|---|---|
| | | Detector | Heptane | CyC$_6$ | Toluene | CH$_2$Cl$_2$:MeOH | | | |
| Whole Oil | 56.52 | ELSD | 94.92 | 1.88 | 2.78 | 0.42 | 4.5 | | 7.9 |
| 2.0006 mg | | 500 nm | 35.92 | 20.14 | 35.01 | 8.93 | 2.3 | 0.97 | |
| | | 700 nm | 22.77 | 23.54 | 39.58 | 14.11 | 1.7 | | |
| | | Whole Oil ELSD Area: 2978183 | | | | QC ELSD Area: 6849664 | | | |
| Corrected for | | ELSD | 97.79 | 0.82 | 1.21 | 0.18 | 4.5 | | 3.4 |
| Volatiles Loss | | 500 nm | 35.92 | 20.14 | 35.01 | 8.93 | 2.3 | 0.97 | |
| | | 700 nm | 22.77 | 23.54 | 39.58 | 14.11 | 1.7 | | |

| | Gravimetric Asphaltenes Analysis | | | | | Area Percent | Wt. % | Total |
|---|---|---|---|---|---|---|---|---|
| Material/<br>Amt. Inj. | Wt. %<br>Whole Oil | Asphaltene Determinator Area Percent ||||| Toluene +<br>CH$_2$Cl$_2$:MeOH | Toluene +<br>CH$_2$Cl$_2$:MeOH | Wt. %<br>Asphaltenes |
| | | Detector | Heptane | CyC$_6$ | Toluene | CH$_2$Cl$_2$:MeOH | | | |
| C7 Asphaltenes | 1.96 | ELSD | 15.30 | 29.18 | 50.56 | 4.96 | 55.52 | 1.09 | 2.81 |
| 10μ | | 500 nm | 11.29 | 30.98 | 51.69 | 6.04 | 57.73 | | |
| 0.4008 mg | | 700 nm | 6.80 | 31.86 | 53.39 | 7.94 | 61.33 | | |
| C7 Asphaltenes | 0.85 | ELSD | 21.55 | 28.34 | 46.90 | 3.21 | 50.11 | 0.43 | |
| 0.45μ | | 500 nm | 12.45 | 31.34 | 50.92 | 5.30 | 56.22 | | |
| 0.4012 mg | | 700 nm | 7.27 | 32.67 | 53.43 | 6.63 | 60.06 | | |

TABLE 10

Summary of Results for the 500 nm Methylene Chloride:methanol Peak Areas for the Medium Oil Sets 1 and 2.
Asphaltene Determinator CH$_2$Cl$_2$:MeOH (98:2 v:v) Area Percent

| | 500 nm Relative Area Percent ||
|---|---|---|
| Material | Whole Oil | 10 Micron Asphaltenes |
| Medium Crude 1 API ~25 | | |
| Inlet Crude | 9.02 | 6.21 |
| Rag layer Emulsion | 13.67 | 11.62 |
| Centrifuged Rag Layer Oil | 9.61 | 5.12 |
| Desalted Outlet Crude | 8.67 | 6.01 |
| Medium Crude 2 API ~25 | | |
| Inlet Crude | 9.01 | 6.12 |
| Rag layer Emulsion | 13.04 | 37.19 |
| Centrifuged Rag Layer Oil | 8.93 | 6.04 |
| Desalted Outlet Crude | 7.42 | 5.03 |

TABLE 11

Amount of Oil, Water, and Sediment following Centrifugation of Emulsions.
Emulsions from Heavy Crude Set (API ~20)

| | Centrifuged Volume Percent |||
|---|---|---|---|
| Try Layer | Oil | Water | Sediment |
| T-1 | 50 | 34 | 16 |
| T-2 | 40 | 49 | 11 |
| T-3 | 56 | 30 | 14 |
| T-4 | 56 | 35 | 9 |

TABLE 12

Relative 500 nm Absorbance Detector Peak Area Percents for the Most Pericondensed Material in the Heavy Oil Desalter Sample Set.
Asphaltene Determinator 500 nm CH$_2$Cl$_2$:MeOH (98:2 v:v) Peaks

| | 500 nm Relative Area Percent ||
|---|---|---|
| Heavy Crude API ~20 | Whole Material | 10μ Asphaltenes |
| Sample | | |
| Inlet Crude | 4.31 | 3.03 |
| Desalted Outlet Crude | 4.12 | 2.86 |
| Try Layer 1 | | |
| Whole Sample Shaken | 5.74 | 11.23 |
| Whole Emulsion | 5.84 | 10.58 |
| Emulsion Centrifuged Oil | 3.73 | 3.91 |
| Emulsion Centrifuged Water, Evaporated | 7.71 | na |
| Try Layer 2 | | |
| Whole Sample Shaken | 5.37 | 13.71 |
| Whole Emulsion | 5.77 | 10.99 |
| Emulsion Centrifuged Oil | 3.95 | 3.94 |
| Emulsion Centrifuged Water, Evaporated | 6.82 | na |
| Bottle 2 Centrifuged Emulsion Water, Evaporated | 18.79 | na |
| Try Layer 3 | | |
| Whole Sample Shaken | 5.69 | 13.99 |
| Top Layer Oil Only | 4.69 | 3.70 |
| Whole Emulsion | 5.74 | 13.08 |
| Emulsion Centrifuged Oil | 5.79 | 4.13 |
| Emulsion Centrifuged Water, Evaporated | 4.48 | na |
| Middle Bottle 2 Whole Emulsion | 29.03 | 4.65 |
| Middle Bottle 2 Water, Evaporated | 8.16 | na |

TABLE 12-continued

Relative 500 nm Absorbance Detector Peak Area Percents for the Most Pericondensed Material in the Heavy Oil Desalter Sample Set. Asphaltene Determinator 500 nm CH$_2$Cl$_2$:MeOH (98:2 v:v) Peaks

| | 500 nm Relative Area Percent | |
|---|---|---|
| Heavy Crude API ~20 | Whole Material | 10μ Asphaltenes |
| Try Layer 4 | | |
| Whole Sample Shaken | 5.45 | 8.74 |
| Whole Emulsion | 5.29 | 3.75 |
| Emulsion Centrifuged Oil | 4.00 | 3.75 |
| Emulsion Centrifuged Water, Evaporated | 3.39 | na |
| Try Layer 5 | | |
| Whole Oil | 4.13 | 4.14 |
| Try Layer 7 | | |
| Whole Oil | 3.93 | 4.14 |

TABLE 13

Relative Volatiles Corrected ELSD Peak Area Percents for the Most Pericondensed Material in the Heavy Oil Desalter Sample Set. Asphaltene Determinator Volatiles Corrected ELSD Peaks

| | Volatiles Corrected | CH$_2$Cl$_2$:MeOH (98:2 v:v) Peak ELSD Relative Area Percent | |
|---|---|---|---|
| Heavy Crude API ~20 | Area % C7 Insolubles | Whole Material | 10μ Asphaltenes |
| Sample | | | |
| Inlet Crude | 3.67 | 0.09 | 0.90 |
| Desalted Outlet Crude | 3.84 | 0.09 | 0.84 |
| Try Layer 1 | | | |
| Whole Sample Shaken | 1.91 | 0.08 | 5.79 |
| Whole Emulsion | 2.06 | 0.11 | 6.40 |
| Emulsion Centrifuged Oil | 3.58 | 0.13 | 2.52 |
| Emulsion Centrifuged Water, Evaporated | 7.76 | 0.45 | na |
| Try Layer 2 | | | |
| Whole Sample Shaken | 2.16 | 0.09 | 6.87 |
| Whole Emulsion | 2.19 | 0.10 | 5.90 |
| Emulsion Centrifuged Oil | 3.60 | 0.14 | 2.27 |
| Emulsion Centrifuged Water, Evaporated | 7.18 | 0.57 | na |
| Bottle 2 Centrifuged Emulsion Water, Evaporated | 31.99 | 2.20 | na |
| Try Layer 3 | | | |
| Whole Sample Shaken | 2.30 | 0.10 | 6.89 |
| Top Layer Oil Only | 1.96 | 0.20 | 2.14 |
| Whole Emulsion | 2.15 | 0.34 | 7.29 |
| Emulsion Centrifuged Oil | 2.55 | 0.15 | 2.46 |
| Emulsion Centrifuged Water, Evaporated | 6.27 | 0.77 | na |
| Middle Bottle 2 Whole Emulsion | 0.31 | 0.17 | 2.20 |
| Middle Bottle 2 Water, Evaporated | 22.67 | 1.87 | na |
| Try Layer 4 | | | |
| Whole Sample Shaken | 2.11 | 0.09 | 4.74 |
| Whole Emulsion | 2.60 | 0.10 | 1.82 |
| Emulsion Centrifuged Oil | 5.29 | 0.17 | 1.68 |
| Emulsion Centrifuged Water, Evaporated | 8.94 | 0.79 | na |
| Try Layer 5 | | | |
| Whole Oil | 3.97 | 0.11 | 1.11 |
| Try Layer 7 | | | |
| Whole Oil | 4.19 | 0.10 | 0.92 |

TABLE 14

Relative ELSD Non-Volatile Component ELSD Peak Area Percents for the Most Polar and Pericondensed Material in the Heavy Oil Desalter Sample Set. Asphaltene Determinator ELSD Peaks for ELSD non-Volatile Components

| | Area Percent | ELSD Non-Volatile | | CH$_2$Cl$_2$:MeOH (98:2 v:v) Peak ELSD Relative Area Percent | |
|---|---|---|---|---|---|
| Heavy Crude API ~20 | ELSD Volatiles | Area % C7 Insolubles | Percent TPA | Whole Material | 10μ Asphaltenes |
| Sample | | | | | |
| Inlet Crude | 41.02 | 6.22 | 9.8 | 0.16 | 0.90 |
| Desalted Outlet Crude | 40.85 | 6.49 | 10.2 | 0.16 | 0.84 |
| Try Layer 1 | | | | | |
| Whole Sample Shaken | 74.29 | 7.43 | 11.5 | 0.31 | 5.79 |
| Whole Emulsion | 68.58 | 7.19 | 11.6 | 0.35 | 6.40 |
| Emulsion Centrifuged Oil | 50.91 | 7.29 | 11.4 | 0.27 | 2.52 |
| Emulsion Centrifuged Water, Evaporated | 70.88 | 26.64 | 37.1 | 10.41 | na |

TABLE 14-continued

Relative ELSD Non-Volatile Component ELSD Peak Area Percents for the Most Polar and Pericondensed Material in the Heavy Oil Desalter Sample Set.
Asphaltene Determinator ELSD Peaks for ELSD non-Volatile Components

| Heavy Crude API ~20 | Area Percent ELSD Volatiles | ELSD Non-Volatile Area % C7 Insolubles | Percent TPA | $CH_2Cl_2$:MeOH (98:2 v:v) Peak ELSD Relative Area Percent | |
|---|---|---|---|---|---|
| | | | | Whole Material | 10μ Asphaltenes |
| *Try Layer 2* | | | | | |
| Whole Sample Shaken | 69.82 | 7.17 | 11.1 | 0.29 | 6.87 |
| Whole Emulsion | 70.26 | 7.35 | 11.9 | 0.33 | 5.90 |
| Emulsion Centrifuged Oil | 51.69 | 7.45 | 11.6 | 0.28 | 2.27 |
| Emulsion Centrifuged Water, Evaporated | 79.21 | 34.53 | 51.3 | 11.84 | na |
| Bottle 2 Centrifuged Emulsion Water, Evaporated | 60.35 | 80.68 | 103.6 | 5.55 | na |
| *Try Layer 3* | | | | | |
| Whole Sample Shaken | 69.39 | 7.52 | 11.7 | 0.34 | 6.89 |
| Top Layer Oil Only | 79.99 | 9.80 | 14.3 | 1.01 | 2.14 |
| Whole Emulsion | 69.47 | 7.05 | 11.5 | 0.90 | 7.29 |
| Emulsion Centrifuged Oil | 69.11 | 8.25 | 12.6 | 0.47 | 2.46 |
| Emulsion Centrifuged Water, Evaporated | 56.33 | 14.35 | 22.9 | 0.77 | na |
| Middle Bottle 2 Whole Emulsion | 99.48 | 60.51 | 74.6 | 33.42 | 2.20 |
| Middle Bottle 2 Water, Evaporated | 58.54 | 54.68 | 84.4 | 1.87 | na |
| *Try Layer 4* | | | | | |
| Whole Sample Shaken | 73.87 | 8.06 | 12.1 | 0.36 | 4.74 |
| Whole Emulsion | 62.98 | 7.03 | 11.3 | 0.27 | 1.82 |
| Emulsion Centrifuged Oil | 33.04 | 7.90 | 12.4 | 0.25 | 1.68 |
| Emulsion Centrifuged Water, Evaporated | 48.87 | 17.48 | 29.0 | 3.38 | na |
| *Try Layer 5* | | | | | |
| Whole Oil | 40.24 | 6.65 | 10.5 | 0.18 | 1.11 |
| *Try Layer 7* | | | | | |
| Whole Oil | 37.91 | 6.75 | 10.5 | 0.16 | 0.92 |

TABLE 15

Relative 500 nm Absorbance Detector Peak Area Percents for the Gravimetric Asphaltenes from the Heavy Oil Desalter Sample Set.
Asphaltene Determinator 500 nm Peaks from 10μ Gravimetric Asphaltenes

| Asphaltenes from Heavy Crude API ~20 | wt. % | 500 nm Relative Area Percent | |
|---|---|---|---|
| | | Toluene | CH2Cl2:MeOH |
| *Sample* | | | |
| Inlet Crude | 7.51 | 54.14 | 3.03 |
| Desalted Outlet Crude | 8.21 | 52.35 | 2.86 |
| *Try Layer 1* | | | |
| Whole Oil | 2.86 | 51.94 | 11.23 |
| Whole Emulsion | 2.39 | 53.44 | 10.58 |
| Emulsoin Centrifuged Oil | 3.54 | 53.20 | 3.91 |
| *Try Layer 2* | | | |
| Whole Oil | 1.79 | 53.13 | 13.71 |
| Whole Emulsion | 1.72 | 54.05 | 10.99 |
| Emulsoin Centrifuged Oil | 6.92 | 52.08 | 3.94 |
| *Try Layer 3* | | | |
| Whole Oil | 2.95 | 52.78 | 13.99 |
| Top 1.5 Inch Oil | 0.78 | 57.17 | 3.70 |
| Whole Emulsion | 2.00 | 49.85 | 13.08 |
| Emulsoin Centrifuged Oil | 5.95 | 51.39 | 4.13 |
| *Try Layer 4* | | | |
| Whole Oil | 3.29 | 55.37 | 8.74 |
| Whole Emulsion | 4.88 | 57.21 | 3.75 |
| Emulsoin Centrifuged Oil | 9.06 | 51.55 | 3.75 |
| *Try Layer 5* | | | |
| Whole Oil | 8.97 | 52.63 | 4.14 |
| *Try Layer 7* | | | |
| Whole Oil | 8.98 | 50.33 | 3.82 |

APPENDIX A

Asphaltene Determinator Data for Heavy Oil Desalter Emulsion Samples

Sample: WRI 1338-131-9 (#4 Raw) Heavy Oil Set 3
Desalter Inlet Oil

| Material/ Amt. Inj. | Wt. % ELSD Volatiles | Asphaltene Determinator Area Percent | | | | | Coke Index Ratio Cy/CCl | AD Asphalt Aging Index Ratio T/H | Percent TPA |
|---|---|---|---|---|---|---|---|---|---|
| | | Detector | Heptane | CyC$_6$ | Toluene | CH$_2$Cl$_2$:MeOH | | | |
| Whole Oil 2.0000 mg | 41.02 | ELSD | 93.78 | 2.17 | 3.89 | 0.16 | 13.6 | | 9.8 |
| | | 500 nm | 36.39 | 23.64 | 35.66 | 4.31 | 5.5 | 0.98 | |
| | | 700 nm | 24.58 | 26.67 | 42.17 | 6.58 | 4.1 | | |
| | | Whole Oil ELSD Area: 4478821 | | | | QC ELSD Area: 7594086 | | | |
| Corrected for Volatiles Loss | | ELSD | 96.33 | 1.28 | 2.29 | 0.09 | 13.6 | | 5.8 |
| | | 500 nm | 36.39 | 23.64 | 35.66 | 4.31 | 5.5 | 0.98 | |
| | | 700 nm | 24.58 | 26.67 | 42.17 | 6.58 | 4.1 | | |

| Material/ Amt. Inj. | Wt. % Whole Oil | Gravimetric Asphaltenes Analysis | | | | | Area Percent Toluene + CH$_2$Cl$_2$:MeOH | Wt. % Toluene + CH$_2$Cl$_2$:MeOH | Total Wt. % Asphaltenes |
|---|---|---|---|---|---|---|---|---|---|
| | | Asphaltene Determinator Area Percent | | | | | | | |
| | | Detector | Heptane | CyC$_6$ | Toluene | CH$_2$Cl$_2$:MeOH | | | |
| C7 Asphaltenes 10μ .4012 mg | 7.51 | ELSD | 13.34 | 25.76 | 60.00 | 0.90 | 60.90 | 4.57 | 7.54 |
| | | 500 nm | 13.87 | 28.96 | 54.14 | 3.03 | 57.17 | | |
| | | 700 nm | 9.16 | 30.22 | 56.90 | 3.72 | 60.62 | | |
| C7 Asphaltenes 0.45μ | 0.03 | ELSD | Insufficient Material | | | | | | |
| | | 500 nm | Insufficient Material | | | | | | |
| | | 700 nm | Insufficient Material | | | | | | |

Sample: WRI 1338-131-27A (2nd Desalted) Heavy Oil Set 3
Desalted Outlet Oil

| Material/ Amt. Inj. | Wt. % ELSD Volatiles | Asphaltene Determinator Area Percent | | | | | Coke Index Ratio Cy/CCl | AD Asphalt Aging Index Ratio T/H | Percent TPA |
|---|---|---|---|---|---|---|---|---|---|
| | | Detector | Heptane | CyC$_6$ | Toluene | CH$_2$Cl$_2$:MeOH | | | |
| Whole Oil 2.0000 mg | 40.85 | ELSD | 93.51 | 2.31 | 4.01 | 0.16 | 14.4 | | 10.2 |
| | | 500 nm | 36.31 | 23.72 | 35.85 | 4.12 | 5.8 | 0.99 | |
| | | 700 nm | 24.61 | 26.80 | 42.47 | 6.12 | 4.4 | | |
| | | Whole Oil ELSD Area: 4492090 | | | | QC ELSD Area: 7594086 | | | |
| Corrected for Volatiles Loss | | ELSD | 96.16 | 1.37 | 2.37 | 0.09 | 14.4 | | 6.0 |
| | | 500 nm | 36.31 | 23.72 | 35.85 | 4.12 | 5.8 | 0.99 | |
| | | 700 nm | 24.61 | 26.80 | 42.47 | 6.12 | 4.4 | | |

| Material/ Amt. Inj. | Wt. % Whole Oil | Gravimetric Asphaltenes Analysis | | | | | Area Percent Toluene + CH$_2$Cl$_2$:MeOH | Wt. % Toluene + CH$_2$Cl$_2$:MeOH | Total Wt. % Asphaltenes |
|---|---|---|---|---|---|---|---|---|---|
| | | Asphaltene Determinator Area Percent | | | | | | | |
| | | Detector | Heptane | CyC$_6$ | Toluene | CH$_2$Cl$_2$:MeOH | | | |
| C7 Asphaltenes 10μ .4002 mg | 8.21 | ELSD | 16.64 | 25.67 | 56.85 | 0.84 | 57.69 | 4.74 | 8.27 |
| | | 500 nm | 15.12 | 29.68 | 52.35 | 2.86 | 55.21 | | |
| | | 700 nm | 10.31 | 31.03 | 55.03 | 3.63 | 58.66 | | |
| C7 Asphaltenes 0.45μ .2340 mg | 0.06 | ELSD | 49.07 | 15.79 | 34.34 | 0.79 | 35.13 | 0.02 | |
| | | 500 nm | 23.04 | 26.17 | 46.33 | 4.46 | 50.79 | | |
| | | 700 nm | 17.97 | 26.95 | 48.97 | 6.11 | 55.08 | | |

Sample: WRI 1338-131-10 (#1st Try Layer-1) Heavy Oil Set 3
Whole Sample Shaken

| Material/ Amt. Inj. | Wt. % ELSD Volatiles | Asphaltene Determinator Area Percent | | | | | Coke Index Ratio Cy/CCl | AD Asphalt Aging Index Ratio T/H | Percent TPA |
|---|---|---|---|---|---|---|---|---|---|
| | | Detector | Heptane | CyC$_6$ | Toluene | CH$_2$Cl$_2$:MeOH | | | |
| Whole Oil 2.0008 mg | 74.29 | ELSD | 92.57 | 2.80 | 4.32 | 0.31 | 9.0 | | 11.5 |
| | | 500 nm | 35.42 | 23.19 | 35.65 | 5.74 | 4.0 | 1.01 | |
| | | 700 nm | 24.37 | 26.23 | 41.09 | 8.32 | 3.2 | | |
| | | Whole Oil ELSD Area: 1952211 | | | | QC ELSD Area: 7594086 | | | |
| Corrected for Volatiles Loss | | ELSD | 98.09 | 0.72 | 1.11 | 0.08 | 9.0 | | 3.0 |
| | | 500 nm | 35.42 | 23.19 | 35.65 | 5.74 | 4.0 | 1.01 | |
| | | 700 nm | 24.37 | 26.23 | 41.09 | 8.32 | 3.2 | | |

APPENDIX A-continued

| | | Asphaltene Determinator Data for Heavy Oil Desalter Emulsion Samples | | | | | | | |
|---|---|---|---|---|---|---|---|---|---|
| | | Gravimetric Asphaltenes Analysis | | | | | Area Percent | Wt. % | Total |
| Material/ | Wt. % | | Asphaltene Determinator Area Percent | | | | Toluene + | Toluene + | Wt. % |
| Amt. Inj. | Whole Oil | Detector | Heptane | CyC$_6$ | Toluene | CH$_2$Cl$_2$:MeOH | CH$_2$Cl$_2$:MeOH | CH$_2$Cl$_2$:MeOH | Asphaltenes |
| C7 Asphaltenes | 2.86 | ELSD | 7.26 | 25.01 | 61.94 | 5.79 | 67.73 | 1.94 | 2.88 |
| 10μ | | 500 nm | 11.73 | 25.10 | 51.94 | 11.23 | 63.17 | | |
| 0.4014 mg | | 700 nm | 6.76 | 22.99 | 49.93 | 20.31 | 70.24 | | |
| C7 Asphaltenes | 0.02 | ELSD | | | Insufficient Material | | | | |
| 0.45μ | | 500 nm | | | Insufficient Material | | | | |
| | | 700 nm | | | Insufficient Material | | | | |

Sample: WRI 1338-131-10 (#1st Try Layer-1) Heavy Oil Set 3
Whole Emulsion Layer Shaken

| Material/ | Wt. % ELSD | | Asphaltene Determinator Area Percent | | | | Coke Index | AD Asphalt Aging Index | Percent |
|---|---|---|---|---|---|---|---|---|---|
| Amt. Inj. | Volatiles | Detector | Heptane | CyC$_6$ | Toluene | CH$_2$Cl$_2$:MeOH | Ratio Cy/CCl | Ratio T/H | TPA |
| Whole Oil | 68.58 | ELSD | 92.81 | 2.34 | 4.49 | 0.35 | 6.7 | | 11.6 |
| 2.0016 mg | | 500 nm | 37.95 | 20.49 | 35.71 | 5.84 | 3.5 | 0.94 | |
| | | 700 nm | 26.36 | 22.72 | 41.86 | 9.06 | 2.5 | | |
| | | Whole Oil ELSD Area: 2532470 | | | QC ELSD Area: 8060927 | | | | |
| Corrected for | | ELSD | 97.74 | 0.74 | 1.41 | 0.11 | 6.7 | | 3.6 |
| Volatiles Loss | | 500 nm | 37.95 | 20.49 | 35.71 | 5.84 | 3.5 | 0.94 | |
| | | 700 nm | 26.36 | 22.72 | 41.86 | 9.06 | 2.5 | | |

| | | Gravimetric Asphaltenes Analysis | | | | | Area Percent | Wt. % | Total |
|---|---|---|---|---|---|---|---|---|---|
| Material/ | Wt. % | | Asphaltene Determinator Area Percent | | | | Toluene + | Toluene + | Wt. % |
| Amt. Inj. | Whole Oil | Detector | Heptane | CyC$_6$ | Toluene | CH$_2$Cl$_2$:MeOH | CH$_2$Cl$_2$:MeOH | CH$_2$Cl$_2$:MeOH | Asphaltenes |
| C7 Asphaltenes | 2.39 | ELSD | 8.50 | 22.37 | 62.73 | 6.40 | 69.13 | 1.35 | 2.40 |
| 10μ | | 500 nm | 12.07 | 23.90 | 53.44 | 10.58 | 64.02 | | |
| 0.4004 mg | | 700 nm | 8.23 | 24.04 | 55.08 | 12.64 | 67.72 | | |
| C7 Asphaltenes | 0.01 | ELSD | | | Insufficient Material | | | | |
| 0.45μ | | 500 nm | | | Insufficient Material | | | | |
| | | 700 nm | | | Insufficient Material | | | | |

Sample: WRI 1338-131-10 (#1st T-1) Heavy Oil Set 3
Centrifuged Oil from Emulsion Layer

| Material/ | Wt. % ELSD | | Asphaltene Determinator Area Percent | | | | Coke Index | AD Asphalt Aging Index | Percent |
|---|---|---|---|---|---|---|---|---|---|
| Amt. Inj. | Volatiles | Detector | Heptane | CyC$_6$ | Toluene | CH$_2$Cl$_2$:MeOH | Ratio Cy/CCl | Ratio T/H | TPA |
| Whole Oil | 50.91 | ELSD | 92.71 | 1.93 | 5.08 | 0.27 | 7.1 | | 11.4 |
| 2.0016 mg | | 500 nm | 36.02 | 23.02 | 37.23 | 3.73 | 6.2 | 1.03 | |
| | | 700 nm | 25.44 | 25.91 | 42.97 | 5.68 | 4.6 | | |
| | | Whole Oil ELSD Area: 3850429 | | | QC ELSD Area: 7842919 | | | | |
| Corrected for | | ELSD | 96.42 | 0.95 | 2.49 | 0.13 | 7.1 | | 5.6 |
| Volatiles Loss | | 500 nm | 36.02 | 23.02 | 37.23 | 3.73 | 6.2 | 1.03 | |
| | | 700 nm | 25.44 | 25.91 | 42.97 | 5.68 | 4.6 | | |

| | | Gravimetric Asphaltenes Analysis | | | | | Area Percent | Wt. % | Total |
|---|---|---|---|---|---|---|---|---|---|
| Material/ | Wt. % | | Asphaltene Determinator Area Percent | | | | Toluene + | Toluene + | Wt. % |
| Amt. Inj. | Whole Oil | Detector | Heptane | CyC$_6$ | Toluene | CH$_2$Cl$_2$:MeOH | CH$_2$Cl$_2$:MeOH | CH$_2$Cl$_2$:MeOH | Asphaltenes |
| C7 Asphaltenes | 3.54 | ELSD | 11.12 | 22.17 | 64.19 | 2.52 | 66.71 | 2.37 | 3.55 |
| 10μ | | 500 nm | 14.51 | 28.38 | 53.20 | 3.91 | 57.11 | | |
| 0.4020 mg | | 700 nm | 9.68 | 28.94 | 56.19 | 5.18 | 61.37 | | |
| C7 Asphaltenes | 0.01 | ELSD | | | Insufficient Material | | | | |
| 0.45μ | | 500 nm | | | Insufficient Material | | | | |
| | | 700 nm | | | Insufficient Material | | | | |

APPENDIX A-continued

Asphaltene Determinator Data for Heavy Oil Desalter Emulsion Samples

Sample: WRI 1338-131-10 (#1st Try Layer-1) Heavy Oil Set 3
Oil Residue from Evaporated Centrifuged Water Fraction from Emulsion Layer

| Material/<br>Amt. Inj. | Wt. % ELSD<br>Volatiles | Asphaltene Determinator Area Percent | | | | | Coke Index<br>Ratio Cy/CCl | AD Asphalt<br>Aging Index<br>Ratio T/H | Percent<br>TPA |
|---|---|---|---|---|---|---|---|---|
| | | Detector | Heptane | CyC$_6$ | Toluene | CH$_2$Cl$_2$:MeOH | | | |
| Whole Oil | 70.88 | ELSD | 73.36 | 3.02 | 13.20 | 10.41 | 0.3 | | 37.1 |
| 0.2947 mg | | 500 nm | 28.26 | 24.03 | 40.01 | 7.71 | 3.1 | 1.42 | |
| | | 700 nm | 23.00 | 25.75 | 40.50 | 10.76 | 2.4 | | |
| | | Whole Oil 2 mg ELSD Area: 2283936 | | | | QC ELSD Area: 7842919 | | | |
| Corrected for | | ELSD | 92.24 | 0.88 | 3.84 | 3.03 | 0.3 | | |
| Volatiles Loss | | 500 nm | 28.26 | 24.03 | 40.01 | 7.71 | 3.1 | | |
| | | 700 nm | 23.00 | 25.75 | 40.50 | 10.76 | 2.4 | | |

| Material/<br>Amt. Inj. | Wt. %<br>Whole Oil | Gravimetric Asphaltenes Analysis<br>Asphaltene Determinator Area Percent | | | | | Area Percent<br>Toluene +<br>CH$_2$Cl$_2$:MeOH | Wt. %<br>Toluene +<br>CH$_2$Cl$_2$:MeOH | Total<br>Wt. %<br>Asphaltenes |
|---|---|---|---|---|---|---|---|---|---|
| | | Detector | Heptane | CyC$_6$ | Toluene | CH$_2$Cl$_2$:MeOH | | | |
| C7 Asphaltenes | | ELSD | | | Insufficient Material | | | | |
| 10μ | | 500 nm | | | Insufficient Material | | | | |
| | | 700 nm | | | Insufficient Material | | | | |
| C7 Asphaltenes | | ELSD | | | Insufficient Material | | | | |
| 0.45μ | | 500 nm | | | Insufficient Material | | | | |
| | | 700 nm | | | Insufficient Material | | | | |

Sample: WRI 1338-131-11 (#1st Try Layer-2) Heavy Oil Set 3
Whole Sample Shaken

| Material/<br>Amt. Inj. | Wt. % ELSD<br>Volatiles | Asphaltene Determinator Area Percent | | | | | Coke Index<br>Ratio Cy/CCl | AD Asphalt<br>Aging Index<br>Ratio T/H | Percent<br>TPA |
|---|---|---|---|---|---|---|---|---|
| | | Detector | Heptane | CyC$_6$ | Toluene | CH$_2$Cl$_2$:MeOH | | | |
| Whole Oil | 69.82 | ELSD | 92.83 | 2.50 | 4.38 | 0.29 | 8.6 | | 11.1 |
| 2.0004 mg | | 500 nm | 35.49 | 23.13 | 36.01 | 5.37 | 4.3 | 1.01 | |
| | | 700 nm | 24.04 | 26.30 | 42.04 | 7.62 | 3.5 | | |
| | | Whole Oil ELSD Area: 2291864 | | | | QC ELSD Area: 7594086 | | | |
| Corrected for | | ELSD | 97.84 | 0.75 | 1.32 | 0.09 | 8.6 | | 3.4 |
| Volatiles Loss | | 500 nm | 35.49 | 23.13 | 36.01 | 5.37 | 4.3 | 1.01 | |
| | | 700 nm | 24.04 | 26.30 | 42.04 | 7.62 | 3.5 | | |

| Material/<br>Amt. Inj. | Wt. %<br>Whole Oil | Gravimetric Asphaltenes Analysis<br>Asphaltene Determinator Area Percent | | | | | Area Percent<br>Toluene +<br>CH$_2$Cl$_2$:MeOH | Wt. %<br>Toluene +<br>CH$_2$Cl$_2$:MeOH | Total<br>Wt. %<br>Asphaltenes |
|---|---|---|---|---|---|---|---|---|---|
| | | Detector | Heptane | CyC$_6$ | Toluene | CH$_2$Cl$_2$:MeOH | | | |
| C7 Asphaltenes | 1.79 | ELSD | 4.48 | 23.95 | 64.70 | 6.87 | 71.57 | 1.28 | 1.80 |
| 10μ | | 500 nm | 9.62 | 23.54 | 53.13 | 13.71 | 66.84 | | |
| 0.4028 mg | | 700 nm | 5.60 | 21.34 | 49.71 | 23.34 | 73.05 | | |
| C7 Asphaltenes | 0.01 | ELSD | | | Insufficient Material | | | | |
| 0.45μ | | 500 nm | | | Insufficient Material | | | | |
| | | 700 nm | | | Insufficient Material | | | | |

Sample: WRI 1338-131-11 (#1st Try Layer-2) Heavy Oil Set 3
Whole Emulsion Layer Shaken

| Material/<br>Amt. Inj. | Wt. % ELSD<br>Volatiles | Asphaltene Determinator Area Percent | | | | | Coke Index<br>Ratio Cy/CCl | AD Asphalt<br>Aging Index<br>Ratio T/H | Percent<br>TPA |
|---|---|---|---|---|---|---|---|---|
| | | Detector | Heptane | CyC$_6$ | Toluene | CH$_2$Cl$_2$:MeOH | | | |
| Whole Oil | 70.26 | ELSD | 92.65 | 2.42 | 4.59 | 0.33 | 7.3 | | 11.9 |
| 2.0000 mg | | 500 nm | 38.03 | 20.73 | 35.48 | 5.77 | 3.6 | 0.93 | |
| | | 700 nm | 26.80 | 22.67 | 40.73 | 9.80 | 2.3 | | |
| | | Whole Oil ELSD Area: 2397115 | | | | QC ELSD Area: 8060927 | | | |
| Corrected for | | ELSD | 97.81 | 0.72 | 1.37 | 0.10 | 7.3 | | 3.5 |
| Volatiles Loss | | 500 nm | 38.03 | 20.73 | 35.48 | 5.77 | 3.6 | 0.93 | |
| | | 700 nm | 26.80 | 22.67 | 40.73 | 9.80 | 2.3 | | |

APPENDIX A-continued

Asphaltene Determinator Data for Heavy Oil Desalter Emulsion Samples

| Material/ Amt. Inj. | Wt. % Whole Oil | Gravimetric Asphaltenes Analysis | | | | | Area Percent Toluene + $CH_2Cl_2$:MeOH | Wt. % Toluene + $CH_2Cl_2$:MeOH | Total Wt. % Asphaltenes |
|---|---|---|---|---|---|---|---|---|---|
| | | Asphaltene Determinator Area Percent | | | | | | | |
| | | Detector | Heptane | $CyC_6$ | Toluene | $CH_2Cl_2$:MeOH | | | |
| C7 Asphaltenes 10μ 0.4020 mg | 1.72 | ELSD | 8.66 | 21.26 | 64.17 | 5.90 | 70.07 | 1.37 | 1.73 |
| | | 500 nm | 11.93 | 23.02 | 54.05 | 10.99 | 65.04 | | |
| | | 700 nm | 8.43 | 23.05 | 55.24 | 13.28 | 68.52 | | |
| C7 Asphaltenes 0.45μ | 0.01 | ELSD | Insufficient Material | | | | | | |
| | | 500 nm | Insufficient Material | | | | | | |
| | | 700 nm | Insufficient Material | | | | | | |

Sample: WRI 1338-131-11 (#1st Try Layer-2) Heavy Oil Set 3
Centrifuged Oil from Emulsion Layer

| Material/ Amt. Inj. | Wt. % ELSD Volatiles | Asphaltene Determinator Area Percent | | | | | Coke Index Ratio Cy/CCl | AD Asphalt Aging Index Ratio T/H | Percent TPA |
|---|---|---|---|---|---|---|---|---|---|
| | | Detector | Heptane | $CyC_6$ | Toluene | $CH_2Cl_2$:MeOH | | | |
| Whole Oil 2.0008 mg | 51.69 | ELSD | 92.55 | 1.94 | 5.23 | 0.28 | 6.9 | | 11.6 |
| | | 500 nm | 35.54 | 22.93 | 37.58 | 3.95 | 5.8 | 1.06 | |
| | | 700 nm | 25.40 | 25.71 | 42.94 | 5.95 | 4.3 | | |
| | | Whole Oil ELSD Area: 3789074 | | | QC ELSD Area: 7842919 | | | | |
| Corrected for Volatiles Loss | | ELSD | 96.40 | 0.94 | 2.53 | 0.14 | 6.9 | | 5.6 |
| | | 500 nm | 35.54 | 22.93 | 37.58 | 3.95 | 5.8 | 1.06 | |
| | | 700 nm | 25.40 | 25.71 | 42.94 | 5.95 | 4.3 | | |

| Material/ Amt. Inj. | Wt. % Whole Oil | Gravimetric Asphaltenes Analysis | | | | | Area Percent Toluene + $CH_2Cl_2$:MeOH | Wt. % Toluene + $CH_2Cl_2$:MeOH | Total Wt. % Asphaltenes |
|---|---|---|---|---|---|---|---|---|---|
| | | Asphaltene Determinator Area Percent | | | | | | | |
| | | Detector | Heptane | $CyC_6$ | Toluene | $CH_2Cl_2$:MeOH | | | |
| C7 Asphaltenes 10μ 0.4024 mg | 6.92 | ELSD | 15.61 | 21.42 | 60.71 | 2.27 | 62.98 | 4.42 | 7.02 |
| | | 500 nm | 15.73 | 28.25 | 52.08 | 3.94 | 56.02 | | |
| | | 700 nm | 10.84 | 28.98 | 55.15 | 5.03 | 60.18 | | |
| C7 Asphaltenes 0.45μ | 0.10 | ELSD | Insufficient Material | | | | | | |
| | | 500 nm | Insufficient Material | | | | | | |
| | | 700 nm | Insufficient Material | | | | | | |

Sample: WRI 1338-131-11 (#1st Try Layer-2) Heavy Oil Set 3
Oil Residue from Evaporated Centrifuged Water Fraction from Emulsion Layer

| Material/ Amt. Inj. | Wt. % ELSD Volatiles | Asphaltene Determinator Area Percent | | | | | Coke Index Ratio Cy/CCl | AD Asphalt Aging Index Ratio T/H | Percent TPA |
|---|---|---|---|---|---|---|---|---|---|
| | | Detector | Heptane | $CyC_6$ | Toluene | $CH_2Cl_2$:MeOH | | | |
| Whole Oil 0.4633 mg | 79.21 | ELSD | 65.47 | 5.77 | 16.92 | 11.84 | 0.5 | | 51.3 |
| | | 500 nm | 32.71 | 25.12 | 35.35 | 6.82 | 3.7 | 1.08 | |
| | | 700 nm | 27.26 | 27.02 | 35.92 | 9.81 | 2.8 | | |
| | | Whole Oil 2 mg ELSD Area: 1630870 | | | QC ELSD Area: 7842919 | | | | |
| Corrected for Volatiles Loss | | ELSD | 92.82 | 1.20 | 3.52 | 2.46 | 0.5 | | |
| | | 500 nm | 32.71 | 25.12 | 35.35 | 6.82 | 3.7 | | |
| | | 700 nm | 27.26 | 27.02 | 35.92 | 9.81 | 2.8 | | |

| Material/ Amt. Inj. | Wt. % Whole Oil | Gravimetric Asphaltenes Analysis | | | | | Area Percent Toluene + $CH_2Cl_2$:MeOH | Wt. % Toluene + $CH_2Cl_2$:MeOH | Total Wt. % Asphaltenes |
|---|---|---|---|---|---|---|---|---|---|
| | | Asphaltene Determinator Area Percent | | | | | | | |
| | | Detector | Heptane | $CyC_6$ | Toluene | $CH_2Cl_2$:MeOH | | | |
| C7 Asphaltenes 10μ | | ELSD | Insufficient Material | | | | | | |
| | | 500 nm | Insufficient Material | | | | | | |
| | | 700 nm | Insufficient Material | | | | | | |
| C7 Asphaltenes 0.45μ | | ELSD | Insufficient Material | | | | | | |
| | | 500 nm | Insufficient Material | | | | | | |
| | | 700 nm | Insufficient Material | | | | | | |

APPENDIX A-continued

Asphaltene Determinator Data for Heavy Oil Desalter Emulsion Samples

Sample: WRI 1338-131-12 (#1st Try Layer-3) Heavy Oil Set 3
Whole Sample Shaken

| Material/<br>Amt. Inj. | Wt. % ELSD<br>Volatiles | Asphaltene Determinator Area Percent | | | | | Coke Index<br>Ratio Cy/CCl | AD Asphalt<br>Aging Index<br>Ratio T/H | Percent<br>TPA |
|---|---|---|---|---|---|---|---|---|
| | | Detector | Heptane | $CyC_6$ | Toluene | $CH_2Cl_2$:MeOH | | | |
| Whole Oil | 69.39 | ELSD | 92.48 | 2.47 | 4.70 | 0.34 | 7.3 | | 11.7 |
| 2.0006 mg | | 500 nm | 35.89 | 21.60 | 36.82 | 5.69 | 3.8 | 1.03 | |
| | | 700 nm | 23.98 | 24.29 | 43.47 | 8.26 | 2.9 | | |
| | | Whole Oil ELSD Area: 2310376 | | | | QC ELSD Area: 7547625 | | | |
| Corrected for | | ELSD | 97.70 | 0.76 | 1.44 | 0.10 | 7.3 | | 3.6 |
| Volatiles Loss | | 500 nm | 35.89 | 21.60 | 36.82 | 5.69 | 3.8 | 1.03 | |
| | | 700 nm | 23.98 | 24.29 | 43.47 | 8.26 | 2.9 | | |

| Material/<br>Amt. Inj. | Wt. %<br>Whole Oil | Gravimetric Asphaltenes Analysis<br>Asphaltene Determinator Area Percent | | | | | Area Percent<br>Toluene +<br>$CH_2Cl_2$:MeOH | Wt. %<br>Toluene +<br>$CH_2Cl_2$:MeOH | Total<br>Wt. %<br>Asphaltenes |
|---|---|---|---|---|---|---|---|---|---|
| | | Detector | Heptane | $CyC_6$ | Toluene | $CH_2Cl_2$:MeOH | | | |
| C7 Asphaltenes | 2.95 | ELSD | 7.64 | 22.72 | 62.75 | 6.89 | 69.64 | 2.05 | 2.98 |
| 10μ | | 500 nm | 11.24 | 22.00 | 52.78 | 13.99 | 66.77 | | |
| 0.4006 mg | | 700 nm | 6.12 | 19.94 | 50.67 | 23.27 | 73.94 | | |
| C7 Asphaltenes | 0.03 | ELSD | Insufficient Material | | | | | | |
| 0.45μ | | 500 nm | Insufficient Material | | | | | | |
| | | 700 nm | Insufficient Material | | | | | | |

Sample: WRI 1338-131-12 (#1st Try Layer-3) Heavy Oil Set 3
Whole Emulsion Layer Shaken

| Material/<br>Amt. Inj. | Wt. % ELSD<br>Volatiles | Asphaltene Determinator Area Percent | | | | | Coke Index<br>Ratio Cy/CCl | AD Asphalt<br>Aging Index<br>Ratio T/H | Percent<br>TPA |
|---|---|---|---|---|---|---|---|---|
| | | Detector | Heptane | $CyC_6$ | Toluene | $CH_2Cl_2$:MeOH | | | |
| Whole Oil | 69.47 | ELSD | 92.95 | 2.33 | 4.38 | 0.34 | 6.9 | | 11.5 |
| 2.0000 mg | | 500 nm | 38.49 | 20.98 | 34.78 | 5.74 | 3.7 | 0.90 | |
| | | 700 nm | 26.92 | 23.44 | 40.18 | 9.46 | 2.5 | | |
| | | Whole Oil ELSD Area: 2461011 | | | | QC ELSD Area: 8060927 | | | |
| Corrected for | | ELSD | 97.85 | 0.71 | 1.34 | 0.10 | 6.9 | | 3.5 |
| Volatiles Loss | | 500 nm | 38.49 | 20.98 | 34.78 | 5.74 | 3.7 | 0.90 | |
| | | 700 nm | 26.92 | 23.44 | 40.18 | 9.46 | 2.5 | | |

| Material/<br>Amt. Inj. | Wt. %<br>Whole Oil | Gravimetric Asphaltenes Analysis<br>Asphaltene Determinator Area Percent | | | | | Area Percent<br>Toluene +<br>$CH_2Cl_2$:MeOH | Wt. %<br>Toluene +<br>$CH_2Cl_2$:MeOH | Total<br>Wt. %<br>Asphaltenes |
|---|---|---|---|---|---|---|---|---|---|
| | | Detector | Heptane | $CyC_6$ | Toluene | $CH_2Cl_2$:MeOH | | | |
| C7 Asphaltenes | 2.00 | ELSD | 12.05 | 21.97 | 58.69 | 7.29 | 65.98 | 1.29 | 2.02 |
| 10μ | | 500 nm | 13.42 | 23.64 | 49.85 | 13.08 | 62.93 | | |
| .4020 mg | | 700 nm | 9.28 | 23.68 | 50.75 | 16.28 | 67.03 | | |
| C7 Asphaltenes | 0.02 | ELSD | Insufficient Material | | | | | | |
| 0.45μ | | 500 nm | Insufficient Material | | | | | | |
| | | 700 nm | Insufficient Material | | | | | | |

Sample: WRI 1338-131-12 (#1st Try Layer-3) Heavy Oil Set 3
Emulsoin Centrifuged Oil Fraction

| Material/<br>Amt. Inj. | Wt. % ELSD<br>Volatiles | Asphaltene Determinator Area Percent | | | | | Coke Index<br>Ratio Cy/CCl | AD Asphalt<br>Aging Index<br>Ratio T/H | Percent<br>TPA |
|---|---|---|---|---|---|---|---|---|
| | | Detector | Heptane | $CyC_6$ | Toluene | $CH_2Cl_2$:MeOH | | | |
| Whole Oil | 69.11 | ELSD | 91.75 | 2.34 | 5.44 | 0.47 | 5.0 | | 12.6 |
| 2.0012 mg | | 500 nm | 34.64 | 21.79 | 37.78 | 5.79 | 3.8 | 1.09 | |
| | | 700 nm | 24.22 | 24.30 | 43.18 | 8.29 | 2.9 | | |
| | | Whole Oil ELSD Area: 2602764 | | | | QC ELSD Area: 8427234 | | | |
| Corrected for | | ELSD | 97.45 | 0.72 | 1.68 | 0.15 | 5.0 | | |
| Volatiles Loss | | 500 nm | 34.64 | 21.79 | 37.78 | 5.79 | 3.8 | | |
| | | 700 nm | 24.22 | 24.30 | 43.18 | 8.29 | 2.9 | | |

APPENDIX A-continued

Asphaltene Determinator Data for Heavy Oil Desalter Emulsion Samples

| Material/ Amt. Inj. | Wt. % Whole Oil | Gravimetric Asphaltenes Analysis | | | | | Area Percent Toluene + CH$_2$Cl$_2$:MeOH | Wt. % Toluene + CH$_2$Cl$_2$:MeOH | Total Wt. % Asphaltenes |
|---|---|---|---|---|---|---|---|---|---|
| | | Detector | Heptane | CyC$_6$ | Toluene | CH$_2$Cl$_2$:MeOH | | | |
| C7 Asphaltenes 10μ 2.0036 mg | 5.95 | ELSD | 12.95 | 27.08 | 57.51 | 2.46 | 59.97 | 3.57 | 5.97 |
| | | 500 nm | 13.74 | 30.73 | 51.39 | 4.13 | 55.52 | | |
| | | 700 nm | 8.86 | 31.43 | 54.44 | 5.27 | 59.71 | | |
| C7 Asphaltenes 0.45μ | 0.024 | ELSD | | | Insufficient Material | | | | |
| | | 500 nm | | | Insufficient Material | | | | |
| | | 700 nm | | | Insufficient Material | | | | |

Sample: WRI 1338-131-12 (#1st Try Layer-3) Heavy Oil Set 3
Oil Residue from Evaporated Centrifuged Water Fraction from Emulsion Layer

| Material/ Amt. Inj. | Wt. % ELSD Volatiles | Asphaltene Determinator Area Percent | | | | | Coke Index Ratio Cy/CCl | AD Asphalt Aging Index Ratio T/H | Percent TPA |
|---|---|---|---|---|---|---|---|---|---|
| | | Detector | Heptane | CyC$_6$ | Toluene | CH$_2$Cl$_2$:MeOH | | | |
| Whole Oil 1.1087 mg | 56.33 | ELSD | 85.65 | 3.77 | 7.40 | 3.18 | 1.2 | | 22.9 |
| | | 500 nm | 37.36 | 25.86 | 32.31 | 4.48 | 5.8 | 0.86 | |
| | | 700 nm | 27.04 | 28.81 | 37.41 | 6.74 | 4.3 | | |
| | | Whole Oil 2 mg ELSD Area: 3680435 | | | | QC ELSD Area: 8427234 | | | |
| Corrected for Volatiles Loss | | ELSD | 93.73 | 1.65 | 3.23 | 1.39 | 1.2 | | 10.0 |
| | | 500 nm | 37.36 | 25.86 | 32.31 | 4.48 | 5.8 | 0.86 | |
| | | 700 nm | 27.04 | 28.81 | 37.41 | 6.74 | 4.3 | | |

| Material/ Amt. Inj. | Wt. % Whole Oil | Gravimetric Asphaltenes Analysis | | | | | Area Percent Toluene + CH$_2$Cl$_2$:MeOH | Wt. % Toluene + CH$_2$Cl$_2$:MeOH | Total Wt. % Asphaltenes |
|---|---|---|---|---|---|---|---|---|---|
| | | Detector | Heptane | CyC$_6$ | Toluene | CH$_2$Cl$_2$:MeOH | | | |
| C7 Asphaltenes 10μ | | ELSD | | | Insufficient Material | | | | |
| | | 500 nm | | | Insufficient Material | | | | |
| | | 700 nm | | | Insufficient Material | | | | |
| C7 Asphaltenes 0.45μ | | ELSD | | | Insufficient Material | | | | |
| | | 500 nm | | | Insufficient Material | | | | |
| | | 700 nm | | | Insufficient Material | | | | |

Sample: WRI 1338-131-13 (#1st Try layer-4) Heavy Oil Set 3
Whole Sample Shaken

| Material/ Amt. Inj. | Wt. % ELSD Volatiles | Asphaltene Determinator Area Percent | | | | | Coke Index Ratio Cy/CCl | AD Asphalt Aging Index Ratio T/H | Percent TPA |
|---|---|---|---|---|---|---|---|---|---|
| | | Detector | Heptane | CyC$_6$ | Toluene | CH$_2$Cl$_2$:MeOH | | | |
| Whole Oil 2.0000 mg | 73.87 | ELSD | 91.94 | 2.73 | 4.96 | 0.36 | 7.6 | | 12.1 |
| | | 500 nm | 33.44 | 22.99 | 38.13 | 5.45 | 4.2 | 1.14 | |
| | | 700 nm | 21.55 | 25.27 | 44.67 | 8.51 | 3.0 | | |
| | | Whole Oil ELSD Area: 1972189 | | | | QC ELSD Area: 7547625 | | | |
| Corrected for Volatiles Loss | | ELSD | 97.89 | 0.71 | 1.30 | 0.09 | 7.6 | | 3.2 |
| | | 500 nm | 33.44 | 22.99 | 38.13 | 5.45 | 4.2 | 1.14 | |
| | | 700 nm | 21.55 | 25.27 | 44.67 | 8.51 | 3.0 | | |

| Material/ Amt. Inj. | Wt. % Whole Oil | Gravimetric Asphaltenes Analysis | | | | | Area Percent Toluene + CH$_2$Cl$_2$:MeOH | Wt. % Toluene + CH$_2$Cl$_2$:MeOH | Total Wt. % Asphaltenes |
|---|---|---|---|---|---|---|---|---|---|
| | | Detector | Heptane | CyC$_6$ | Toluene | CH$_2$Cl$_2$:MeOH | | | |
| C7 Asphaltenes 10μ 0.4028 mg | 3.29 | ELSD | 6.60 | 18.02 | 70.64 | 4.74 | 75.38 | 2.48 | 3.31 |
| | | 500 nm | 11.83 | 24.06 | 55.37 | 8.74 | 64.11 | | |
| | | 700 nm | 8.01 | 23.83 | 56.69 | 11.47 | 68.16 | | |
| C7 Asphaltenes 0.45μ | 0.02 | ELSD | | | Insufficient Material | | | | |
| | | 500 nm | | | Insufficient Material | | | | |
| | | 700 nm | | | Insufficient Material | | | | |

APPENDIX A-continued

Asphaltene Determinator Data for Heavy Oil Desalter Emulsion Samples

Sample: WRI 1338-131-13 (#1st Try Layer-4) Heavy Oil Set 3
Whole Emulsion Layer Shaken

| Material/ Amt. Inj. | Wt. % ELSD Volatiles | Asphaltene Determinator Area Percent | | | | | Coke Index Ratio Cy/CCl | AD Asphalt Aging Index Ratio T/H | Percent TPA |
|---|---|---|---|---|---|---|---|---|---|
| | | Detector | Heptane | CyC$_6$ | Toluene | CH$_2$Cl$_2$:MeOH | | | |
| Whole Oil | 62.98 | ELSD | 92.97 | 2.26 | 4.50 | 0.27 | 8.4 | | 11.3 |
| 2.0000 mg | | 500 nm | 37.73 | 21.06 | 35.91 | 5.29 | 4.0 | 0.95 | |
| | | 700 nm | 26.28 | 23.63 | 42.09 | 8.00 | 3.0 | | |
| | | Whole Oil ELSD Area: 2983869 | | | | QC ELSD Area: 8060927 | | | |
| Corrected for | | ELSD | 97.40 | 0.84 | 1.67 | 0.10 | 8.4 | | 4.2 |
| Volatiles Loss | | 500 nm | 37.73 | 21.06 | 35.91 | 5.29 | 4.0 | 0.95 | |
| | | 700 nm | 26.28 | 23.63 | 42.09 | 8.00 | 3.0 | | |

| Material/ Amt. Inj. | Wt. % Whole Oil | Gravimetric Asphaltenes Analysis | | | | | Area Percent Toluene + CH$_2$Cl$_2$:MeOH | Wt. % Toluene + CH$_2$Cl$_2$:MeOH | Total Wt. % Asphaltenes |
|---|---|---|---|---|---|---|---|---|---|
| | | Asphaltene Determinator Area Percent | | | | | | | |
| | | Detector | Heptane | CyC$_6$ | Toluene | CH$_2$Cl$_2$:MeOH | | | |
| C7 Asphaltenes | 4.88 | ELSD | 12.38 | 20.80 | 65.00 | 1.82 | 66.82 | 1.31 | 4.89 |
| 10μ | | 500 nm | 12.36 | 26.67 | 57.21 | 3.75 | 60.96 | | |
| .4004 mg | | 700 nm | 8.10 | 27.25 | 60.02 | 4.63 | 64.65 | | |
| C7 Asphaltenes | 0.01 | ELSD | Insufficient Material | | | | | | |
| 0.45μ | | 500 nm | Insufficient Material | | | | | | |
| | | 700 nm | Insufficient Material | | | | | | |

Sample: WRI 1338-131-13 (#1st Try Layer-4) Heavy Oil Set 3
Emulsion Centrifuged Oil Fraction

| Material/ Amt. Inj. | Wt. % ELSD Volatiles | Asphaltene Determinator Area Percent | | | | | Coke Index Ratio Cy/CCl | AD Asphalt Aging Index Ratio T/H | Percent TPA |
|---|---|---|---|---|---|---|---|---|---|
| | | Detector | Heptane | CyC$_6$ | Toluene | CH$_2$Cl$_2$:MeOH | | | |
| Whole Oil | 33.04 | ELSD | 92.10 | 2.50 | 5.16 | 0.25 | 10.0 | | 12.4 |
| 2.0010 mg | | 500 nm | 36.15 | 22.64 | 37.21 | 4.00 | 5.7 | 1.03 | |
| | | 700 nm | 25.31 | 25.62 | 43.29 | 5.78 | 4.4 | | |
| | | Whole Oil ELSD Area: 5642749 | | | | QC ELSD Area: 8427234 | | | |
| Corrected for | | ELSD | 94.71 | 1.67 | 3.46 | 0.17 | 10.0 | | 8.3 |
| Volatiles Loss | | 500 nm | 36.15 | 22.64 | 37.21 | 4.00 | 5.7 | | |
| | | 700 nm | 25.31 | 25.62 | 43.29 | 5.78 | 4.4 | | |

| Material/ Amt. Inj. | Wt. % Whole Oil | Gravimetric Asphaltenes Analysis | | | | | Area Percent Toluene + CH$_2$Cl$_2$:MeOH | Wt. % Toluene + CH$_2$Cl$_2$:MeOH | Total Wt. % Asphaltenes |
|---|---|---|---|---|---|---|---|---|---|
| | | Asphaltene Determinator Area Percent | | | | | | | |
| | | Detector | Heptane | CyC$_6$ | Toluene | CH$_2$Cl$_2$:MeOH | | | |
| C7 Asphaltenes | 9.0585 | ELSD | 20.48 | 23.96 | 53.87 | 1.68 | 55.55 | 5.03 | 9.09 |
| 10μ | | 500 nm | 15.18 | 29.52 | 51.55 | 3.75 | 55.30 | | |
| 2.0004 mg | | 700 nm | 10.61 | 30.45 | 54.21 | 4.72 | 58.93 | | |
| C7 Asphaltenes | 0.0316 | ELSD | Insufficient Material | | | | | | |
| 0.45μ | | 500 nm | Insufficient Material | | | | | | |
| | | 700 nm | Insufficient Material | | | | | | |

Sample: WRI 1338-131-13 (#1st Try Layer-4) Heavy Oil Set 3
Oil Residue from Evaporated Centrifuged Water Fraction from Emulsion Layer

| Material/ Amt. Inj. | Wt. % ELSD Volatiles | Asphaltene Determinator Area Percent | | | | | Coke Index Ratio Cy/CCl | AD Asphalt Aging Index Ratio T/H | Percent TPA |
|---|---|---|---|---|---|---|---|---|---|
| | | Detector | Heptane | CyC$_6$ | Toluene | CH$_2$Cl$_2$:MeOH | | | |
| Whole Oil | 48.87 | ELSD | 82.52 | 5.71 | 8.40 | 3.38 | 1.7 | | 29.0 |
| 0.9160 mg | | 500 nm | 39.75 | 24.80 | 32.07 | 3.39 | 7.3 | 0.81 | |
| | | 700 nm | 30.48 | 27.85 | 36.46 | 5.20 | 5.4 | | |
| | | Whole Oil 2 mg ELSD Area: 4308742 | | | | QC ELSD Area: 8427234 | | | |
| Corrected for | | ELSD | 91.06 | 2.92 | 4.29 | 1.73 | 1.7 | | 14.8 |
| Volatiles Loss | | 500 nm | 39.75 | 24.80 | 32.07 | 3.39 | 7.3 | 0.81 | |
| | | 700 nm | 30.48 | 27.85 | 36.46 | 5.20 | 5.4 | | |

APPENDIX A-continued

Asphaltene Determinator Data for Heavy Oil Desalter Emulsion Samples

| Material/ Amt. Inj. | Wt. % Whole Oil | Gravimetric Asphaltenes Analysis | | | | | Area Percent Toluene + $CH_2Cl_2$:MeOH | Wt. % Toluene + $CH_2Cl_2$:MeOH | Total Wt. % Asphaltenes |
|---|---|---|---|---|---|---|---|---|---|
| | | Asphaltene Determinator Area Percent | | | | | | | |
| | | Detector | Heptane | $CyC_6$ | Toluene | $CH_2Cl_2$:MeOH | | | |
| C7 Asphaltenes 10μ | | ELSD | Insufficient Material | | | | | | |
| | | 500 nm | Insufficient Material | | | | | | |
| | | 700 nm | Insufficient Material | | | | | | |
| C7 Asphaltenes 0.45μ | | ELSD | Insufficient Material | | | | | | |
| | | 500 nm | Insufficient Material | | | | | | |
| | | 700 nm | Insufficient Material | | | | | | |

Sample: WRI 1338-131-14 (#1st Try Layer-5) Heavy Oil Set 3
Whole Sample Shaken (all oil)

| Material/ Amt. Inj. | Wt. % ELSD Volatiles | Asphaltene Determinator Area Percent | | | | | Coke Index Ratio Cy/CCl | AD Asphalt Aging Index Ratio T/H | Percent TPA |
|---|---|---|---|---|---|---|---|---|---|
| | | Detector | Heptane | $CyC_6$ | Toluene | $CH_2Cl_2$:MeOH | | | |
| Whole Oil 2.0000 mg | 40.24 | ELSD | 93.35 | 2.42 | 4.05 | 0.18 | 13.4 | | 10.5 |
| | | 500 nm | 36.43 | 23.71 | 35.73 | 4.13 | 5.7 | 0.98 | |
| | | 700 nm | 25.02 | 26.84 | 41.94 | 6.20 | 4.3 | | |
| | | Whole Oil ELSD Area: 4510300 | | | QC ELSD Area: 7547625 | | | | |
| Corrected for Volatiles Loss | | ELSD | 96.03 | 1.45 | 2.42 | 0.11 | 13.4 | | 6.3 |
| | | 500 nm | 36.43 | 23.71 | 35.73 | 4.13 | 5.7 | 0.98 | |
| | | 700 nm | 25.02 | 26.84 | 41.94 | 6.20 | 4.3 | | |

| Material/ Amt. Inj. | Wt. % Whole Oil | Gravimetric Asphaltenes Analysis | | | | | Area Percent Toluene + $CH_2Cl_2$:MeOH | Wt. % Toluene + $CH_2Cl_2$:MeOH | Total Wt. % Asphaltenes |
|---|---|---|---|---|---|---|---|---|---|
| | | Asphaltene Determinator Area Percent | | | | | | | |
| | | Detector | Heptane | $CyC_6$ | Toluene | $CH_2Cl_2$:MeOH | | | |
| C7 Asphaltenes 10μ 0.4036 mg | 8.97 | ELSD | 12.00 | 22.50 | 64.38 | 1.11 | 65.49 | 58.70 | 9.40 |
| | | 500 nm | 13.93 | 29.30 | 52.63 | 4.14 | 56.77 | | |
| | | 700 nm | 9.34 | 31.25 | 54.34 | 5.07 | 59.41 | | |
| C7 Asphaltenes 0.45μ 0.4290 mg | 0.43 | ELSD | 8.45 | 12.95 | 76.79 | 1.81 | 78.60 | | |
| | | 500 nm | 9.10 | 20.14 | 66.11 | 4.65 | 70.76 | | |
| | | 700 nm | 5.77 | 21.03 | 68.06 | 5.14 | 73.20 | | |

Sample: WRI 1338-131-16 (#1st Try Layer-7) Heavy Oil Set 3
Whole Sample Shaken (all oil)

| Material/ Amt. Inj. | Wt. % ELSD Volatiles | Asphaltene Determinator Area Percent | | | | | Coke Index Ratio Cy/CCl | AD Asphalt Aging Index Ratio T/H | Percent TPA |
|---|---|---|---|---|---|---|---|---|---|
| | | Detector | Heptane | $CyC_6$ | Toluene | $CH_2Cl_2$:MeOH | | | |
| Whole Oil 2.0016 mg | 37.91 | ELSD | 93.25 | 2.39 | 4.19 | 0.16 | 14.9 | | 10.5 |
| | | 500 nm | 35.85 | 23.66 | 36.55 | 3.93 | 6.0 | 1.02 | |
| | | 700 nm | 23.79 | 27.08 | 43.39 | 5.74 | 4.7 | | |
| | | Whole Oil ELSD Area: 4686428 | | | QC ELSD Area: 7547625 | | | | |
| Corrected for Volatiles Loss | | ELSD | 95.81 | 1.48 | 2.60 | 0.10 | 14.9 | | 6.5 |
| | | 500 nm | 35.85 | 23.66 | 36.55 | 3.93 | 6.0 | 1.02 | |
| | | 700 nm | 23.79 | 27.08 | 43.39 | 5.74 | 4.7 | | |

| Material/ Amt. Inj. | Wt. % Whole Oil | Gravimetric Asphaltenes Analysis | | | | | Area Percent Toluene + $CH_2Cl_2$:MeOH | Wt. % Toluene + $CH_2Cl_2$:MeOH | Total Wt. % Asphaltenes |
|---|---|---|---|---|---|---|---|---|---|
| | | Asphaltene Determinator Area Percent | | | | | | | |
| | | Detector | Heptane | $CyC_6$ | Toluene | $CH_2Cl_2$:MeOH | | | |
| C7 Asphaltenes 10μ 0.4032 mg | 8.98 | ELSD | 13.78 | 24.99 | 60.32 | 0.92 | 61.24 | 55.00 | 9.21 |
| | | 500 nm | 14.51 | 31.34 | 50.33 | 3.82 | 54.15 | | |
| | | 700 nm | 9.97 | 33.51 | 51.95 | 4.57 | 56.52 | | |
| C7 Asphaltenes 0.45μ 0.4550 mg | 0.23 | ELSD | 5.58 | 11.53 | 80.73 | 2.17 | 82.90 | | |
| | | 500 nm | 8.12 | 18.20 | 68.11 | 5.58 | 73.69 | | |
| | | 700 nm | 4.86 | 19.25 | 69.82 | 6.06 | 75.88 | | |

What is claimed is:

1. A method of destabilizing a stabilized aqueous hydrocarbon emulsion that comprises an emulsion stabilizing, methylene chloride-soluble, polar asphaltene subfraction material, said method comprising the steps of:
   wetting, with water, a high surface energy sorbent to generate a water wetted hydrophilic sorbent having a hydrophilic sorbent surface and a water layer adsorbed onto said hydrophilic sorbent surface;
   effecting contact between said water wetted hydrophilic sorbent and said stabilized aqueous hydrocarbon emulsion after performing said step of wetting;
   physically effecting relative motion between said water wetted hydrophilic sorbent and said stabilized aqueous hydrocarbon emulsion;
   adsorbing at least some of said emulsion stabilizing, methylene chloride-soluble, polar asphaltene subfraction material of said stabilized aqueous hydrocarbon emulsion onto said water layer to generate an adsorbed, methylene chloride-soluble asphaltene subfraction material layer;
   preventing adsorption of adsorbed, methylene chloride-soluble, asphaltene subfraction material of said adsorbed, methylene chloride-soluble asphaltene subfraction material layer onto said hydrophilic sorbent surface as a result of performing said step of adsorbing;
   destabilizing said stabilized aqueous hydrocarbon emulsion as a result of performing said steps of wetting, effecting contact, physically effecting relative motion, and adsorbing.

2. A method as described in claim 1 wherein said step of destabilizing comprises the step of continuously destabilizing said stabilized aqueous hydrocarbon emulsion.

3. A method as described in claim 1 wherein said high surface energy sorbent comprises a sorbent selected from the group consisting of mixed hydrophilic and hydrophobic material, and hydrophilic material that can be rendered partially hydrophobic.

4. A method as described in claim 1 wherein said high surface energy sorbent comprises a material selected from the group consisting of hydrophobic materials that can be rendered partially hydrophilic, polytetrafluoroethylene modified with hydrophilic material, functionalized polymers, functionalized carbonaceous materials, petroleum coke, coal, charcoal, graphene, graphite, and carbon nanotubes.

5. A method as described in claim 1 wherein water of said stabilized aqueous hydrocarbon emulsion comprises water selected from the group consisting of-fresh water, salt water, brine, water with additive, indigenous water, well flooding water, water of an intentionally created emulsion, water of an unintentional emulsion, water of an oil spill emulsion, water of an oil contaminated emulsion, and drilling fluid.

6. A method as described in claim 1 further comprising the step of thermally treating said stabilized aqueous hydrocarbon emulsion.

7. A method as described in claim 1 wherein said hydrocarbon of said stabilized aqueous hydrocarbon emulsion is selected from the group consisting of: asphalts, distillation residua, processed oil, crude oil, processed oil from catalytic hydrotreating, processed oil from catalytic hydroprocessing, tar sands oil, shale oil, coal oil, synthetic oil, fuel oil, diesel fuel, biologically derived oil, modified asphalt binder, modified asphalt formulation, unmodified asphalt binder, unmodified asphalt formulation, roofing shingle asphalt, fuel, caulk, and sealant.

8. A method as described in claim 1 wherein said stabilized aqueous hydrocarbon emulsion is an emulsion selected from the group consisting of oil and water emulsion, oil in water emulsion, water in oil emulsion, bi-continuous emulsion, oil in water in oil emulsion, water in oil in water emulsion, foam emulsion, froth emulsion, bi-layer emulsion, micro-emulsion, macro-emulsion, mixed emulsion, fuel emulsion, asphalt emulsion, heavy oil emulsion, light oil emulsion, medium oil emulsion, cosmetics emulsion, pharmaceutical emulsion, food emulsion, personal care product emulsion, oil spill emulsion, and diesel fuel emulsion.

9. A method as described in claim 1 wherein said high surface energy sorbent comprises a material selected from the group consisting of hydrophilic material, silica, silica gel, alumina, silica-alumina, zeolites, $TiO_2$, hydrated lime, hydrated lime derivatives, aluminosilicates, ceramics, metal oxides, polymers, ionic exchange resins, metal oxides coated on aluminosilicates, metal oxides coated on zeolites, metal oxides coated on silica-alumina, metal oxides impregnated with aluminosilicates, metal oxides impregnated with zeolites, metal oxides impregnated with silica-alumina, silated aluminosilicates, silica-alumina, silica, silica gel, alumina, glass, hydrophilic material, metals, acidic metal catalysts, basic metal catalysts, insoluble inorganic polymeric acids, insoluble organic acids, insoluble polymeric acids, insoluble inorganic polymeric bases, insoluble organic bases, insoluble polymeric bases, ceramics, limestone, lime, lime derivatives, calcium carbonate, dolomite, sodium sesquicarbonate, sodium carbonate, glass, quartz, sand, functionalized polymers, functionalized carbonaceous material, functionalizations of these materials, and combinations of aforementioned materials.

10. A method as described in claim 1 wherein said high surface energy sorbent comprises a hydrophilic material coated or impregnated with material selected from the group consisting of: carbonaceous material, graphene, carbon, active carbon, coke, carbon nanotubes, asphaltenes, adsorbed asphaltenes, alkyl groups, aryl groups, flouro groups, perfluoroaryl groups, perflouroalkyl groups, polytetrafluoroethylene, polytetrafluoroethylene from polytetrafluoroethylene emulsion, sulfides, rare earth oxides, and rare earth sulfides.

11. A method as described in claim 2 wherein said step of continuously destabilizing said stabilized aqueous hydrocarbon emulsion is performed without passivating or consuming said high surface energy sorbent.

* * * * *